(12) United States Patent
Heun et al.

(10) Patent No.: US 11,562,544 B2
(45) Date of Patent: Jan. 24, 2023

(54) TRANSFERRING GRAPHIC OBJECTS BETWEEN NON-AUGMENTED REALITY AND AUGMENTED REALITY MEDIA DOMAINS

(71) Applicant: PTC INC., Boston, MA (US)

(72) Inventors: Valentin Heun, Cambridge, MA (US); Benjamin Reynolds, Cambridge, MA (US); Christian Vázquez, Cambridge, MA (US)

( * ) Notice: Subject to any disclaimer, the term of this patent is extended or adjusted under 35 U.S.C. 154(b) by 0 days.

(21) Appl. No.: 17/361,170

(22) Filed: Jun. 28, 2021

(65) Prior Publication Data

US 2021/0335047 A1 Oct. 28, 2021

Related U.S. Application Data

(63) Continuation of application No. 16/445,174, filed on Jun. 18, 2019, now Pat. No. 11,049,322.

(60) Provisional application No. 62/855,914, filed on May 31, 2019, provisional application No. 62/686,664, filed on Jun. 18, 2018.

(51) Int. Cl.
*G06T 19/00* (2011.01)
*G06F 3/0486* (2013.01)
*H04N 13/128* (2018.01)

(52) U.S. Cl.
CPC .......... *G06T 19/006* (2013.01); *G06F 3/0486* (2013.01); *G06T 19/003* (2013.01); *H04N 13/128* (2018.05)

(58) Field of Classification Search
None
See application file for complete search history.

(56) References Cited

U.S. PATENT DOCUMENTS

| | | | |
|---|---|---|---|
| 11,049,322 | B2 | 6/2021 | Reynolds et al. |
| 2012/0124509 | A1 | 5/2012 | Matsuda et al. |
| 2013/0222410 | A1 | 8/2013 | Kameyama et al. |
| 2013/0234850 | A1 | 9/2013 | Lee et al. |
| 2015/0302632 | A1 | 10/2015 | Benko et al. |
| 2015/0348322 | A1 | 12/2015 | Ligameri et al. |

(Continued)

OTHER PUBLICATIONS

"Transcript of video titled "Oblong Mezzanine",", https://www.youtube.com/watch?v=FO5ICQZKbko, Posted on Feb. 7, 2013, pp. 3.

(Continued)

*Primary Examiner* — Nicholas R Wilson
(74) *Attorney, Agent, or Firm* — Patent GC LLC; Alexander Franco

(57) ABSTRACT

A display of an augmented reality-enabled (AR) device, such as a mobile phone, can be used to transfer a graphical object between a secondary display, such as a computer monitor, that is captured by a camera of the AR device, and AR space, where the object is visible only through the AR interface of the AR device. A graphical object can be selected through the AR interface and, for example, moved around on a canvas of the secondary display by the user of the AR device. When the AR interface is used to move an enabled object near an edge of the canvas or physical boundary of the secondary display, the object as shown on the secondary display can be made to disappear from the secondary display to be replaced by a virtual object shown only on the AR interface in a similar location.

20 Claims, 40 Drawing Sheets
(31 of 40 Drawing Sheet(s) Filed in Color)

(56) References Cited

U.S. PATENT DOCUMENTS

| | | |
|---|---|---|
| 2017/0061694 A1 | 3/2017 | Giraldi et al. |
| 2020/0051337 A1 | 2/2020 | Reynolds et al. |

OTHER PUBLICATIONS

"Web page printout of video titled "Oblong Mezzanine"", https://www.youtube.com/watch?v=FO5ICQZKbko, Posted on Feb. 7, 2013, pp. 2.

Al-Fuqaha, et al., "Internet of Things: A Survey on Enabling Technologies, Protocols, and Applications,", IEEE Communications Surveys & Tutorials, vol. 17, No. 4, Fourth Quarter 2015, pp. 2347-2376.

Atzori, et al., "The Internet of Things: A Survey", Computer Networks vol. 54, No. 15 (2010), pp. 2787-2805.

Azuma, et al., "Recent Advances in Augmented Reality,", IEEE Computer Graphics and Applications, vol. 21, No. 6, Nov. 2001, pp. 34-47.

Bandelloni, et al., "Flexible Interface Migration", In Proceedings of the 9th International Conference on Intelligent User Interfaces (IUI'04), Jan. 13-16, 2004, pp. 148-155.

Boring, et al., "Touch Projector: Mobile Interaction through Video", Proceedings of the 28th International Conference on Human Factors in Computing Systems, Apr. 10-15, 2010, 10 pages.

Boring, "Web page printout of video titled "Touch Projector: Mobile Interaction through Video"", https://www.youtube.com/watch?v=c8ZjhY7F7bl, posted on Jan. 24, 2012, pp. 2.

Card, et al., "The Information Visualizer, an Information Workspace,", In Proceedings of the SIGCHI Conference on Human Factors in Computing Systems (CHI '91). ACM, New York, NY, USA, 1991, pp. 181-188.

Dam, "Post-WIMP User Interfaces", Communications of the ACM, vol. 40, No. 2, Feb. 1997, pp. 63-67.

Eiriksson, et al., "Augmented Reality Interfaces for Additive Manufacturing", Scandinavian Conference on Image Analysis, Lecture Notes in Computer Science, vol. 10269, Springer, 2017, 12 pages.

Eiriksson, et al., "Designing for Color in Additive Manufacturing,", in Proceedings of the Aspe/euspen 2016 Summer Topical Meeting on Dimensional Accuracy and Surface Finish in Additive Manufacturing, ASPE—The American Society for Precision Engineering, 2016, pp. 5.

Eiriksson, et al., "Predicting Color Output of Additive Manufactured Parts", in ASPE 2015 Spring Topical Meeting, pp. 95-99, 2015.

Feiner, et al., "Knowledge-based Augmented Reality", Communications of the ACM, vol. 36, No. 7, Jul. 1993, pp. 53-62.

He, et al., "Fabrication of Low Cost Soft Tissue Prostheses with the Desktop 3D Printer,", Scientific reports, vol. 4, No. 6973, 2014, pp. 7.

Heun, et al., "Reality Editor: Programming Smarter Objects,", In Proceedings of the 2013 ACM Conference on Pervasive and Ubiquitous Computing Adjunct Publication (UbiComp'13), Sep. 8-12, 2013, 307-310 Pages.

Heun, "Smarter Objects: Programming Physical Objects with AR Technology", Program in Media Arts and Sciences, School of Architecture and Planning, Partial fulfillment of the requirements of the degree of Master of Science in Media Arts and Sciences, MIT, Sep. 2013, 122 pages.

Heun, "The Reality Editor: An Open and Universal Tool for Understanding and Controlling the Physical World", Program in Media Arts and Sciences, School of Architecture and Planning, Partial fulfillment of the requirements for the degree of Doctor of Philosophy in Media Arts and Sciences, MIT, Sep. 2017, 199 pages.

Hobin, "Editing Reality Made Easy", Department of Electrical Engineering and Computer Science, Partial Fulfillment of the Requirements for the Degree of Master of Engineering in Electrical Engineering and Computer Science, MIT, Jun. 2017, 45 pages.

Kirsh, "The intelligent Use of Space", Computational Research on Interaction and Agency, Part 2, Artificial Intelligence vol. 73, No. 1, 1995, pp. 31-68.

Kollatsch, et al., "Mobile Augmented Reality Based Monitoring of Assembly Lines", Procedia CIRP, vol. 23, pp. 246-251, 2014.

Kuhn, et al., "Spatialization: Spatial Metaphors for User Interfaces,", In Conference Companion on Human Factors in Computing Systems (CHI'96), Apr. 13-18, 1996, pp. 346-347.

Lee, et al., "Pinpointing: Precise Head- and Eye-Based Target Selection for Augmented Reality", CHI 2018 Best Paper Award, ACM, Apr. 21-26, 2018, 14 Pages.

Leigh, et al., "THAW: Tangible Interaction with See-through Augmentation for Smartphones on Computer Screens,", In Proceedings of the Adjunct Publication of the 27th Annual ACM Symposium on User Interface Software and Technology (UIST'14 Adjunct), Oct. 5-8, 2014, pp. 55-56.

Metzger, et al., "A Study on Appropriate Plant Diagram Synthesis for User-Suited HMI in Operating Control", In Engineering Interactive Systems, Peter Forbrig and Fabio Paternò (Eds.), Springer Berlin Heidelberg, 2008, pp. 246-254.

Nee, et al., "Augmented Reality Applications in Design and Manufacturing", CIRP Annals-Manufacturing Technology, vol. 61, No. 2, 2012, pp. 657-679.

Olwal, "Augmenting Surface Interaction through Context-Sensitive Mobile Devices", In IFIP Conference on Human-Computer Interaction. Springer, 2009, pp. 336-339.

Olwal, et al., "Spatial Augmented Reality on Industrial CNC-Machines", in Electronic Imaging 2008, International Society for Optics and Photonics, 2008, pp. 9.

Phong, "Illumination for Computer Generated Pictures,", Communications of the ACM, vol. 18, Jun. 1975, pp. 311-317.

Rekimoto, et al., "Augmented Surfaces: A Spatially Continuous Work Space for Hybrid Computing Environments", In Proceedings of the SIGCHI Conference on Human Factors in Computing Systems (CHI'99), May 15-20, 1999, pp. 378-385.

Rekimoto, et al., "The World Through the Computer: Computer Augmented Interaction with Real World Environments", In Proceedings of the 8th Annual ACM Symposium on User Interface and Software Technology (UIST'95), Nov. 14-17, 1995, pp. 29-36.

Reynolds, "An Augmented Reality Editor: Building data-focused tools to extend the capability, connectivity, and usability of a mobile Internet of Things browser", Department of Electrical Engineering and Computer Science, Partial Fulfillment of the Requirements for the Degree of Master of Engineering in Electrical Engineering and Computer Science, MIT, May 2017, 111 pages.

Sandor, et al., "Immersive Mixed-Reality Configuration of Hybrid User Interfaces", In Proceedings of the 4th IEEE/ACM International Symposium on Mixed and Augmented Reality (ISMAR'05), 2005, pp. 4.

U.S. Patent and Trademark Office, "Final Office Action Received", U.S. Appl. No. 16/445,174, dated Nov. 18, 2020, 40 Pages.

U.S. Patent and Trademark Office, "Non Final Office Action Received", U.S. Appl. No. 16/445,174, dated Jun. 1, 2020, 25 Pages.

U.S. Patent and Trademark Office, "Notice of Allowance Received", U.S. Appl. No. 16/445,174, dated Mar. 1, 2021, 7 Pages.

Underkoffler, "Transcript of video titled "Pointing to the Future of UI"", https://www.ted.com/talks/john_underkoffler_pointing_to_the_future_of_ui?language=en#t-572349, Posted on Feb. 2010, pp. 4.

Underkoffler, "Web page printout of video titled "Pointing to the Future of UI"", https://www.ted.com/talks/john_underkoffler_pointing_to_the_future_of_ui?language=en#t-572349, posted on Feb. 2010, pp. 3.

Vazquez, et al., "AIR: A Cross-Domain Interaction Model for Ubiquitous Augmented Reality Applications", Apr. 2019, pp. 9.

Webel, et al., "An Augmented Reality Training Platform for Assembly and Maintenance Skills", Robotics and Autonomous Systems, vol. 61, No. 4, 2013, pp. 398-403.

Weiser, "The Computer for the 21st Century", Scientific American, Sep. 1991, pp. 12.

Williams, "Casting Curved Shadows on Curved Surfaces", Computer Graphics (Proceedings of SIGGRAPH 78), vol. 12, Aug. 1978, pp. 270-274.

(56) References Cited

OTHER PUBLICATIONS

Zhang, et al., "A Volumetric Model-Based CNC Simulation and Monitoring System in Augmented Environments,", International Conference on Cyberworlds (CW'06), IEEE, 2006, pp. 8.

Zigelbaum, et al., "Slurp: Tangibility Spatiality and an Eyedropper", In CHI'08 Extended Abstracts on Human Factors in Computing Systems (CHI EA'08), Apr. 5-10, 2008, pp. 2565-2574.

Zigelbaum, "Transcript of video titled "Slurp Talk at CHI'08",", https://www.youtube.com/watch?v=-9ic27G_bFw, Posted on Mar. 15, 2009, pp. 5.

Zigelbaum, "Web page printout of video titled "Slurp Talk at CHI'08",", https://www.youtube.com/watch?v=-9ic27G_bFw, Posted on Mar. 15, 2009, pp. 2.

Zigelbaum, "Web page printout of video titled "Slurp: Smart Office",", https://www.youtube.com/watch?v=ICAUOwpeecI, posted Mar. 19, 2009, pp. 2.

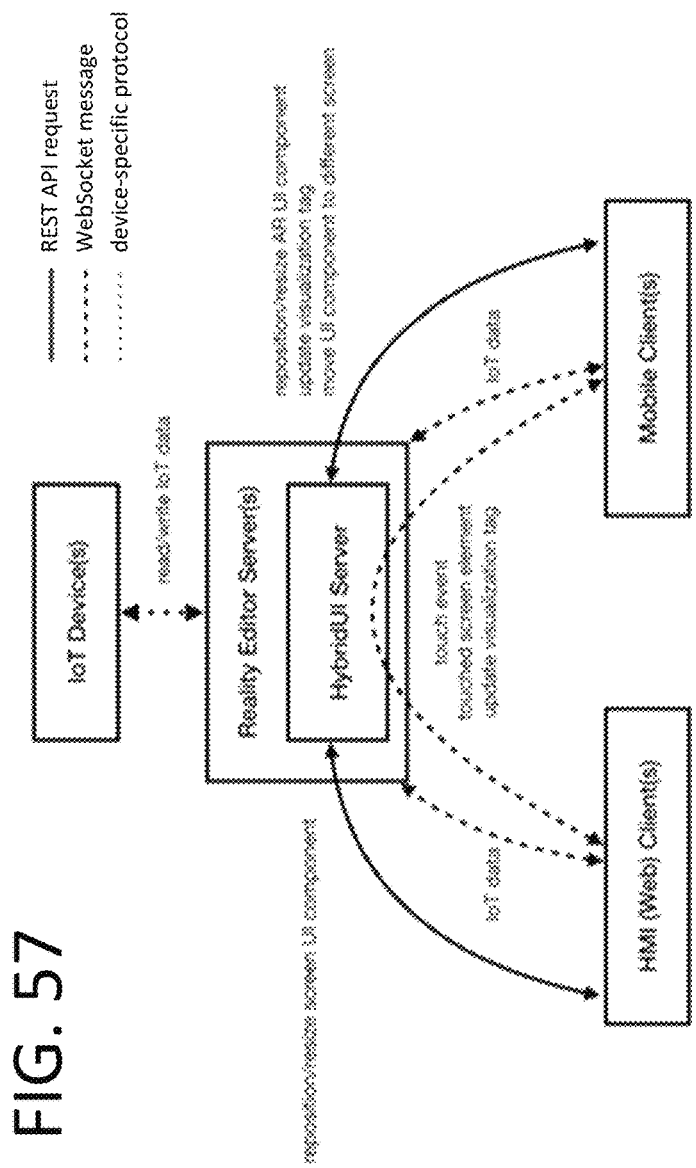
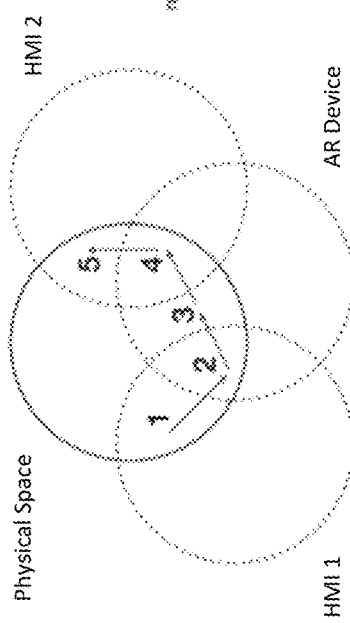
FIG. 57

FIG. 60

```
6000
``` a first of the computer systems displays a graphical object on a first display
6010

↓ a second of the computer systems causes the capturing of a live video scene with a camera, wherein the live video scene shows the first display and the graphical object on the first display
6020

↓ the second of the computer systems determines, based on analysis of the captured live video scene, that the live video scene shows the first display
6030

↓

**based on the determining that the live video scene shows the first display, the second of the computer systems:
obtains a specification of the graphical object, and
instantiates the graphical object in a memory for use in a displaying of the graphical object on a display**
6040

↓ in response to a first user input to the second of the computer systems, the second of the computer systems displays the instantiated graphical object on a second display as a virtual object in an augmented or mixed reality environment, wherein the graphical object is overlaid on a background comprising a live view of the first display, and wherein the graphical object is displayed in on the second display registered in alignment with the display of the graphical object on the first display in the background
6050

↓ contemporaneously with the second of the computer systems displaying the instantiated graphical object on the second display, the first of the computer systems removes the graphical object from the first display
6060

6110
in response to a first user input, instantiating an initial instance of a graphical object on a first display as a virtual object in an augmented or mixed reality environment, wherein the graphical object is graphically overlaid on a live background scene

6120
causing the capturing of a live video scene with a camera, wherein the live video scene includes a portion of the live background scene

6130
determining, based on analysis of the captured live video scene, that the live video scene shows a second display

6140
based on the determining that the live video scene shows the second display:
obtaining a specification of the graphical object, and
instantiating the graphical object in a memory for use in a displaying of the graphical object on the second display

6150
determining, based on analysis of the captured live video scene, that the graphical object on the first display at least partially overlaps the second display in the live background scene

6160
in response to a second user input received while the graphical object on the first display at least partially overlaps the second display in the live background scene, displaying the instantiated graphical object on the second display in a position such that the display of the graphical object on the first display is registered in alignment with the display of the graphical object on the second display in the live background scene

6170
contemporaneously with the displaying the instantiated graphical object on the second display, removing the graphical object from the first display

TRANSFERRING GRAPHIC OBJECTS BETWEEN NON-AUGMENTED REALITY AND AUGMENTED REALITY MEDIA DOMAINS

RELATED APPLICATIONS

The subject matter of this application is related to U.S. patent application Ser. No. 16/445,174, filed on 2019 Jun. 18, now U.S. patent Ser. No. 11/049,322, Provisional Application No. 62/855,914, filed on 2019 May 31 and U.S. Provisional Application No. 62/686,664, filed on 2018 Jun. 18, all of which applications are incorporated herein by reference in their entireties.

BACKGROUND OF THE INVENTION

The present disclosure leverages and builds upon a project named "Reality Editor" that was active at the MIT Media Lab at the Massachusetts Institute of Technology (MIT) from January 2014 to June 2017. The project has been extensively described and documented in four published MIT thesis papers as follows.

The first thesis paper, by Valentin Heun, is titled "Smarter objects: programming physical objects with AR technology", issued in 2013 by Massachusetts Institute of Technology Department of Architecture, Program in Media Arts and Sciences, and can be accessed at the http URL: hdl.handle.net/1721.1/91844. The Abstract of the thesis follows. This thesis describes a system that associates a virtual object with each physical object. These objects are connected to support a flexible and easy means of modifying the interface and behavior of a physical object. It also supports the creation of simple interactions with other "smarter" objects to create more complex functionality. As a user interacts with a physical object, an augmented reality interface visualizes the virtual object on top of the physical object and gives the user an intuitive graphical interface for modifying the object's interface and behavior or defining how it relates to other objects. As such, the system provides an innovative interface for programming the behavior of physical objects. The contribution of the thesis lies in the meaningful separation of physical and virtual object interactions, a concept of direct mapping and the interprogrammability of Smarter Objects. The thesis presents the employment of Smarter Objects from all aspects and discusses a working implementation as well as several usage scenarios demonstrating potential applications. Finally, the thesis reflects on the implications of this approach for industrial design.

The second thesis paper, by Valentin Heun, is titled "The reality editor: an open and universal tool for understanding and controlling the physical world", issued in 2017 by Massachusetts Institute of Technology Department of Architecture Program in Media Arts and Sciences, and can be accessed at the http URL: hdl.handle.net/1721.1/114072. The Abstract of the thesis follows. In a future where every physical object has the ability to compute and connect with other physical things, we have to rethink our present user interfaces and interaction metaphors. The desktop metaphor used in personal computers and smartphones was invented for data organization and is not well suited for interaction with things in the physical world. As a result, the growing number of interconnected things (or Internet of Things devices) surrounding us are becoming hard to operate. Each IoT device requires a different app to control it and forces the user to memorize a unique connection and interface. In addition, connected things made by different companies cannot easily be connected to one another. This thesis introduces a novel, directly mapped user interface for connected things built upon World Wide Web technology, a decentralized networking infrastructure for connected things to talk to each other, and a simple, visual user interface for understanding and controlling the connected things around us. The overall system is called the Reality Editor, an open-source, freely and publicly available tool for creating ecosystems of interconnected things. The thesis discusses the design of the Reality Editor, its core ideas and implementation details and a series of real world prototypes that were built to evaluate and improve the tool.

The third thesis paper, by Benjamin Reynolds, is titled "An augmented Reality Editor: building data-focused tools to extend the capability, connectivity, and usability of a mobile Internet of Things browser", issued in 2017 by Massachusetts Institute of Technology Department of Electrical Engineering and Computer Science, and can be accessed at the http URL: hdl.handle.net/1721.1/113172. The Abstract of the thesis follows. This thesis describes extensions made to the Reality Editor system to improve its ability to browse augmented reality content and to customize the flow of data between Internet of Things objects. The augmented reality browsing is improved by a platform shift to web technologies, while the data customization is provided by the design of logical operators that can be added to a network of objects. The contribution lies in the implementation of a novel grid-constrained, data flow visual programming language called Logic Crafting, which provides a modularized and extensible environment for manipulating the data passed between IoT objects. Associated contributions involve web service modules that allow non-developers to connect IoT objects with arbitrary remote services, and an implemented mechanism for changing the permissions model for IoT objects on a per-resource level. The thesis then presents a number of prototypes enabled by using web technologies for augmented reality, as well as demonstrative use cases for programming IoT objects with Logic Crafting. Finally, the thesis reflects on the implication of these features and prototypes on the subject of augmented multiuser environments.

The fourth thesis paper, by James Hobin, is titled "Editing reality made easy", issued in 2017 by Massachusetts Institute of Technology Department of Electrical Engineering and Computer Science, and can be accessed at the http URL: hdl.handle.net/1721.1/113151. The Abstract of the thesis follows. The Reality Editor is a system based around the concept that physical objects may serve augmented reality web interfaces while communicating information about their state to the local environment. Its combination of an augmented reality web browser with an object messaging system leads to high usability and simplicity. In my contribution to the project, I reduce the difficulty of creating and controlling compelling augmented reality Internet of Things experiences using the Reality Editor. I simplify the creation process through three areas of work: creating reusable user interface components, designing an in-browser editor, and implementing a drag-and-drop in-app editor. My work on enhancing control takes two forms: developing an object memory system and integrating networked cameras. Finally, I improve the Reality Editor as a whole through a series of efforts targeting its documentation, performance, and reliability.

The Reality Editor MIT Media Lab project can be accessed at the http URL: realityeditor.org. Open source software and source code for the project is available and accessible by the public.

SUMMARY OF THE INVENTION

A display of an augmented reality-enabled (AR) device, such as a mobile phone, can be used to transfer a graphical object between a secondary display, such as a computer monitor, that is captured by a camera of the AR device, and AR space, where the object is visible only through the AR interface of the AR device. A user can, for example, view certain enabled visual objects displayed on the secondary display as captured by the camera of the AR device camera. The enabled visual objects, as shown on the secondary display and as viewed through the AR display, can be selected through the AR interface and, for example, moved around on a canvas of the secondary display by the user of the AR device. By way of example, a user can move a visual object on the secondary display through the AR interface by using a drag and drop gesture. The drag and drop gesture can be accomplished, for example, by touching the display over the image of the visual object and sliding a finger on the AR display and/or touching a finger and moving the AR device/camera itself relative to the secondary display.

When the AR interface is used to move an enabled object near an edge of the canvas or physical boundary of the secondary display, the object as shown on the secondary display can be made to disappear from the secondary display to be replaced by a virtual object shown only on the AR interface in a similar location. The virtual object, nevertheless, can retain an association with the secondary display and, for example, be displayed in the AR interface in a location and pose that visually appears in the same plane as the plane of the secondary display, but outside the physical boundary of the secondary display.

The AR interface can be used to move a virtual object associated with the secondary display from outside the physical boundary onto or back onto the canvas. In this case, the virtual object can be made to disappear from the AR display to be replaced by a visual object shown on the secondary display. The user, for example, can use a single motion to drag a virtual object using the AR interface from outside the canvas onto the canvas and then drop the object in a desired location on the canvas. As the object is being dragged onto the canvas, the virtual object disappears from the AR interface but then appears as a visual object on the secondary display. At the transition, the object switches from being rendered through the AR device display, to being shown on the secondary display, where the displayed object is then captured by the AR device camera and shown in the AR interface in substantially the same relative location from which it disappeared from the AR display.

Virtual objects that are not yet associated with the secondary display can be dragged within the AR interface near or onto the canvas of the secondary display. A user gesture, such as dropping the virtual object near or on the front of the secondary display, can be used to associate the virtual object with the secondary display. Another user gesture, such as selecting the already associated virtual object through the AR interface and then physically moving the AR device towards the secondary display (mimicking a physical push action), can be used to transform the virtual object from floating just above or on the canvas of the secondary display to being shown as a visual object directly on the secondary display. The association and transfer to from the AR display to the secondary display can alternatively be combined into a single user action or gesture.

We disclose a cross-domain interaction model for ubiquitous augmented reality applications. This model leverages AR-enabled devices to visualize the flow of digital content between computing systems, using congruent spatial metaphors to make the interaction with complex computer systems more intuitive. This augmented intersection of realities (hereinafter "AIR") model augments the intersection of the digital and the physical domains, allowing users to seamlessly move content between previously disjoint spaces. The way we interact with a computer's digital space is disconnected from the way we interact with the physical space around us. Augmented Reality (AR) introduces a new hybrid notion of space, where digital elements coexist within the physical domain. This presents an opportunity to change the way we interact with computers, using physical space as the medium through which we can interact with content.

We implemented a first application, HybridUI, which lets users transition 2D digital user interfaces between a digital display and its adjacent mixed reality space. We implemented a second application, ScreenToPrint, which extends the AIR model to accommodate 3D content, allowing users to extract a digital model from a computer's screen, drop it on a 3D printer, and print it. Our implementations of the proposed AIR model show that cross-domain interactions can be leveraged to reduce the number of context switches a user must undergo to interact with a system of smart devices, using AR to create a seamless flow between previously disjoint domains that mimics the intuitive spatial metaphors of real world interaction.

In accordance with one embodiment, a method can be performed by two or more computer systems each of which computer systems includes at least one processor and a memory. The method can include: a first of the computer systems displaying a graphical object on a first display; causing the capturing a live video scene with a camera, wherein the live video scene shows the first display and the graphical object on the first display; a second of the computer systems determining, based on analysis of the captured live video scene, that the live video scene shows the first display; based on the determining that the live video scene shows the first display, the second of the computer systems: obtaining a specification of the graphical object, and instantiating the graphical object in a memory for use in a displaying of the graphical object on a display; and in response to a first user input to the second of the computer systems: the second of the computer systems displaying the instantiated graphical object on a second display as a virtual object in an augmented or mixed reality environment, wherein the graphical object is overlaid on a background comprising a live view of the first display, and wherein the graphical object is displayed in on the second display registered in alignment with the display of the graphical object on the first display in the background, and contemporaneously with the second of the computer systems displaying the instantiated graphical object on the second display, the first of the computer systems removing the graphical object from the first display.

The graphical object can be displayed on the first display overlaying a computer-recognizable target background displayed on the first display. The second of the computer systems can display a portion of the captured live video scene on the second display as the background. The second of the computer systems can obtain the specification of the graphical object from the first of the computer systems. The method can further include, based on the determining that the live video scene shows the first display, the second of the computer systems further: initiating communication with the first of the computer systems, and in response to initiating the communication, receiving an identification of the graphical object. The first user input can include a selection of the graphical object displayed on the first display. The second display can be a display screen of a mobile device including the camera and executing an augmented reality application. The second display can be a display of a mixed reality device including the camera and executing a mixed reality application. The graphical object can be a three-dimensional graphical object, the first display can be a holographic display, and the three-dimensional graphical object can be displayed in three dimensions on the first display. The method can further include, in response to a second user input to the second of the computer systems, manipulating the graphical object to alter the appearance of the graphical object on the second display. The manipulating can include one or more of: resizing, reorienting, and repositioning. The method can further include: determining, based on analysis of the captured live video scene, that the live video scene shows a printer; determining, based on analysis of the captured live video scene, that the graphical object on the second display at least partially overlaps the printer in the live video scene; and in response to a second user input received while the graphical object on the second display at least partially overlaps the printer in the live video scene, causing the printer to create a physical representation of the graphical object. The printer can be a three-dimensional printer. The printer can be a two-dimensional printer that produces a printout on paper. The graphical object can be a three-dimensional graphical object, and in response to the first user input, the graphical object can be moved, over a period of time, through a plane representing a junction between the first display and the second display, and as the graphical object passes through the plane, the graphical object can be progressively displayed on the second display and removed from the first display. The graphical object can be a three-dimensional graphical object, the first display can be a two-dimensional computer display monitor, and the three-dimensional graphical object can be displayed in two dimensions on the first display.

In accordance with one embodiment, a method can be performed by one or more computer systems each of which computer systems includes at least one processor and a memory. The method can include: in response to a first user input, instantiating an initial instance of a graphical object on a first display as a virtual object in an augmented or mixed reality environment, wherein the graphical object is graphically overlaid on a live background scene; causing the capturing of a live video scene with a camera, wherein the live video scene includes a portion of the live background scene; determining, based on analysis of the captured live video scene, that the live video scene shows a second display; based on the determining that the live video scene shows the second display: obtaining a specification of the graphical object, and instantiating the graphical object in a memory for use in a displaying of the graphical object on the second display; determining, based on analysis of the captured live video scene, that the graphical object on the first display at least partially overlaps the second display in the live background scene; and in response to a second user input received while the graphical object on the first display at least partially overlaps the second display in the live background scene: displaying the instantiated graphical object on the second display in a position such that the display of the graphical object on the first display is registered in alignment with the display of the graphical object on the second display in the live background scene, and contemporaneously with the displaying the instantiated graphical object on the second display, removing the graphical object from the first display.

The first user input can include a selection from a menu of graphical object types. The method can further include, in response to a third user input received prior to the second user input, manipulating the graphical object to alter the appearance of the graphical object on the first display. The manipulating can include one or more of: resizing, reorienting, and repositioning. The second user input can include a selection of the graphical object displayed on the first display. The second user input can include a release of a select and hold of the graphical object displayed on the first display. The first display can be a display screen of a mobile device including the camera and executing an augmented reality application. The first display can be a display of a mixed reality device including the camera and executing a mixed reality application. The second display can be a holographic display. A portion of the captured live video scene can be displayed on the first display as the live background scene.

A system can include the one or more computer systems, wherein the memories of the one or more computer systems collectively store computer code that, when executed, causes the one or more computer systems to perform any of the foregoing methods.

One or more non-transitory computer-readable media can store computer code that, when executed by the one or more computer systems, cause the one or more computer systems to perform the any of the foregoing methods.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 57 illustrates how HybridUI Servers can mediate communication between mobile and HMI clients.

FIG. 60 illustrates a method 6000 in accordance with one embodiment.

FIG. 61 illustrates a method 6100 in accordance with one embodiment.

DETAILED DESCRIPTION

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted.

0. OVERVIEW AND EXAMPLES

Figure 1:
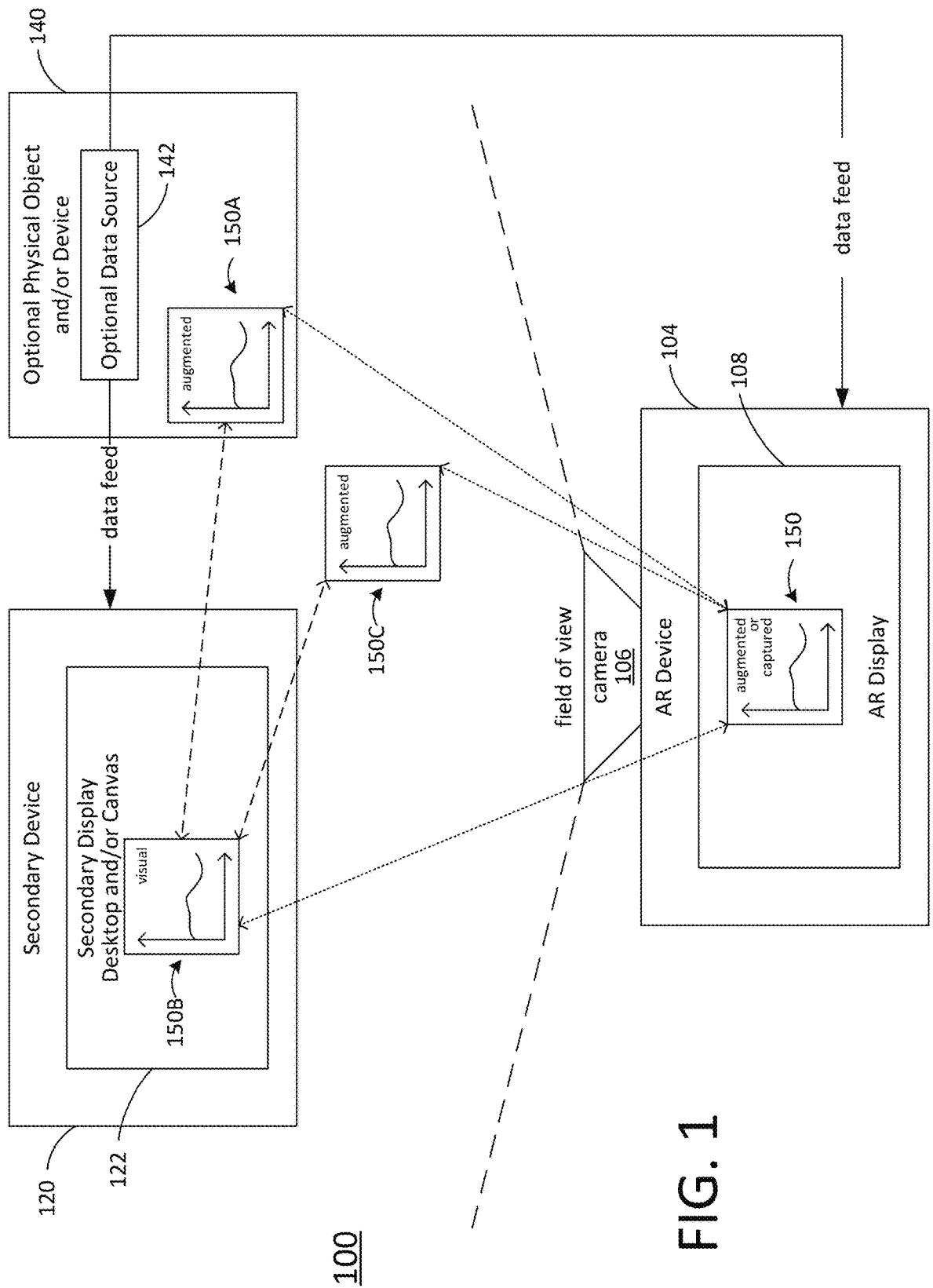
FIG. 1 illustrates a schematic overview of a system for manipulating visual objects on a secondary display through an AR interface in accordance with one embodiment.

FIG. 1 illustrates a schematic overview of a system 100 for manipulating visual objects on a secondary display through an AR interface in accordance with one embodiment. An AR device 104 is outfitted with a camera 106 and a display 108. The AR device can be any device configured for operating an AR application, such as, for example, a mobile phone, tablet computer, AR headset, or mixed reality glasses.

A secondary device 120 is configured to operate or drive a secondary display 122, which in turn can show a desktop or canvas upon which the secondary device displays content to be viewed by a user. The secondary device 120 can be any type of computing device, such as a general purpose computer. The secondary display 122 can be any type of display capable of being driven by a computer. The secondary device 120 and the secondary display 122 can be integrated, such as in a form of a tablet computer or smart TV or separate such as a desktop computer with a separate monitor. In order to enable the AR device 104 to recognize the secondary display 122, the secondary device 120 can be configured to display a pattern or identifiable image on the desktop or canvas of the secondary display 122, which the AR device 104 can in turn use to identify and locate the secondary display. Alternatively or in addition, the secondary device 120 can transmit to the AR device 102 the image currently being displayed on the secondary display 122, which the AR device 104 can in turn use to identify and locate the secondary display.

The system can also include a physical object or device 140 that can be recognized by the AR device 104 in order to support the overlaying of AR content within an AR interface relative to the captured camera image of the object or device. The object 140 can be static or non-operable, such as a wall or building, or it can be a simple or complex operable device, such as a tool or machine. The AR device 104 can be configured to recognize the device 104 using an image of the device or by using machine-readable markers or codes, such a VuMark from PTC Inc. In the case that the device 140 is operable, includes sensors, or otherwise is able to capture, provide or gather data, the device 140 can operate as or be connected to a data source 142 (or a data sink). The data source 142 can be as simple as a sensor or as complex as a general purpose computer (e.g. used to drive a complex machine). The data source 142, in turn, can be accessed by the AR Device and used as a data feed that can support one or more virtual objects 150 displayed by the AR device on the AR display 108 in virtual space relative to the device 140. By way of example, the device 140 can be a motorized machine, the data feed 142 can be a measured speed of the motor, and the AR device can be configured to display a virtual object 150 on the AR display showing a time based graph of the motor speed.

AR device 104, the secondary device 120, and the data source 142 can be configured to operate in communication with each other to support shared augmented reality functionality, which, in one embodiment, can be implemented using the Reality Editor system discussed in the background, above, as a platform. In accordance with a Reality Editor-based implementation, each of the AR device 104 and the secondary device 120 execute a web server that serves pages dynamically to a local web browser on each device in order to display the contents of their respective displays. The AR device web server acts as a master and controls, in response to user input, virtual objects, which can in turn be transferred, as visual objects 150B, to the secondary device web server, acting as a slave. The AR device web server can recognize the visual objects as displayed on the secondary display 122 and captured by the camera 106. Based on user input relative to the recognized objects (as shown on the AR display via the camera feed), the AR device can send instructions to the secondary device web server in order to manipulate the visual objects. Based on user input, a visual object 150B can also be retrieved from the secondary device web server and again displayed as a virtual object 150C in augmented reality space.

FIGS. 2 through 32 A and/or B show a series images from an AR session illustrating various features in accordance with one embodiment. Figures labelled A show screen captures from the display of a mobile phone (AR view) which show icons and augmented reality features supported by the Reality Editor AR framework overlaid over the phone's camera view. Figures labelled B show frame captures from a video taken from a bystander's perspective (bystander view) contemporaneously with the AR view.

Figure 2A:
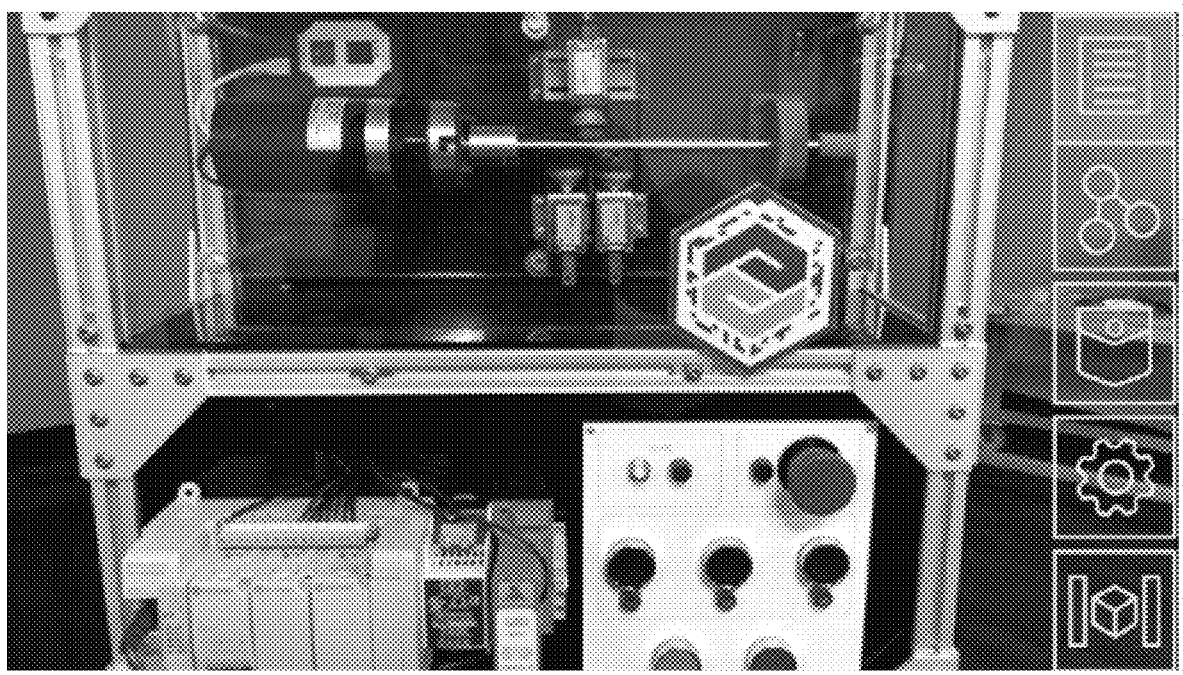
FIGS. 2A, 2B, 3A, 4A, 5A, 6A,7A, 8A, 9A, 10A, 10B, 11B, 12A, 13B, 14A, 15A, 16A, 17A, 18A, 18B, 19A, 20A, 21A, 21B, 22A, 22B, 23B, 24A, 25B, 26A, 27A, 28A, 29A, 30A, 31A, and 32A show a series of images from an AR session illustrating various features in accordance with one embodiment.

FIG. 2A shows the AR view showing a machine (physical object) with a motor and controls as captured by the phone camera. The AR view also shows a number of icons on the right that the Reality Editor (AR system) provides to create and manage virtual objects.

Figure 2B:

FIG. 2B shows the bystander view showing the user holding the phone in front of the machine, which is positioned to the viewer's right of a large secondary display.

Figure 3A:
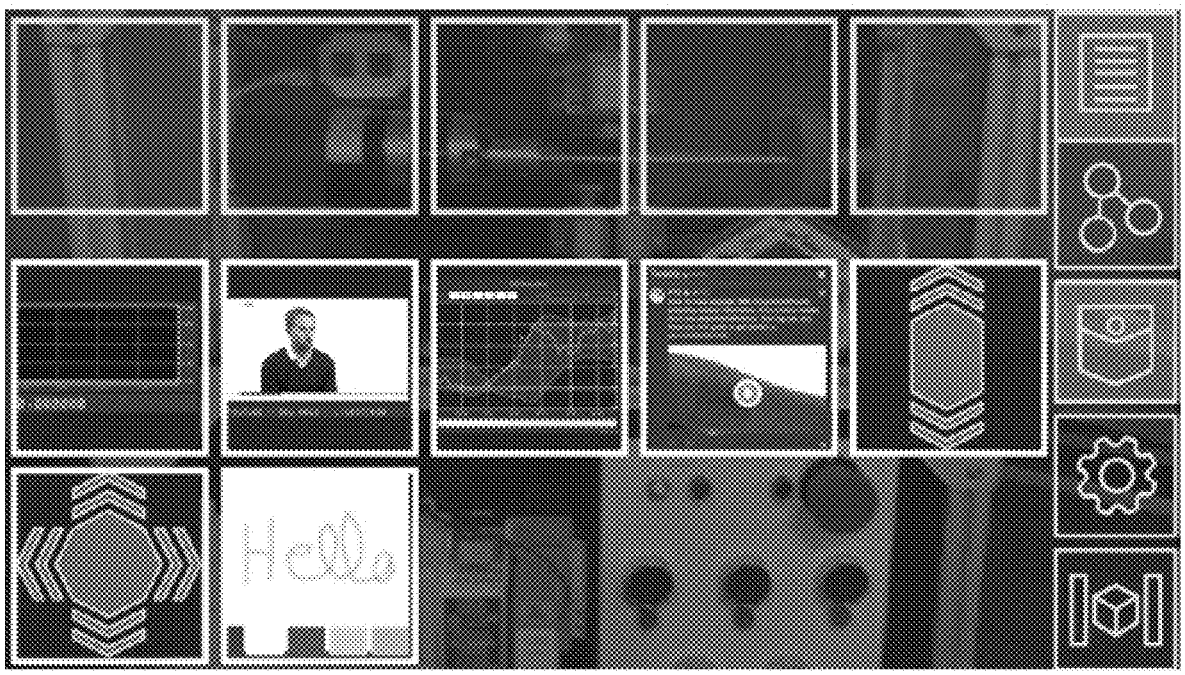

FIG. 3A shows the AR view of a menu of virtual object templates that have been accessed by the user by selecting the pocket icon on the right. The user then touches the first icon on the left from the middle row in order to instantiate a graph virtual object in a virtual space in front of the machine.

Figure 4A:
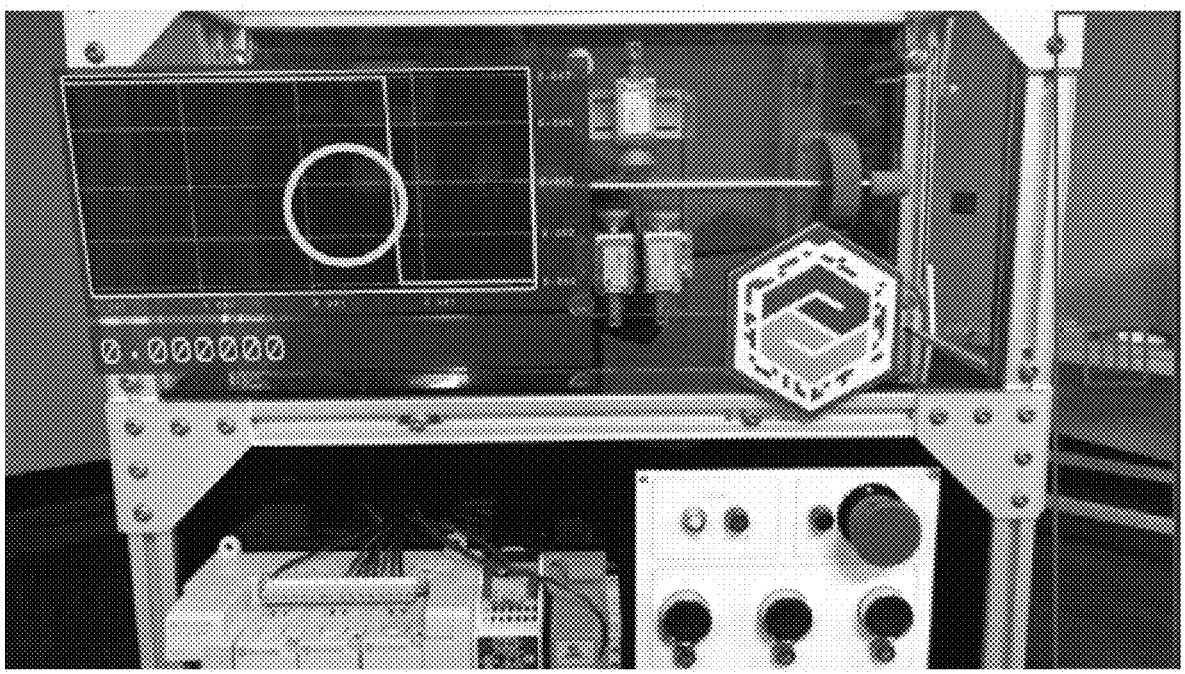

FIG. 4A shows the AR view once the graph virtual object has been instantiated and the user then drags the finger or moves the phone and releases the finger to anchor the virtual object in virtual space relative to the machine, which has been recognized by the AR system. The circle shows the location on the phone display being touched by the user.

Figure 5A:
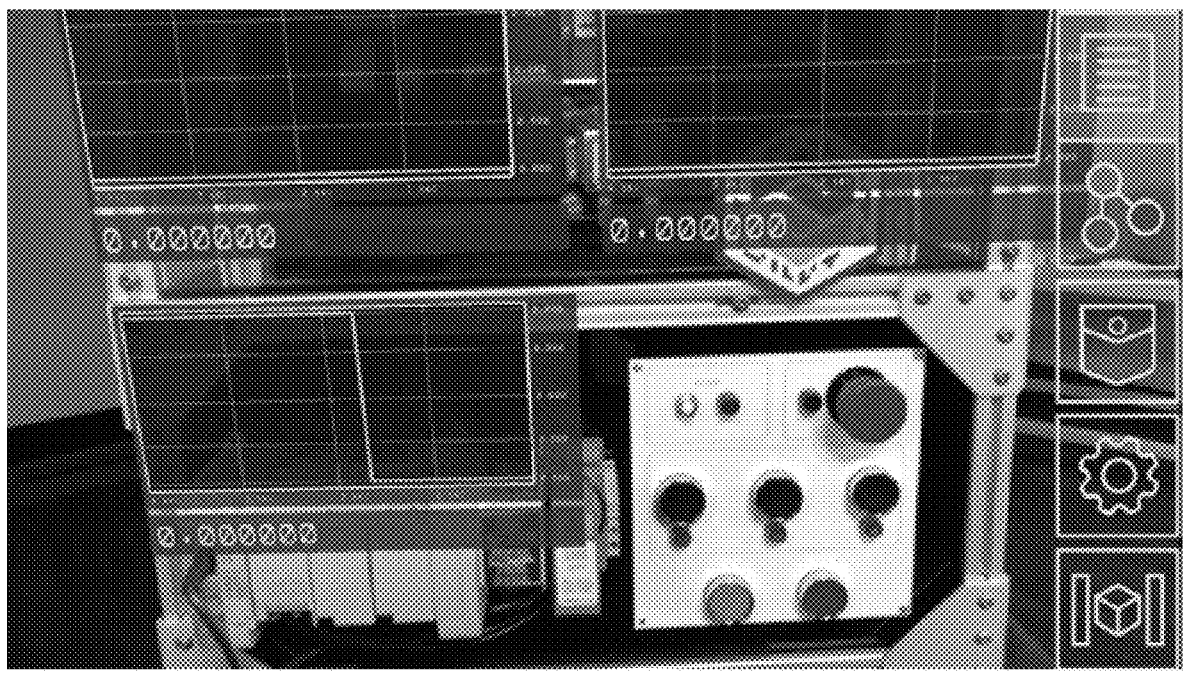

FIG. 5A shows the AR view once two additional virtual graph object have been instantiated and placed similarly.

Figure 6A:
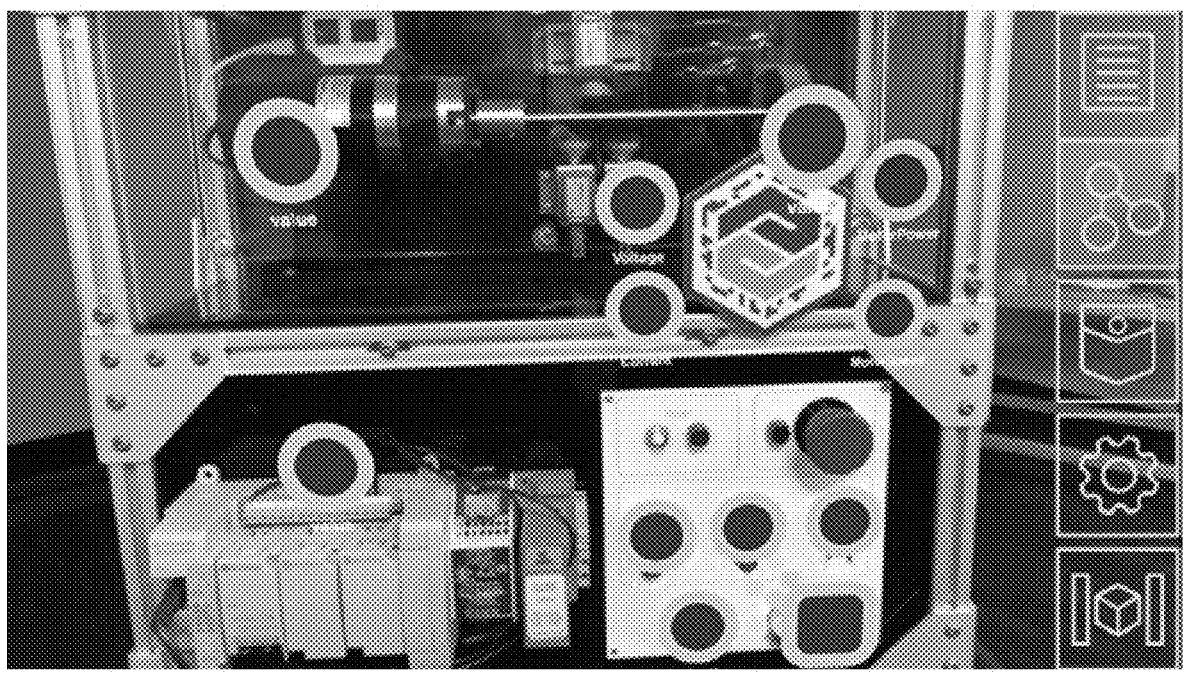

FIG. 6A shows the AR view once a node connection icon, second from the top on the right, has been selected by the user in order to associate the virtual graph objects with data feeds from the machine.

Figure 7A:
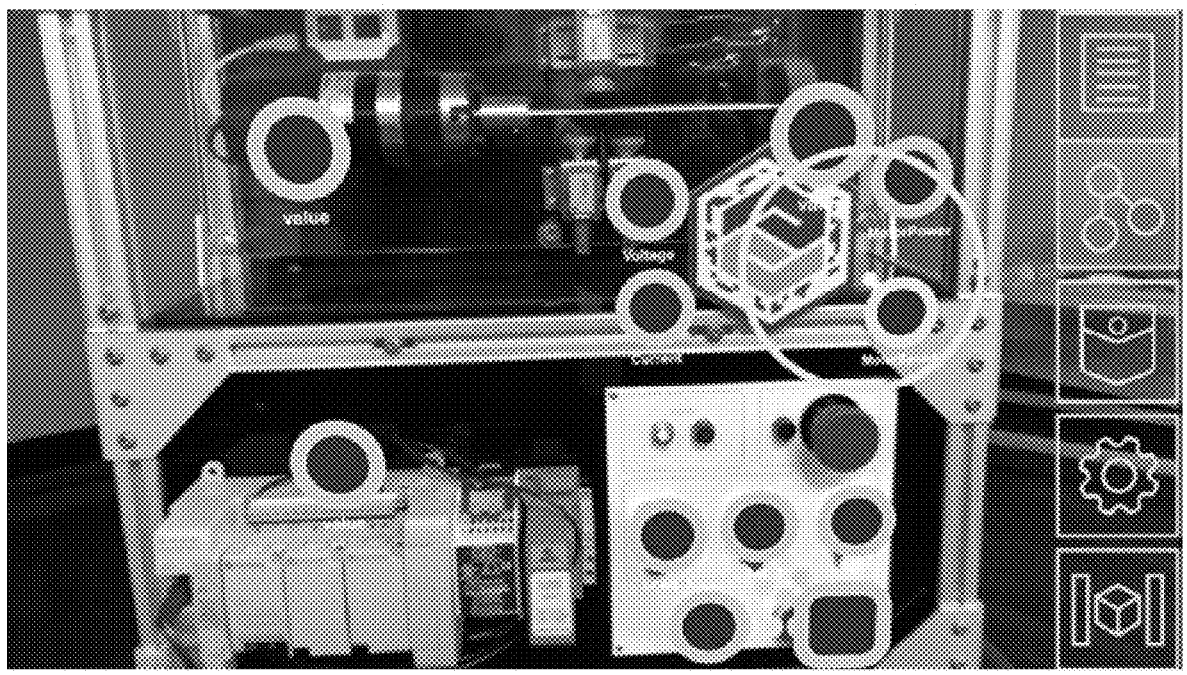

FIG. 7A shows the AR view just after a user selects a node icon labeled "motorspeed" and starts to drag towards the larger icon labelled "value" representing the virtual graph object on the upper right.

Figure 8A:
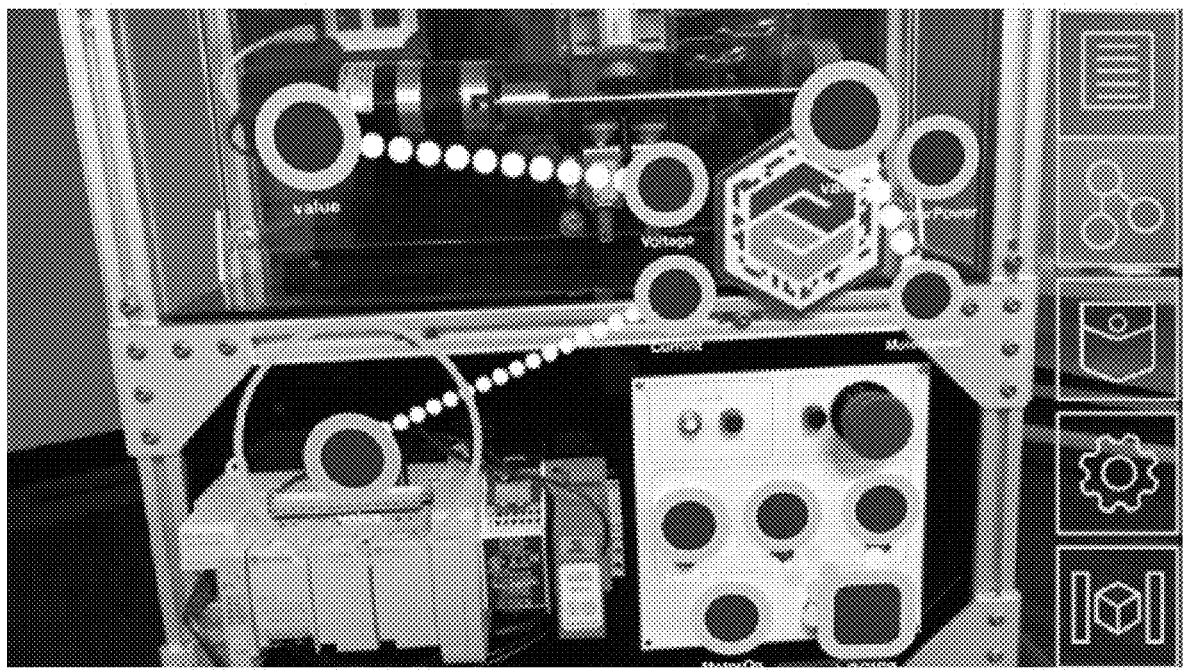

FIG. 8A shows the AR view just as the user completes connecting the "current" node to the virtual graph object on the lower left, and after the "voltage" node has been connected to the virtual graph object on the upper left.

Figure 9A:
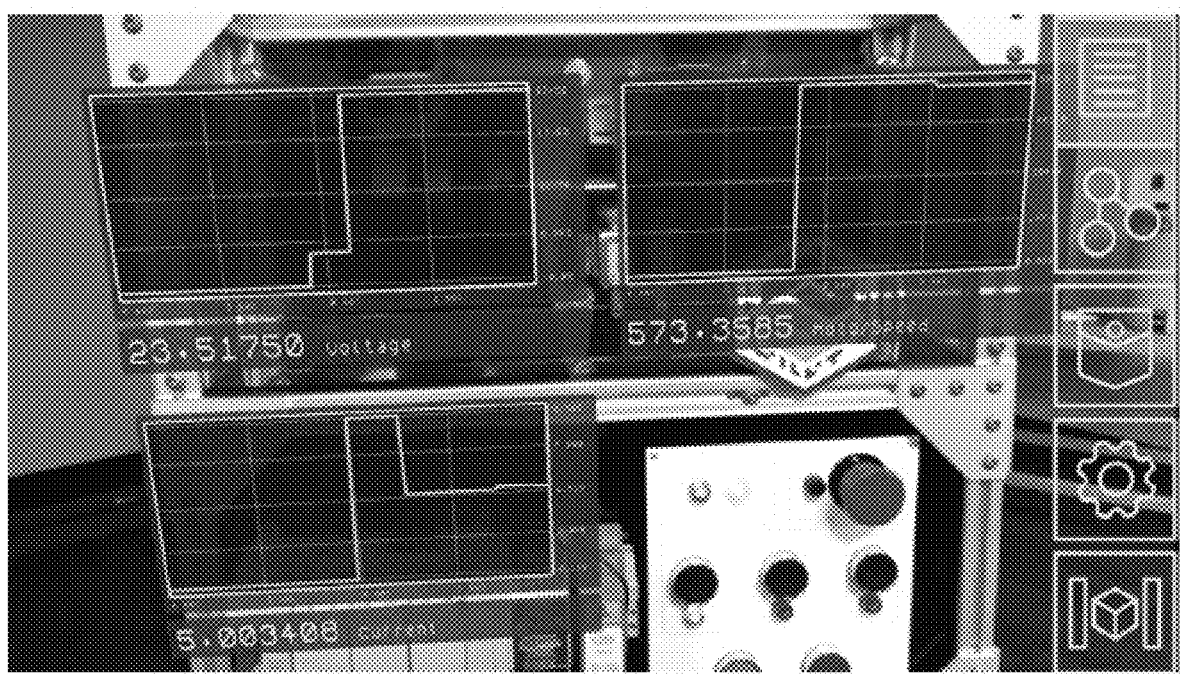

FIG. 9A shows the AR view once the virtual graph objects begin to receive and display data received from the machine.

Figure 10A:
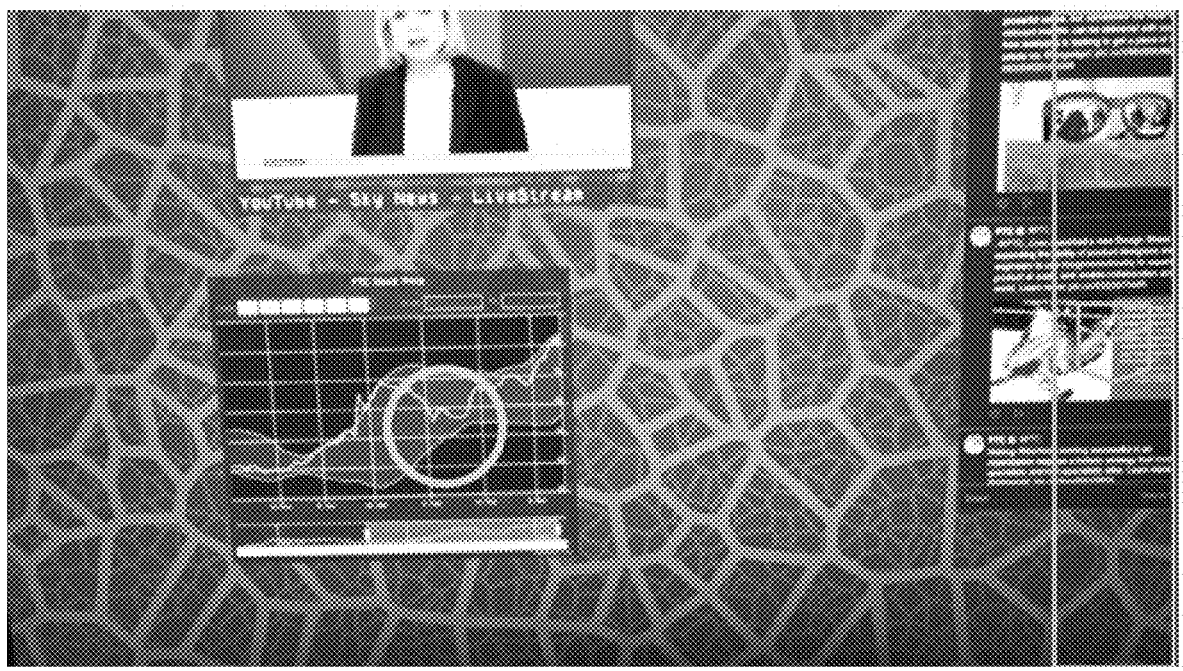
Figure 10B:
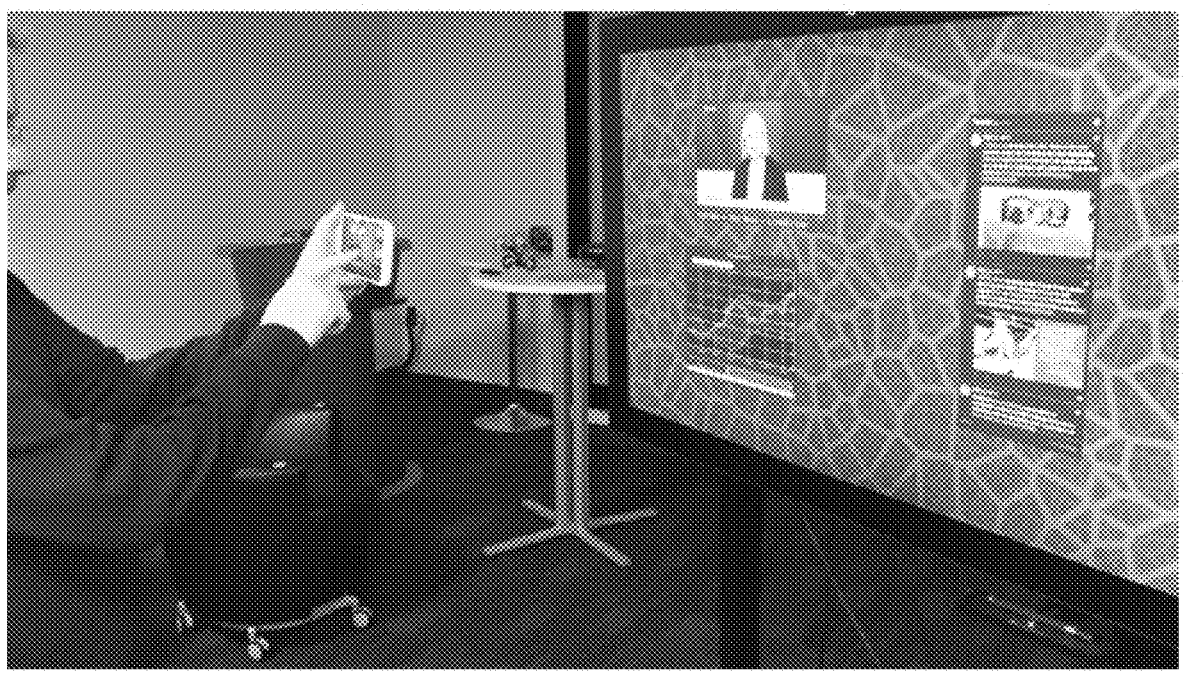

FIG. 10A shows the AR view and FIG. 10B shows the bystander view after the user has pointed the phone camera at the secondary display, which is displaying a number of visual objects that can be manipulated through the AR interface. The user has touched the phone screen directly over where the AR display shows one of the visual objects with several values being graphed. The AR system has recognized that the user has selected an object displayed by the secondary display and captured by the phone camera.

It should be noted that the secondary display has been configured to display a computer-recognizable target image as its desktop background, which appears in the illustrated image as a random number of shapes, in order to facilitate recognition and identification of the secondary display by the AR system.

Figure 11B:
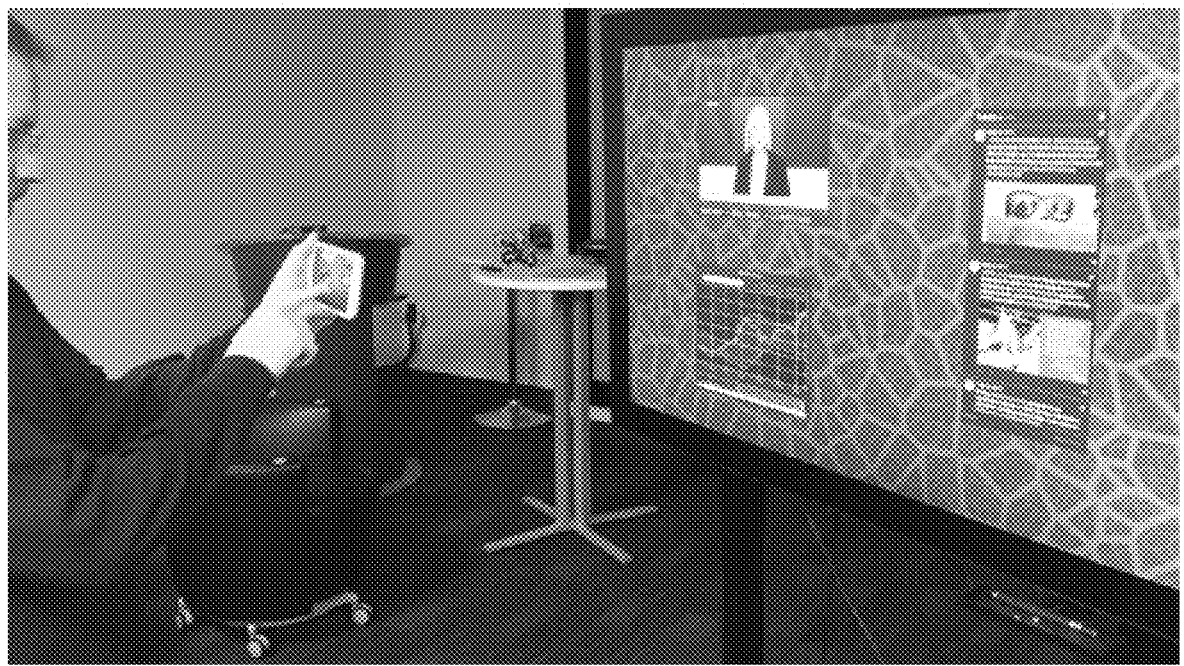

FIG. 11B shows from the bystander view how the visual object moves on the secondary display as the user drags a finger or moves the phone relative to the display.

Figure 12A:
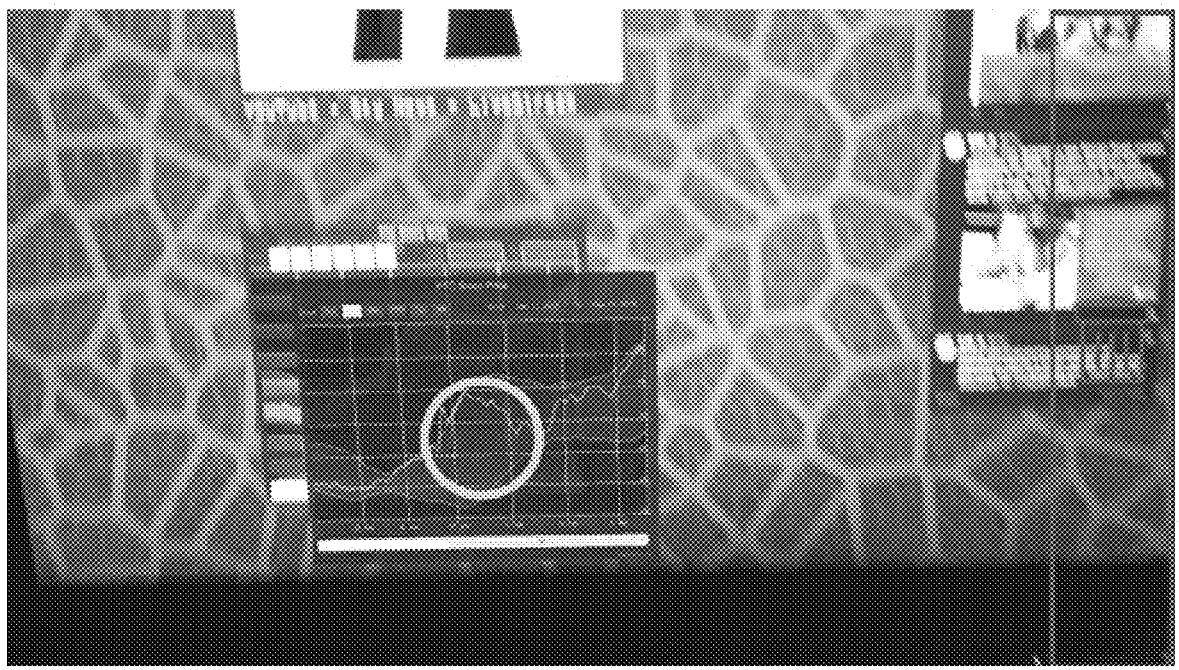

FIG. 12A shows from the AR view how, as the visual object approaches the boundary of the secondary display, the phone instantiates a new virtual object to take the place of the visual object. The visual object is to the upper left and does not appear as sharp as the virtual object, which is in the foreground of the AR display. Note that there can be some differences in how the visual object and the virtual object appear in their respective displays.

Figure 13B:

FIG. 13B shows from the bystander view how the visual object has now disappeared from the secondary display. It is now shown only as a virtual object on the AR view.

Figure 14A:
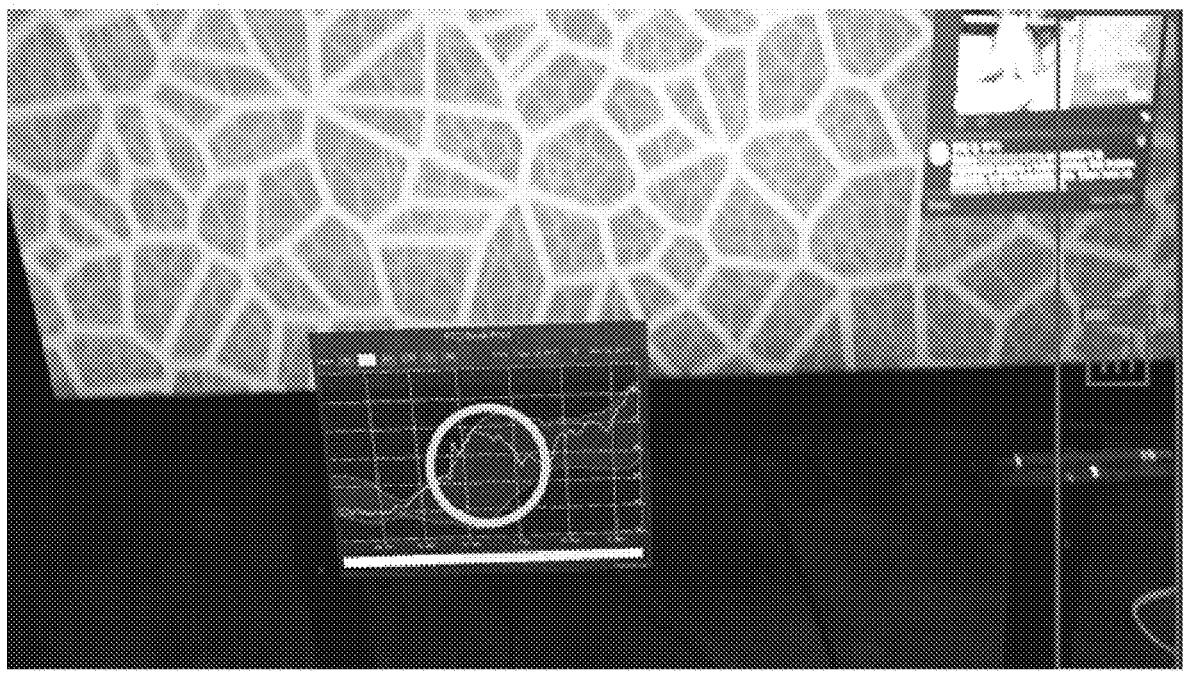

FIG. 14A shows from the AR view how the virtual object that has taken the place of the visual object from the secondary display, can be moved around in virtual space, such as below the secondary display.

Figure 15A:
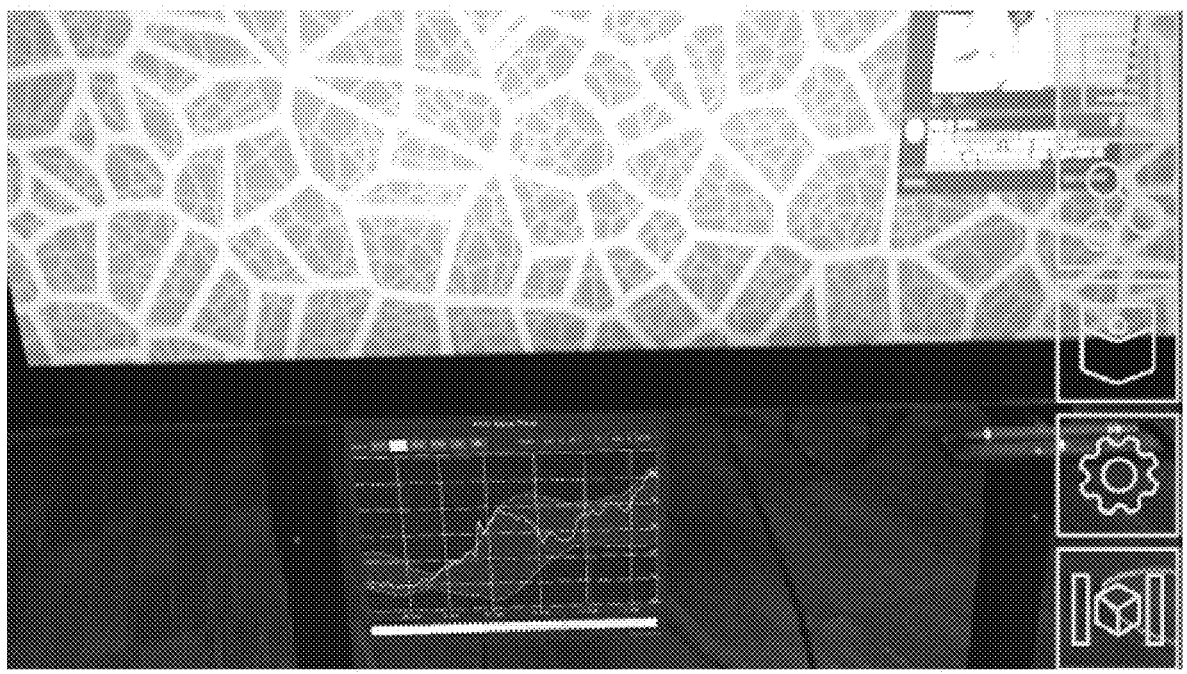

FIG. 15A shows from the AR view how the virtual object remains where it is left in virtual space after the user releases his touch from the mobile phone screen.

Figure 16A:
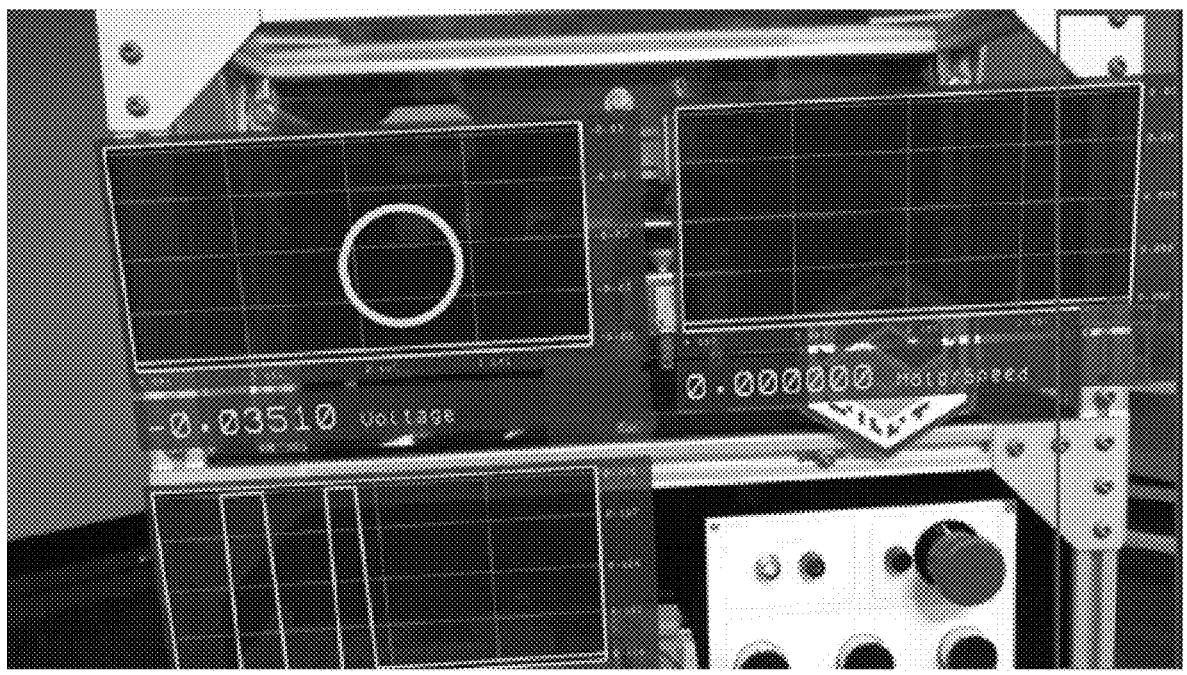

FIG. 16A shows the AR view after the user has again pointed the phone camera at the machine and selected, by touching the screen, the upper left virtual graph object.

Figure 17A:
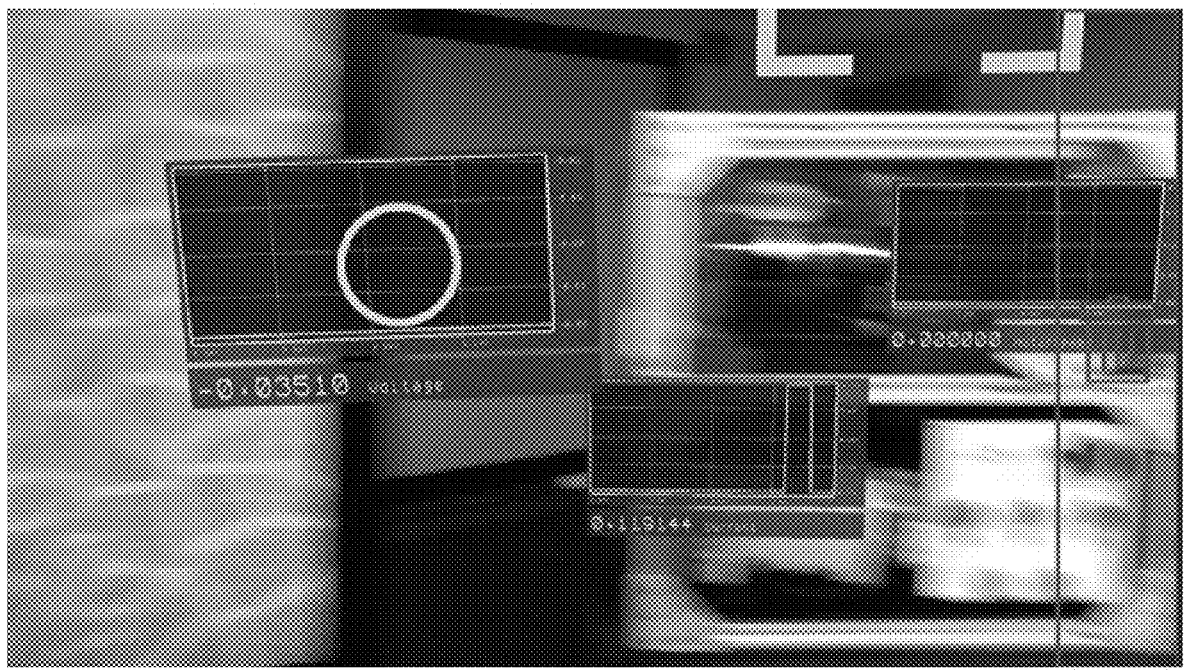

FIG. 17A shows from the AR view how the user can drag the virtual graph object by holding a touch on the phone display screen over the virtual object and reorienting the phone display screen.

Figure 18A:
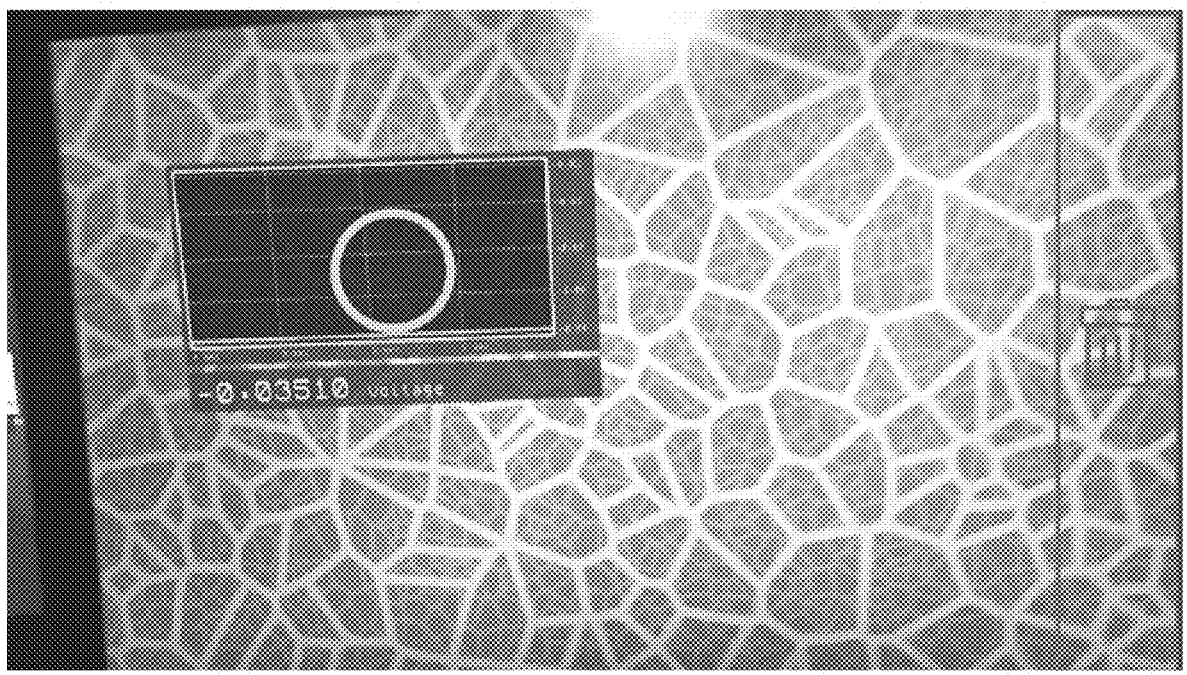
Figure 18B:
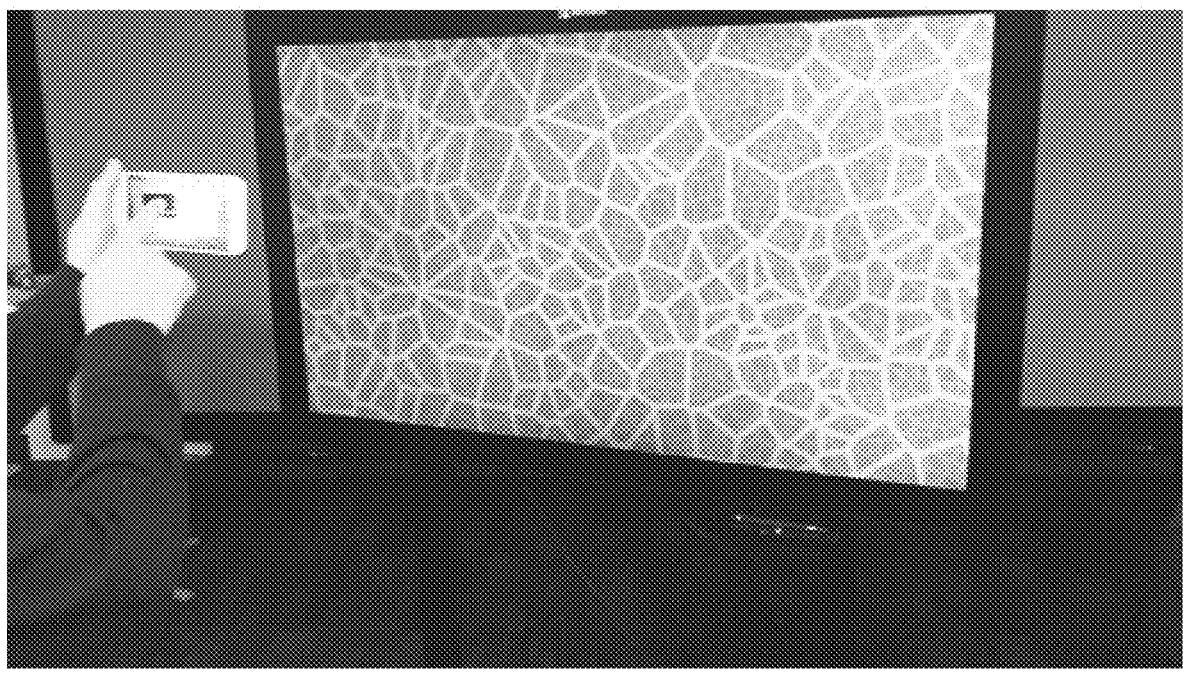

FIG. 18A shows from the AR view and FIG. 18B shows from the bystander view how the can user drag the virtual graph object over the secondary display by further manipulating the phone.

Figure 19A:
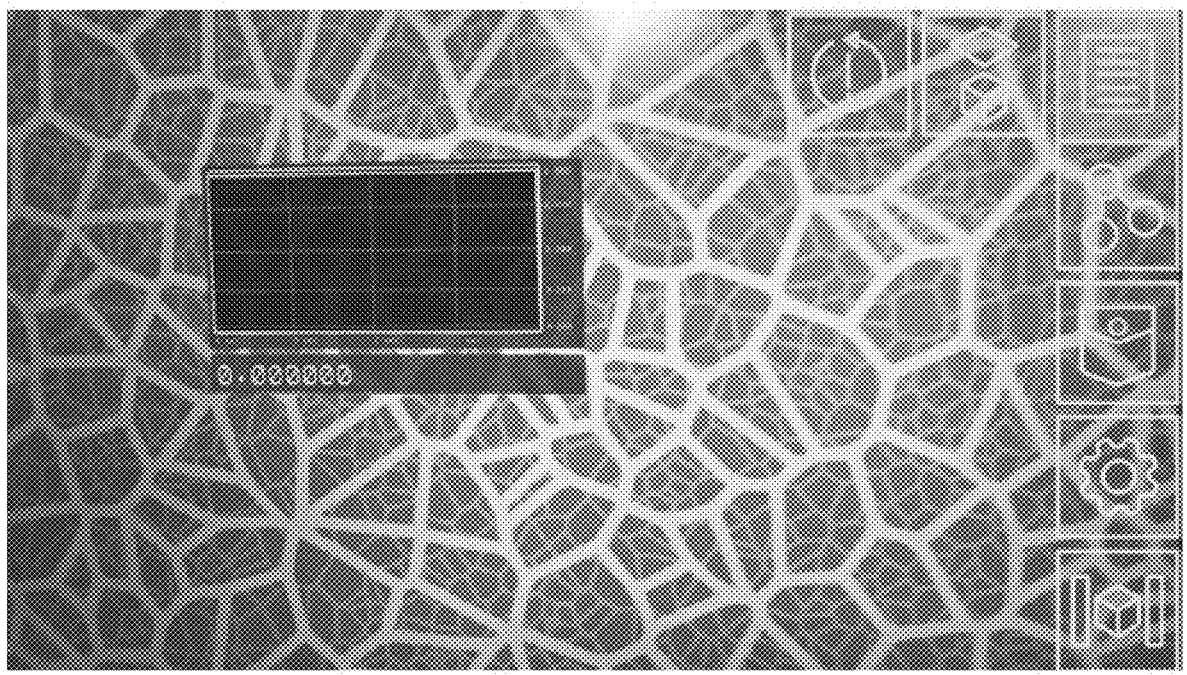

FIG. 19A shows from the AR view how the virtual graph object reorients itself relative to the plane of the secondary display as it becomes associated with the secondary display when the user releases his touch from the phone.

Figure 20A:
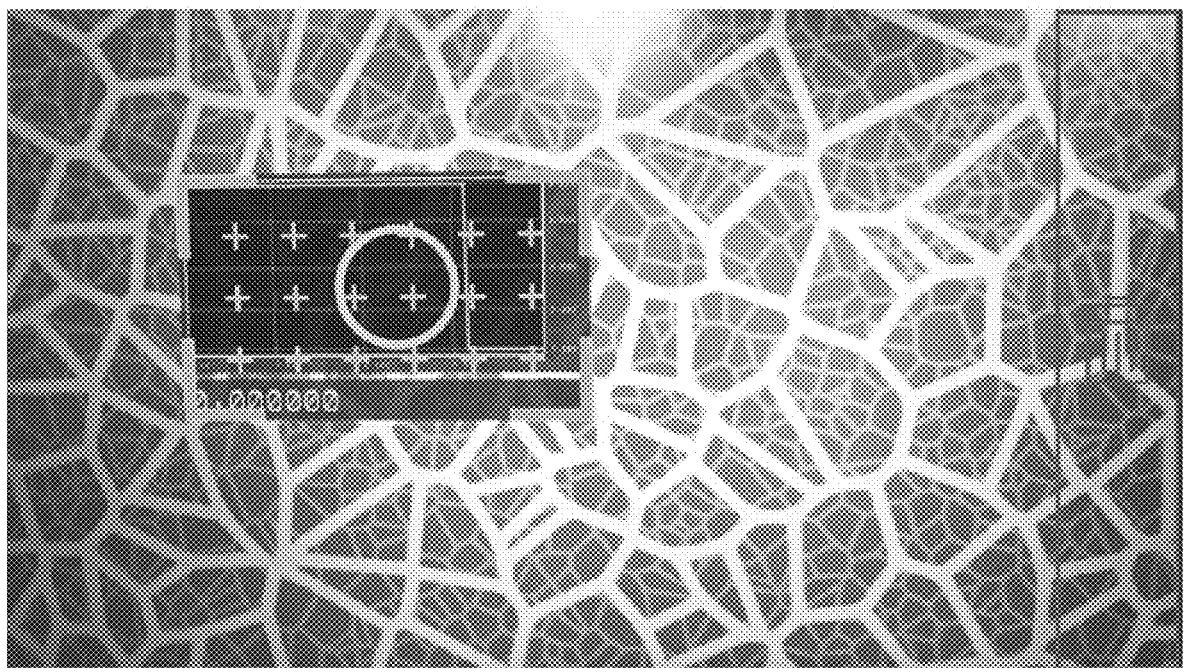
Figure 21A:
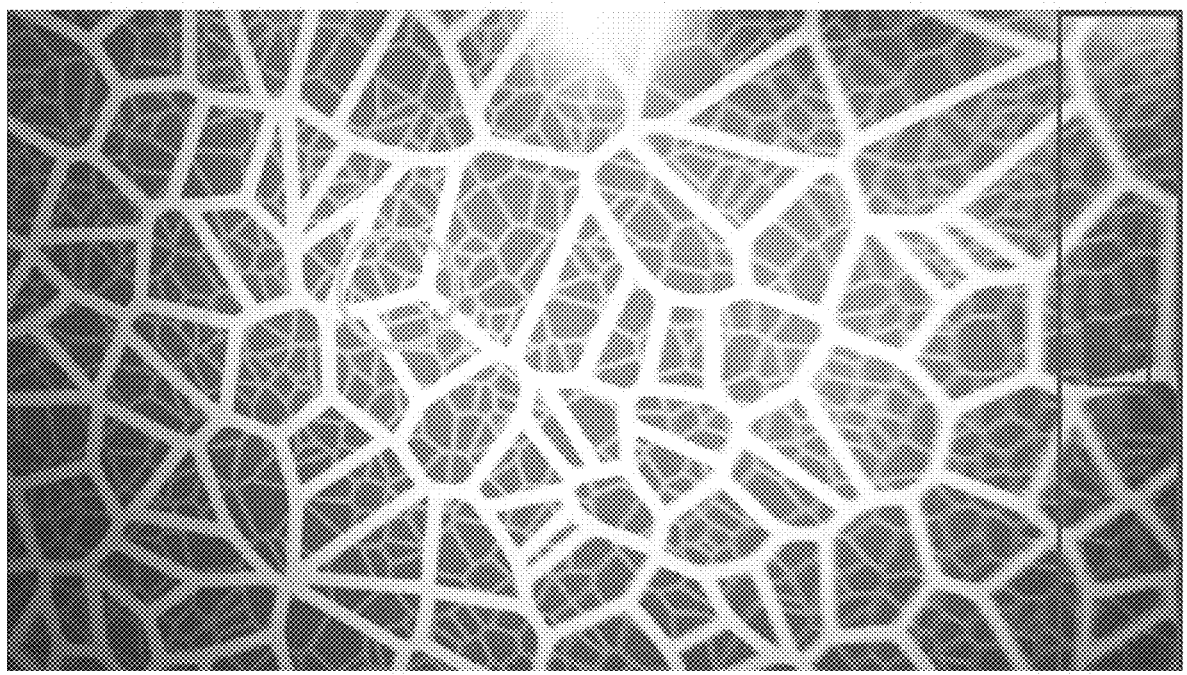
Figure 21B:
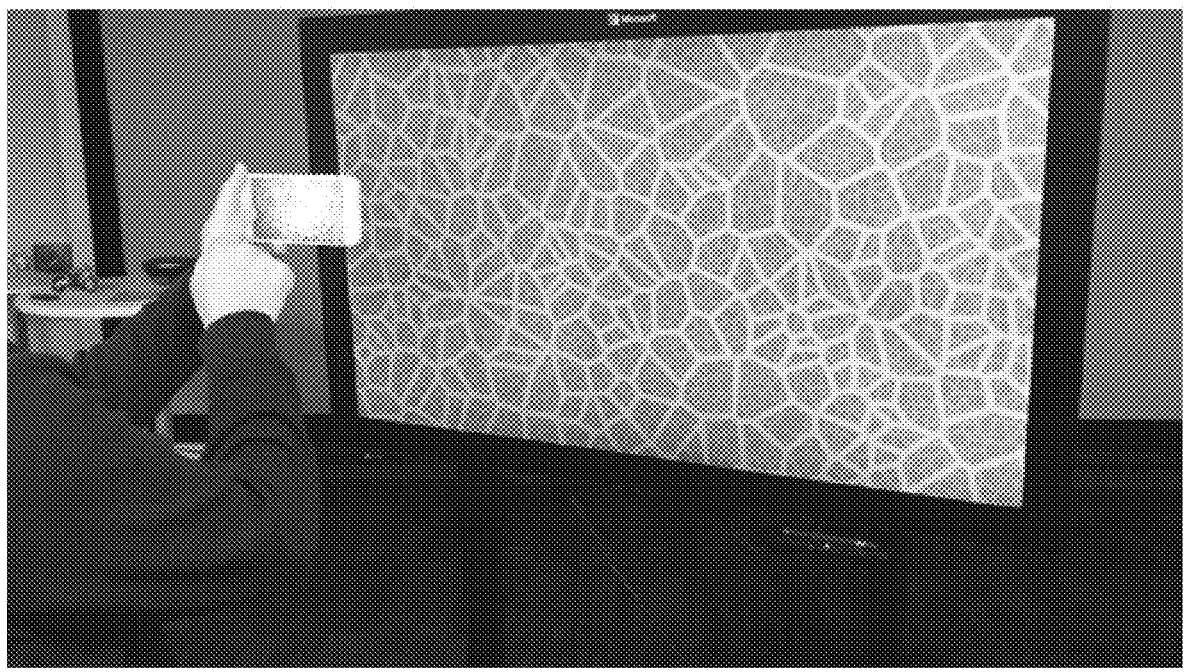
Figure 22A:
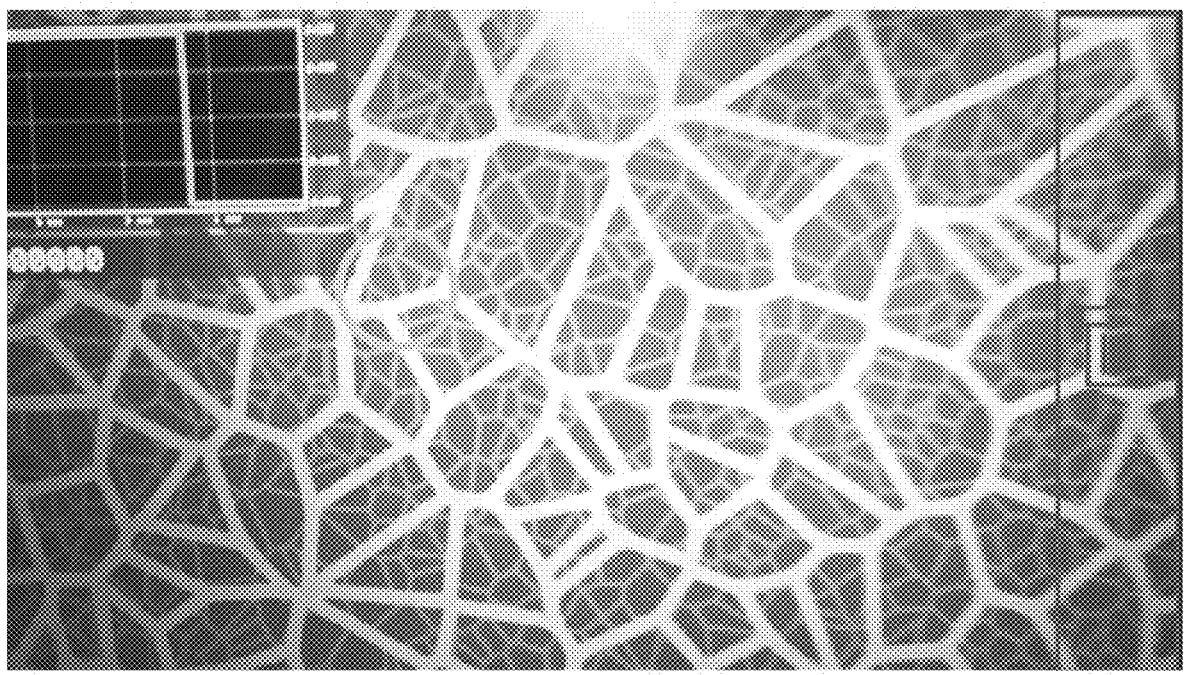
Figure 22B:
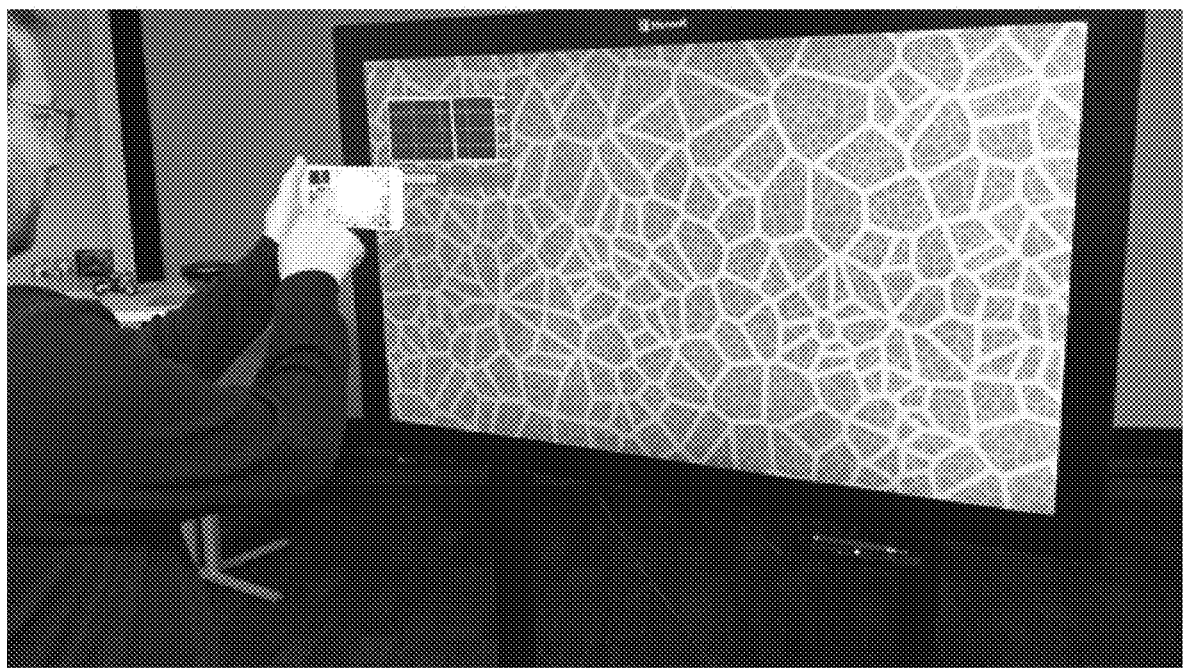

FIG. 20A shows from the AR view the user selecting the virtual graph object (by touching it)

FIGS. 21A-B and 22A-B then show the user moving the phone towards the secondary display in a gesture mimicking a push (as if pushing something into or towards the display), which causes the virtual object to disappear from the AR interface and then be displayed as a visual object on the secondary display. In response to the push gesture, the master web server operating on the phone transfers display capability of the formerly virtual object to the slave web server operating the secondary display.

Figure 23B:
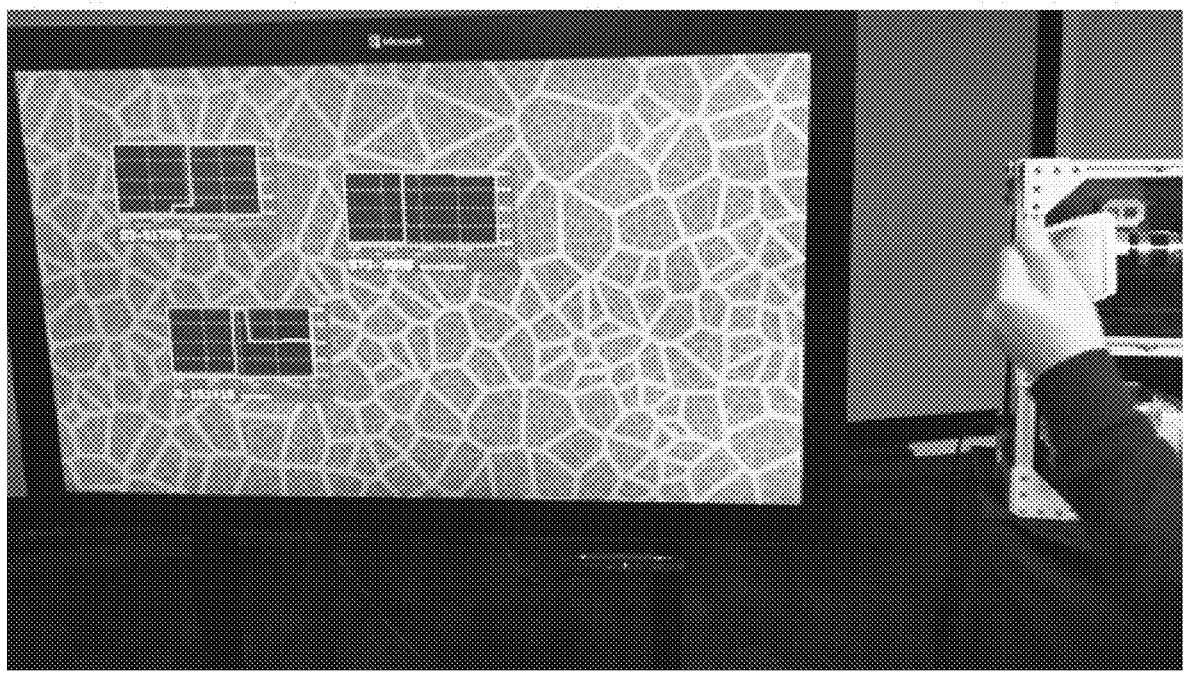

FIG. 23B shows the bystander view after the user has similarly moved the remaining two virtual graph objects onto the secondary display to be shown as visual objects.

Figure 24A:

FIG. 24A shows the AR view of the secondary display with the secondary display showing the three visual graph objects (formerly virtual graph objects). The AR view also shows two virtual objects, one to the left of the display and one below the display, that were formerly shown as visual objects on the secondary display, but moved off by the user.

Figure 25B:

FIG. 25B shows from the bystander view, the user touching the phone display in order to select the virtual object to the left of the display.

Figure 26A:

FIG. 26A shows the AR view as the user begins to move the virtual object, which is displaying a video feed, from the virtual space onto the secondary display.

Figure 27A:
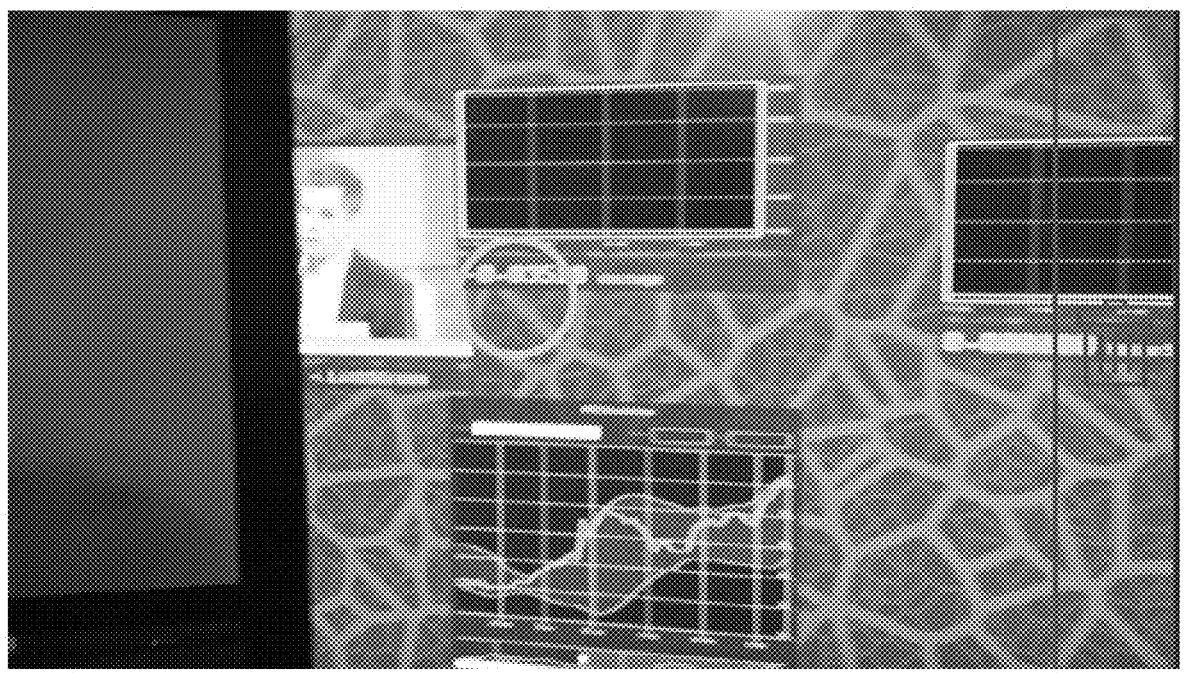

FIG. 27A shows the AR view just as the virtual object has disappeared from the AR display and is then shown as a visual object on the secondary display, overlapped by one of the graph visual objects.

Figure 28A:

FIG. 28A shows from the AR view how the user further manipulates the now visual object through the phone display to place the visual object on the upper right hand corner of the secondary display.

Figure 29A:

FIG. 29A shows the AR view after the user moves back from and to the side of the secondary display after placing the video feed visual object. There is one remaining virtual object that is still shown to the right of the secondary display and partially overlapping the view of the machine on the right.

Figure 30A:
Figure 31A:
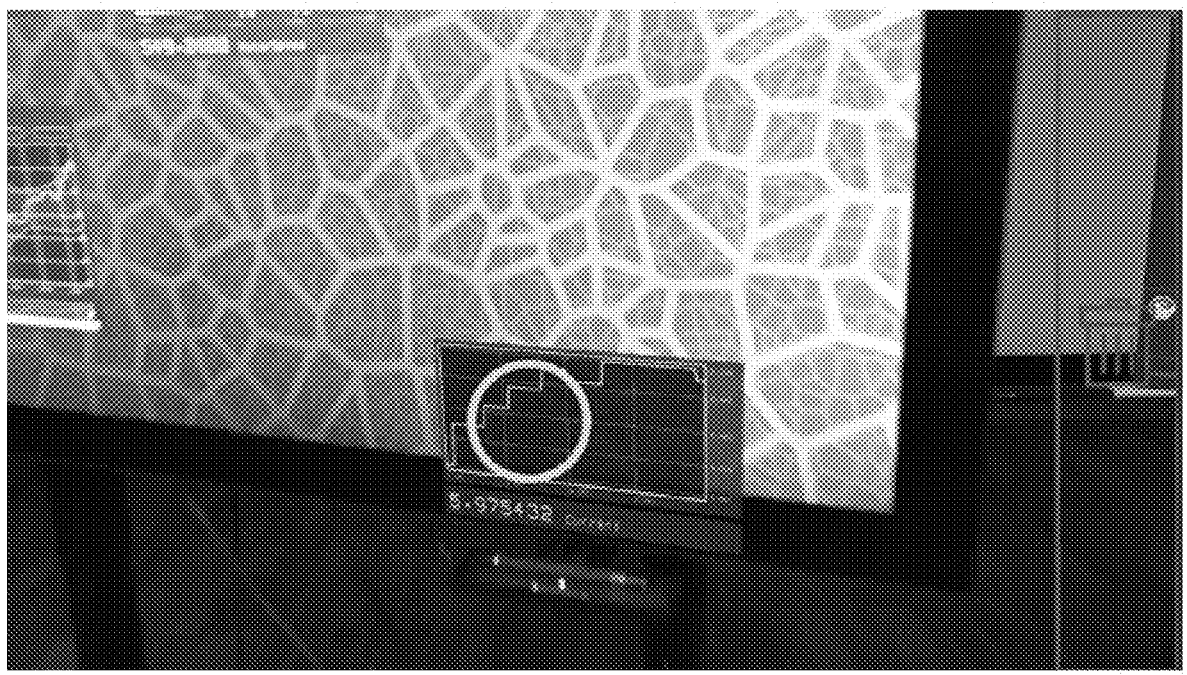
Figure 32A:
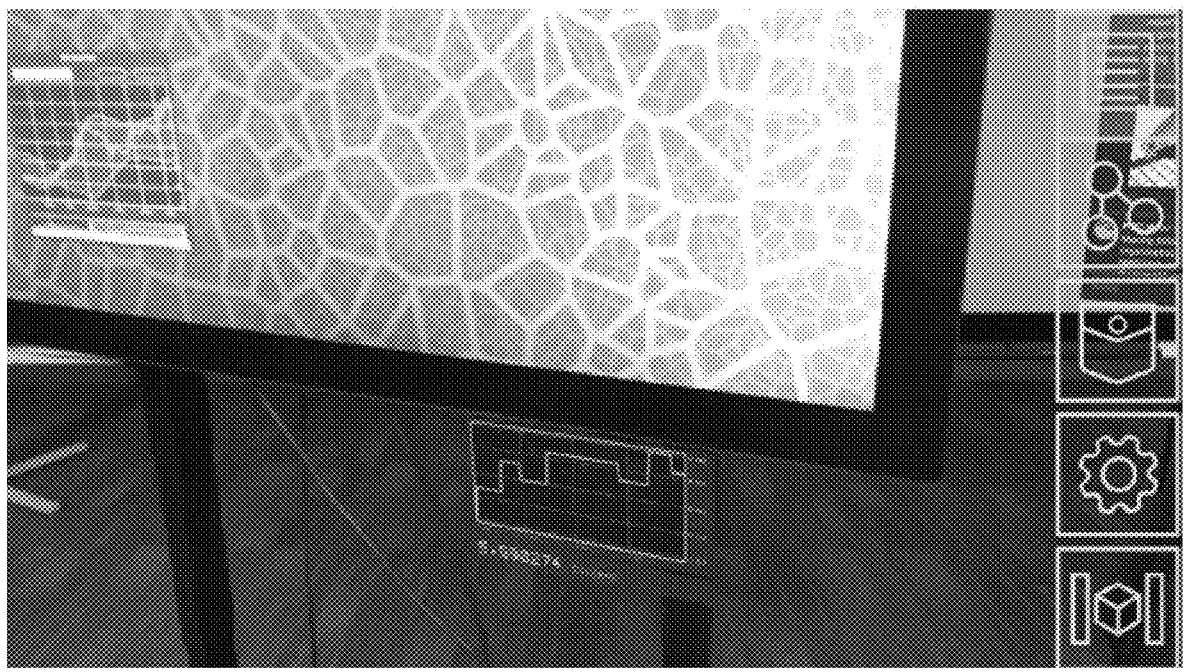

FIGS. 30A, 31A, and 32A from the AR view the user moving one of the visual graph objects off of the canvas of the secondary display, so that it disappears from the secondary display and is then shown below the secondary display again as a virtual graph object below the secondary display.

FIGS. 33 through 52 A and/or B show a series images from an AR session illustrating an example use of a Screen-ToPrint application, discussed below, in accordance with one embodiment. Figures labelled A show screen captures from the display of a mobile phone (AR view). Figures labelled B show frame captures from a video taken from a bystander's perspective (bystander view) contemporaneously with the AR view.

Figure 33B:
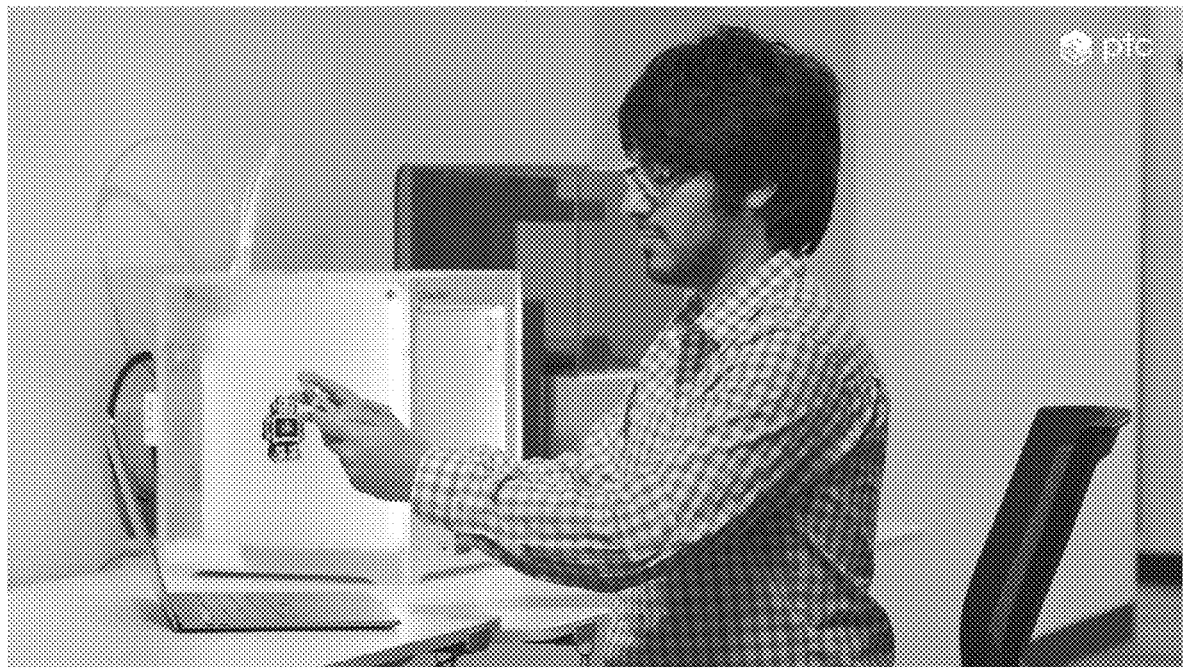
FIGS. 33B, 34B, 35B, 36B, 37B, 38B, 39A, 40A, 41A, 42A, 43A, 44A, 45A, 46A, 47A, 48A, 49A, 50B, 51B and 52B show a series images from an AR session illustrating an example use of a ScreenToPrint application, discussed below, in accordance with one embodiment.
Figure 34B:
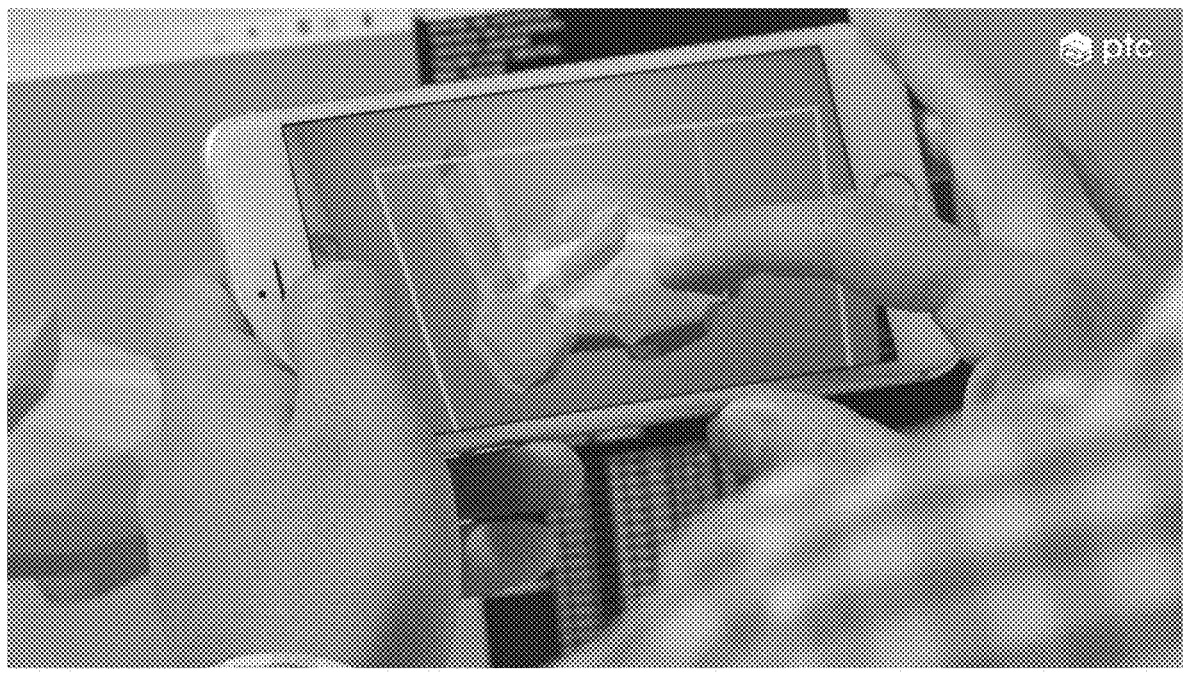
Figure 35B:
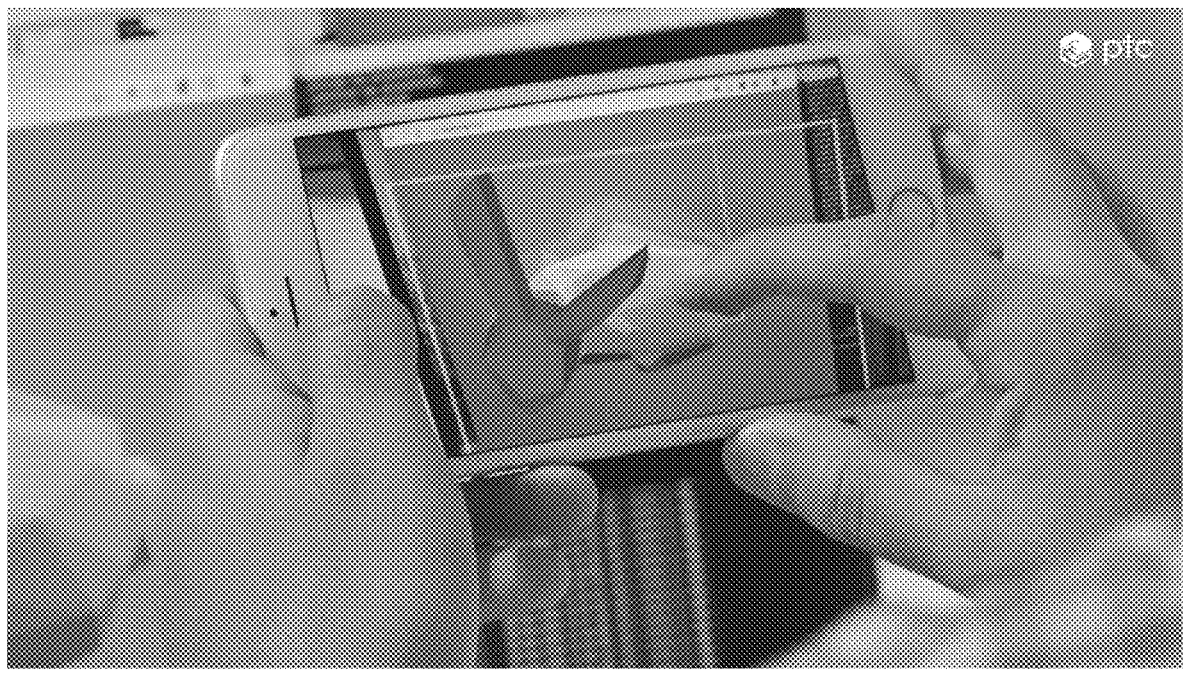
Figure 36B:
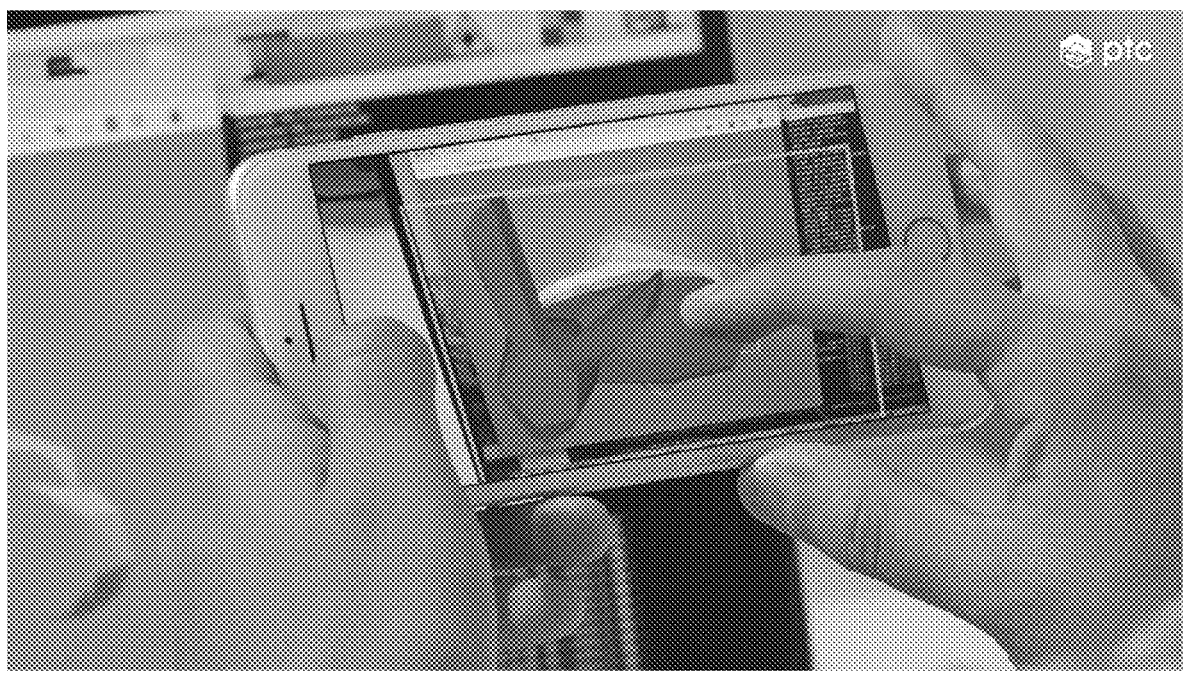
Figure 37B:
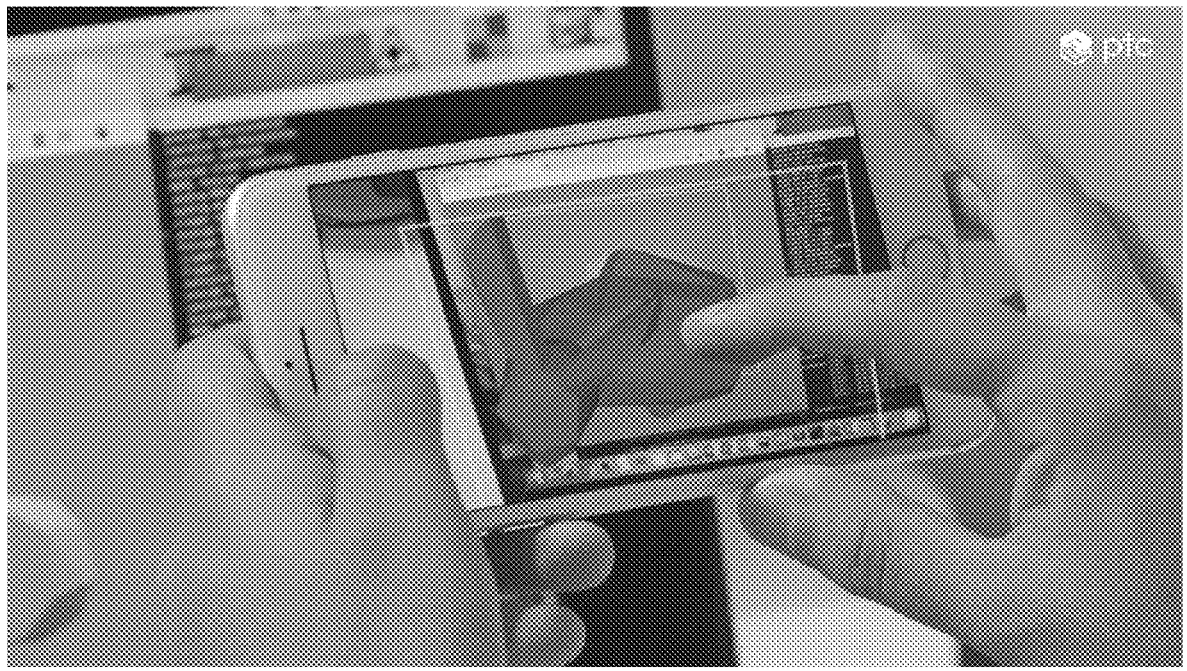
Figure 38B:
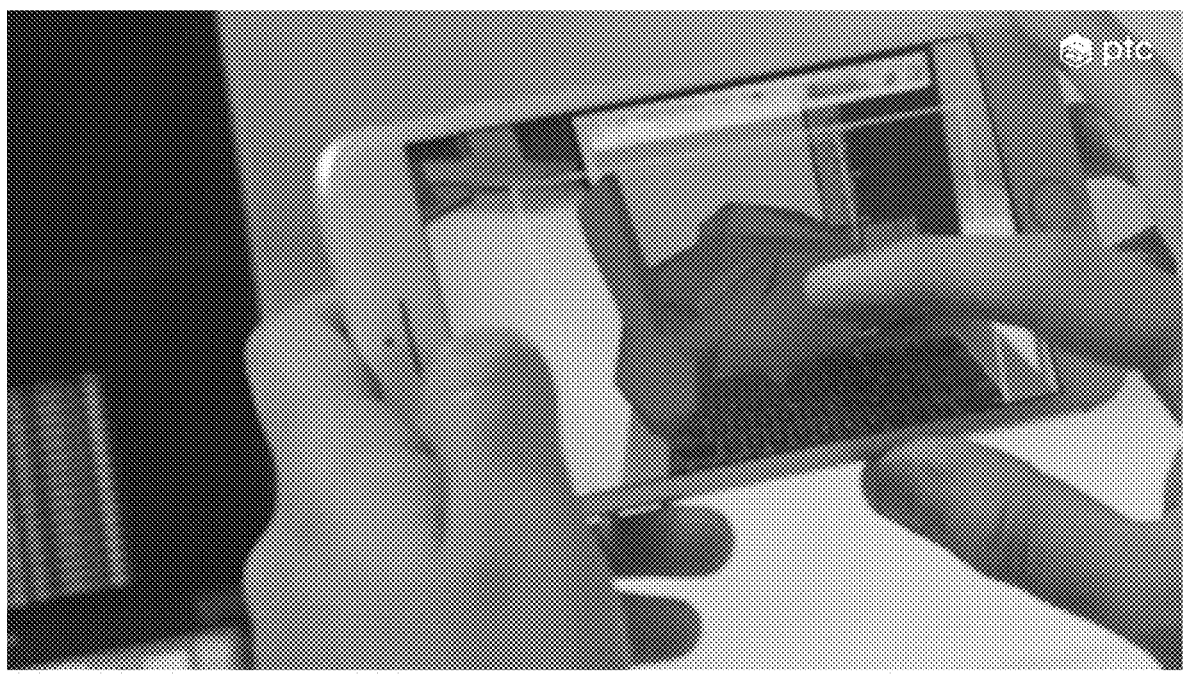

FIG. 33B shows a user using the ScreenToPrint application on a mobile device to select a computer-aided design model shown on a computer screen captured within the view of the mobile device's camera.

FIGS. 34-38B show how the user draws the model out from screen of the computer and into augmented reality (AR) space by holding a finger on the image of the model and pulling the mobile device back away from the screen of the computer.

Figure 39A:
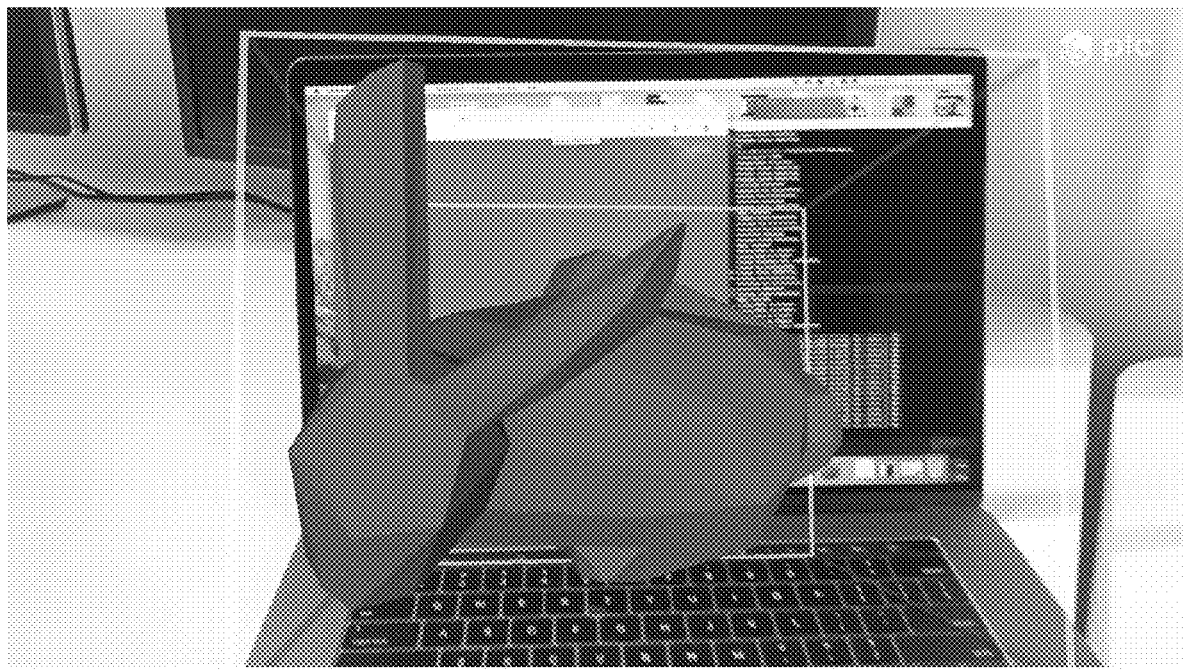
Figure 40A:
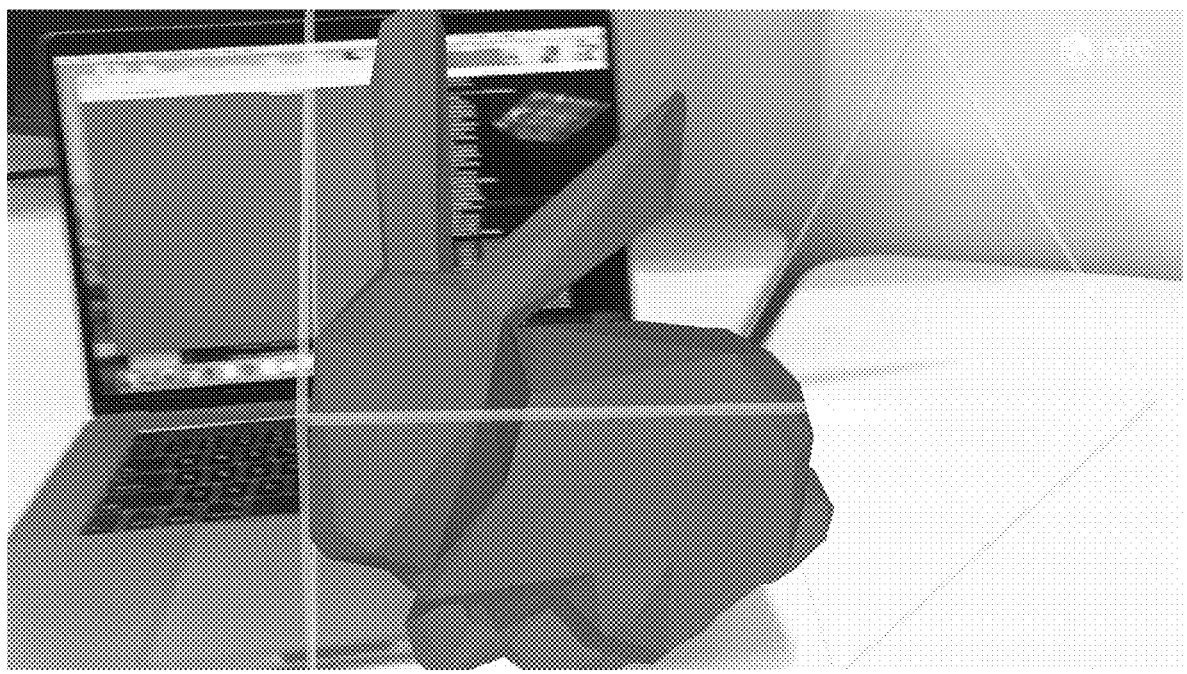
Figure 41A:
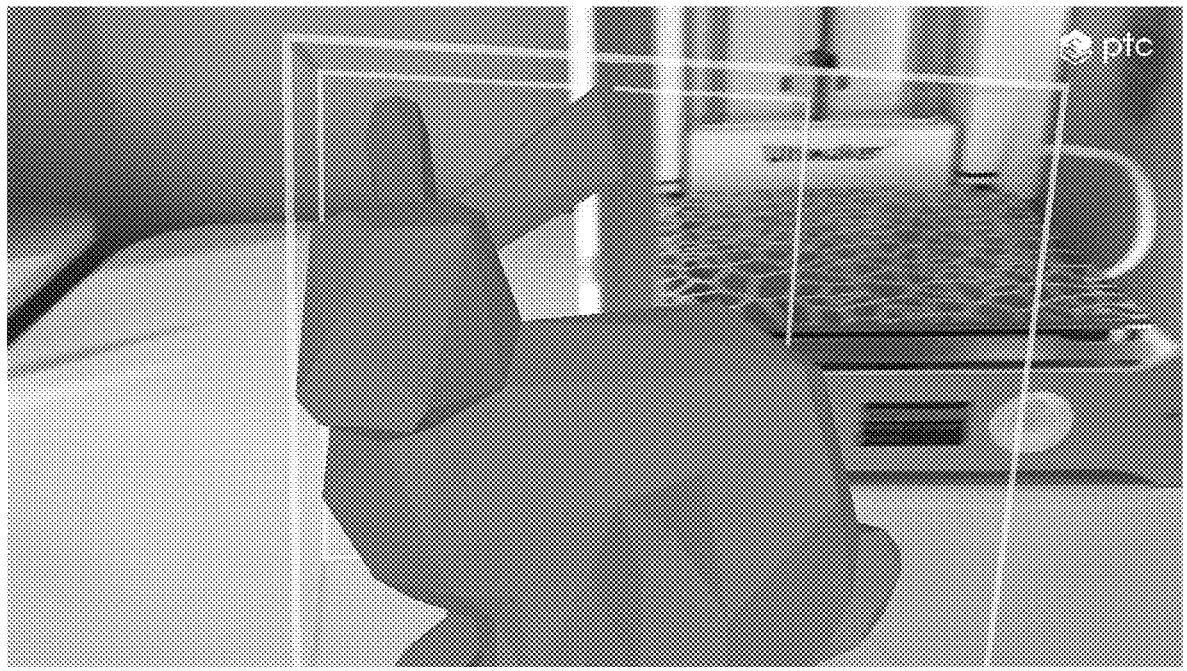
Figure 42A:
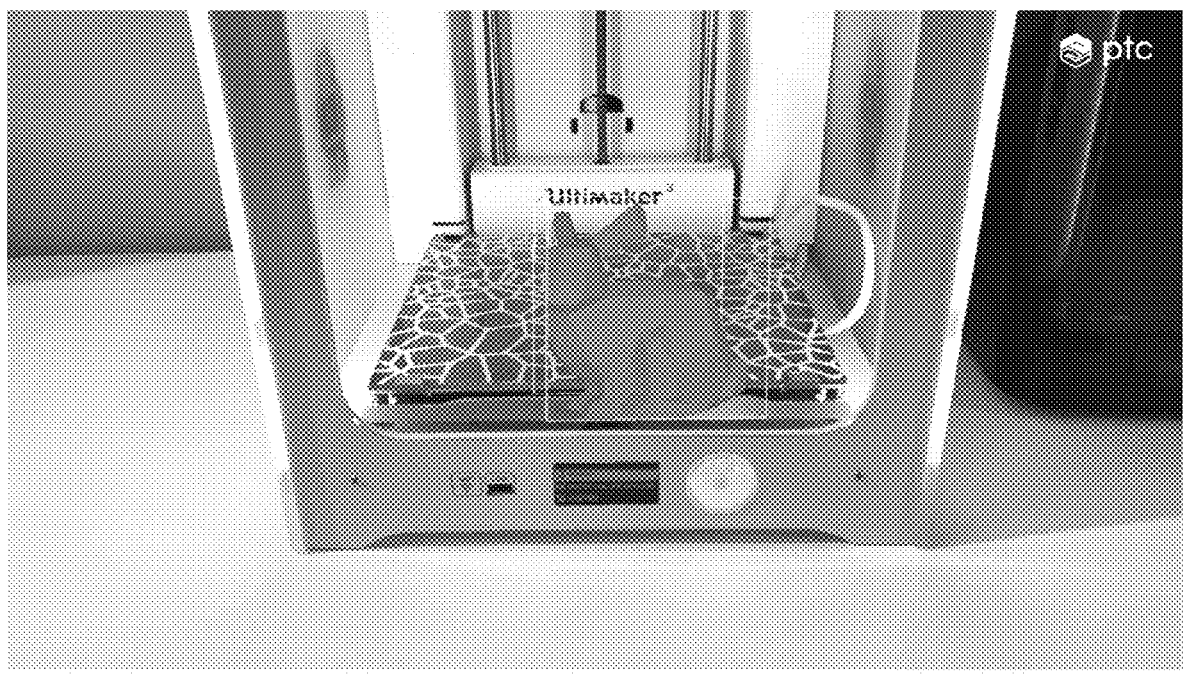
Figure 43A:
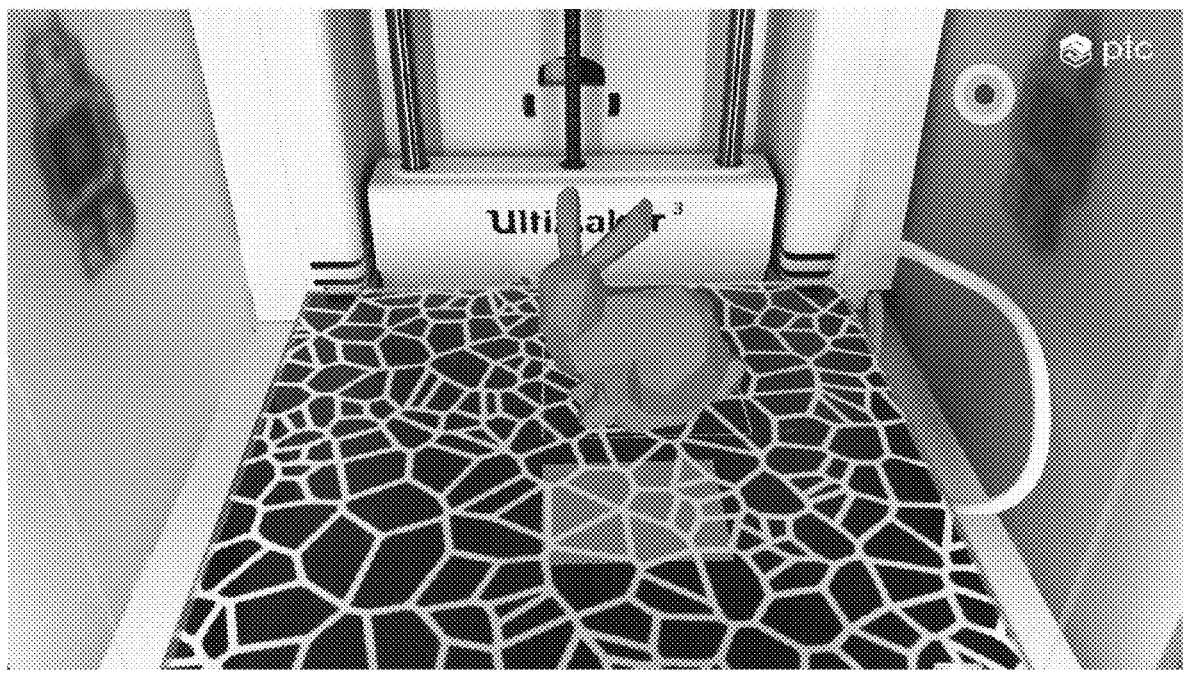
Figure 44A:
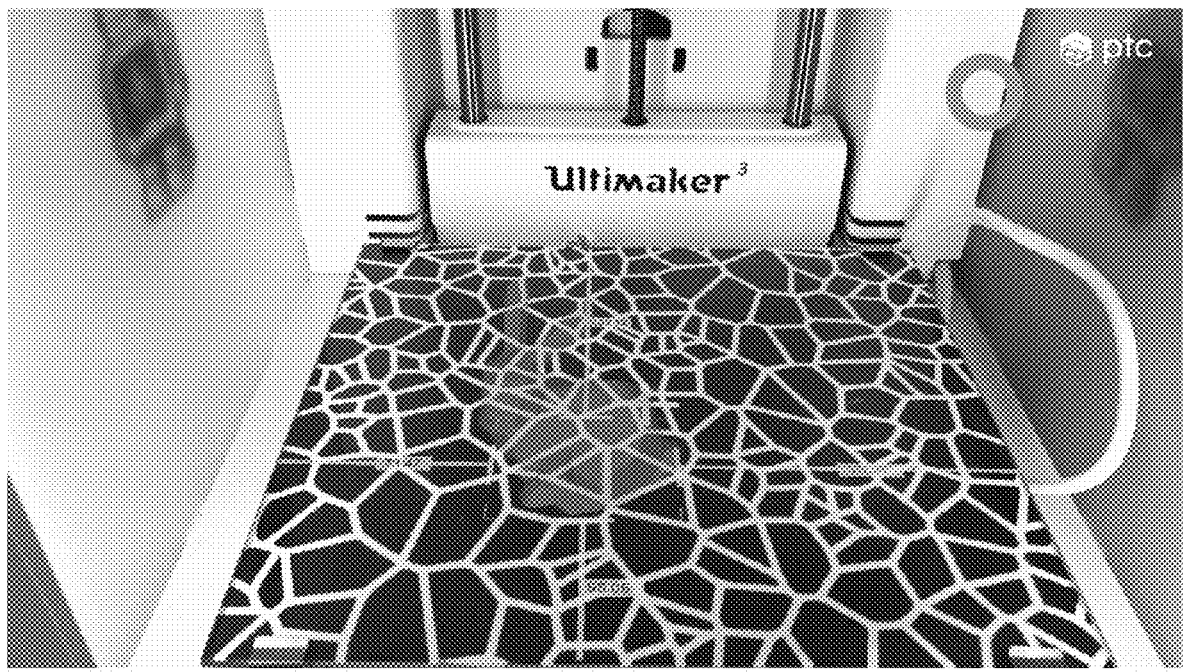
Figure 45A:
Figure 46A:
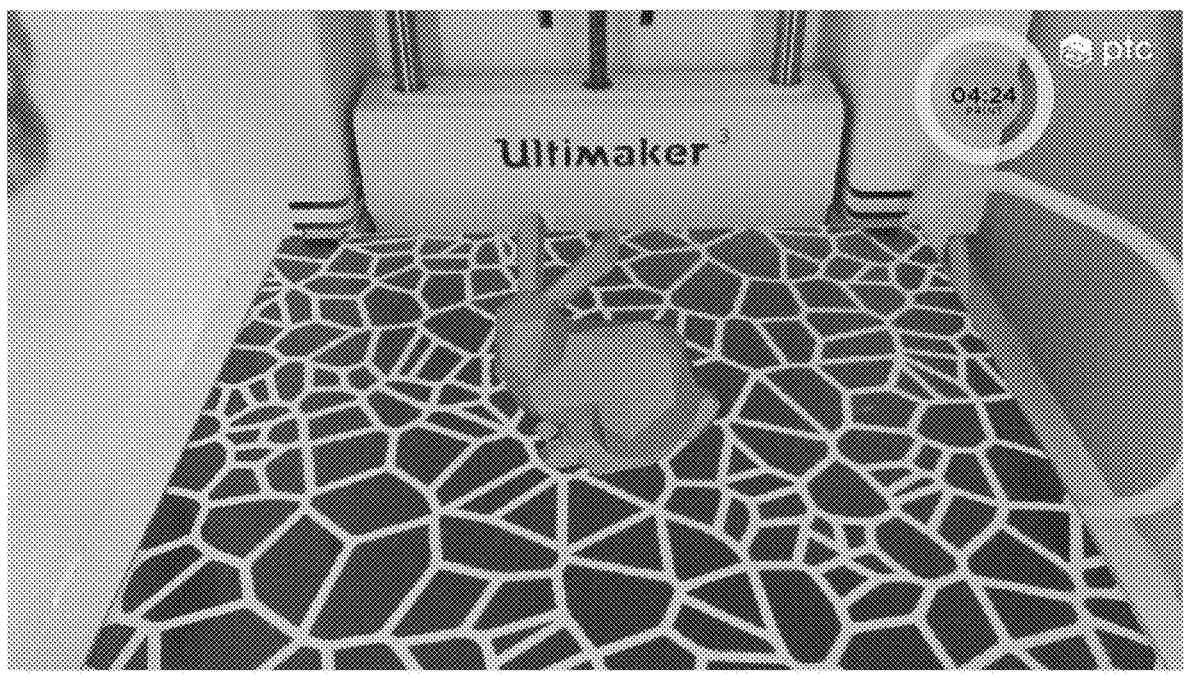
Figure 47A:
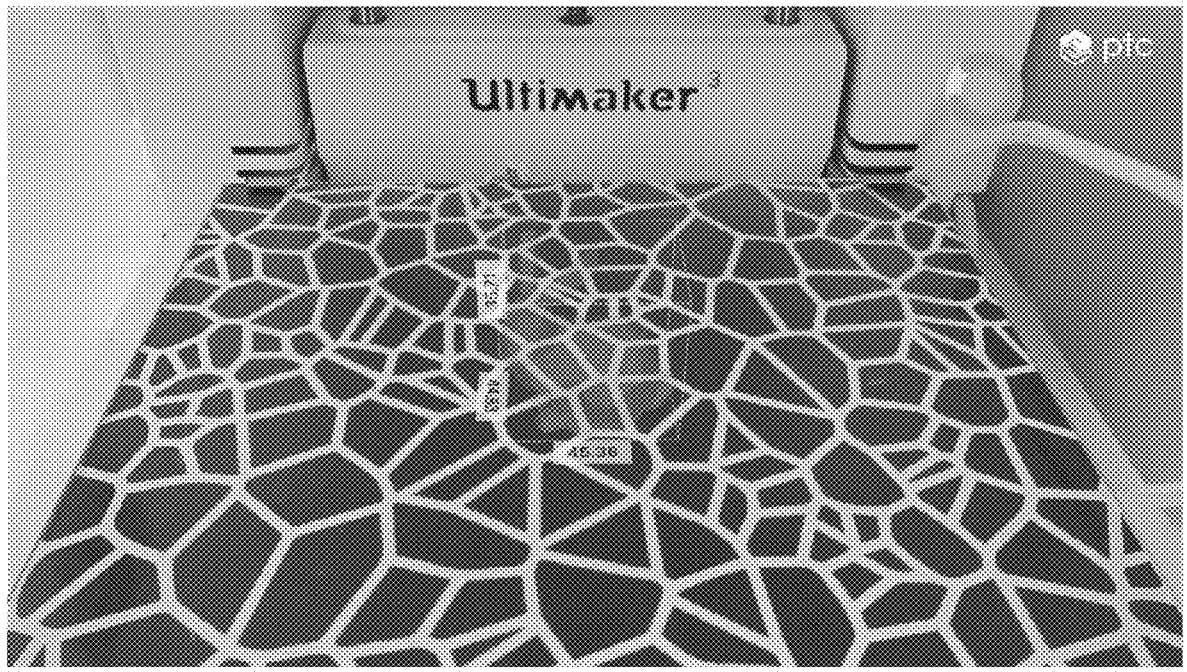
Figure 48A:
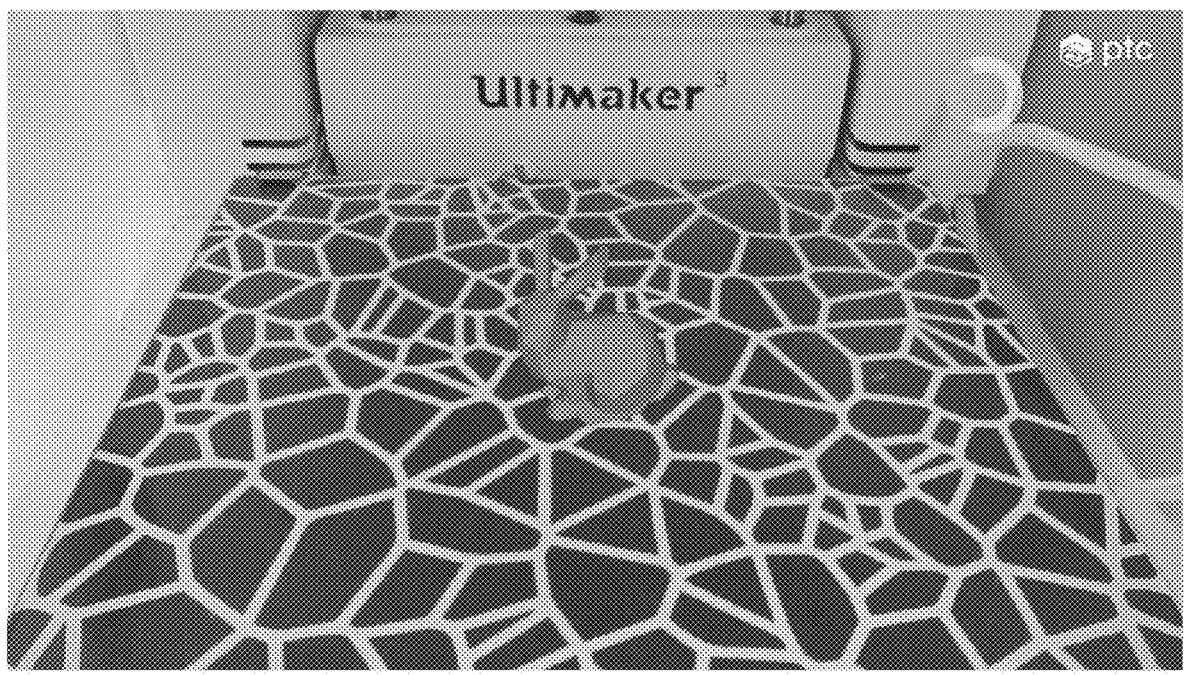
Figure 49A:
Figure 50B:
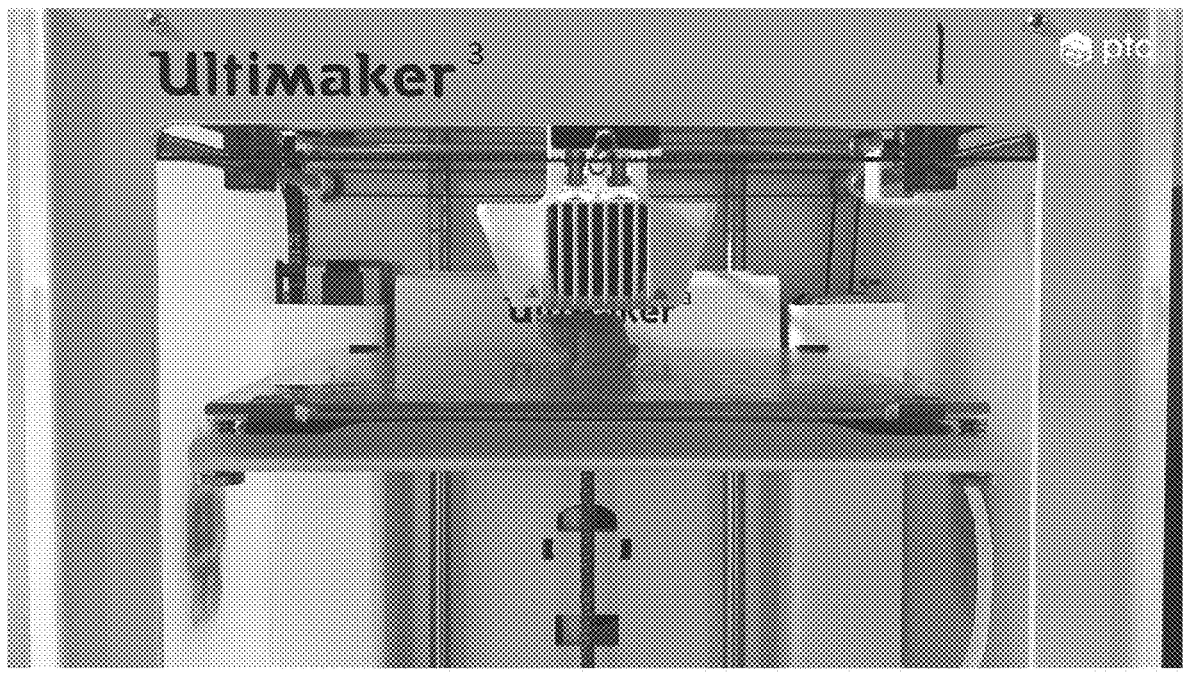
Figure 51B:
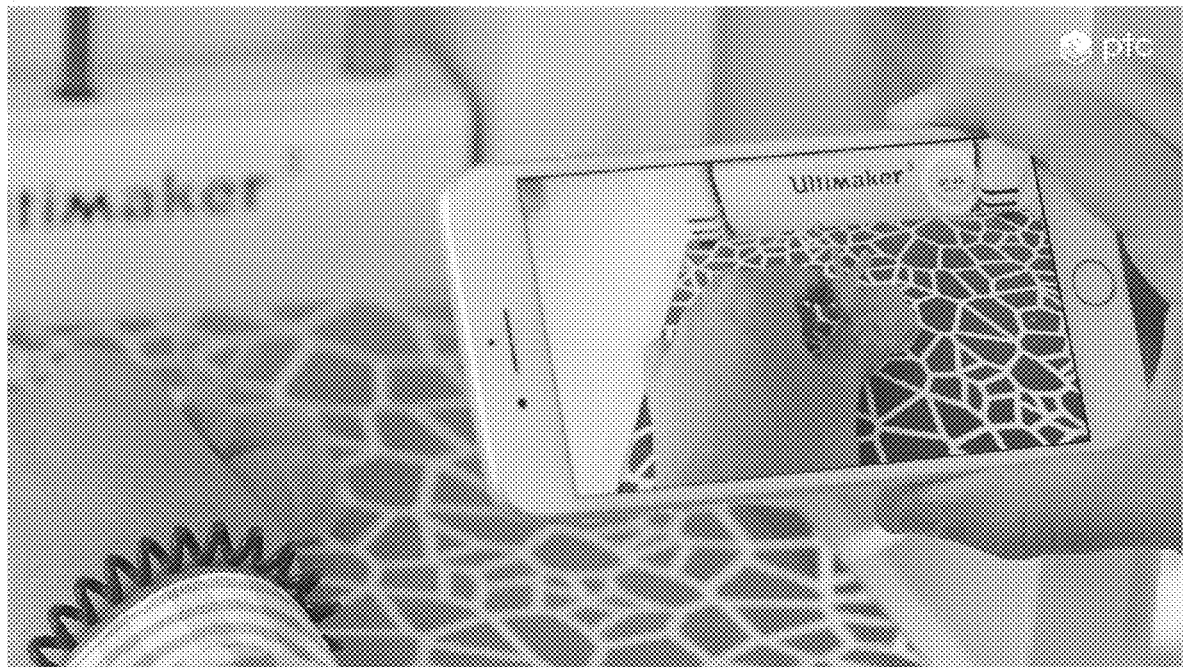
Figure 52B:

FIG. 39A shows the AR view of the model instantiated in AR space after having been drawn out from the computer screen.

FIGS. 40-44A show the AR view of how the user reorients the model and moves the AR model onto the stage of a 3D printer.

FIGS. 45-49A show the AR view of how the user repositions and resizes the AR model on the stage of the 3D printer.

FIGS. 50-52B show the model being 3D printed and then held by the user next to the AR view as displayed (faintly) on the mobile device.

1. INTRODUCTION

Spatial metaphors dictate how we interact with the world around us. We move objects around and organize space in such a way that it creates meaningful associations with functionality. Currently, the way we interact with computers does not typically leverage these intuitive spatial metaphors. Abstractions, such as a computer mouse, have us interact with information behind a screen that creates a clear separation between the physical and the connected device's specific digital space. Furthermore, carrying out tasks that coordinate multiple computers within the same space requires us to switch context between devices, which increases the cognitive load of complex tasks. This has influenced the way we think about computers and the interfaces between them: boxes that connect to each other, as opposed to a continuous medium through which information flows.

Unless devices are connected physically with hardware, interactions between their digital domains predominantly occur through local area networks (LAN), Bluetooth, or the web. These interactions preclude any notion of space, creating invisible links that can be hard to handle without expert knowledge of a system of computers.

We use the term digital domain to refer to the conceptual space where all of a device's data resides. With a growing number of smart connected objects, there are increasing numbers of digital domains within close spatial proximity. There is a need for intuitive ways to interact and seamlessly connect with content that virtually coexists within a shared physical space.

Augmented Reality (AR) can be employed to drastically change the way we perceive and operate systems of computers, allowing content to exist within a hybrid augmented reality space that is super positioned on the user's environment. AR-enabled devices become a looking glass that lets users understand digital content in a way that includes its intrinsic relationship to physical space. Traditionally, AR is used to provide just-in-time information that aids the user to achieve a task or to understand their surroundings by providing meaningful context. However, we see an opportunity to use AR as a tool to augment the intersection of domains by enabling a coherent visual flow of content between computer systems, thus blurring the lines between physical and digital spaces by uniting them within a hybrid space.

In this disclosure, we present a new cross-domain interaction model that bridges the gap between the device-specific digital domain, the hybrid augmented reality domain, and the physical domain. The interaction model defines a new intersecting domain, the Cross-Domain Interaction Space (CDIS) that uses AR to unify the flow of digital information between collocated computers by graphically adhering to the spatial metaphors that we use to interact physically with the world. Cross-domain interactions occur when a bridge between multiple devices' content is established, and a user can add, remove, or manipulate content in one domain via the other. With the CDIS, digital content is liberated from the boundaries of the screen and allowed to exist with situated content in the user's AR space, leveraging AR-enabled devices to move between these representations and creating a ubiquitous computing experience.

In the next section of this disclosure, we review related works and define the augmented intersection of realities (AIR) model. We follow with a deconstruction of the governing principles of this new model and how they have been implemented in two proof of concept applications. The first application, HybridUI, allows 2D user user interface (UI) elements (i.e. graphs, buttons, controls, etc.) to seamlessly move between screens and the surrounding AR space, enabling in situ customization of control panels in a factory scenario. The second, ScreenToPrint, presents how this technique can be used to accommodate 3D model interactions, effectively closing the loop between physical, mixed, and digital spaces, by allowing users to extract a model from a display, manipulate it on a 3d printer, and ultimately bring it into the physical world. In the closing sections, we discuss the limitations and future direction of this model within the broader scope of ubiquitous Augmented Reality applications.

2. RELATED WORKS

Researchers have explored different paradigms to coordinate the data flow between collocated devices, and have presented a number of systems to enable spatially-aware, context-sensitive mobile devices to connect the displays of, or lend their affordances to, nearby computers.

Existing solutions often involve the use of an external device to actuate content between computing systems. For instance, one example is a wand that can be tapped between physical input devices and digital objects on screens to configure how each input device performs transformations on each digital object. In another example, a device reminiscent of an eyedropper, lets users extract elements from one computer and drop them onto another. These systems reduce context switching and add a physical dimension to the flow of data, but don't make use of the physical space between devices as an interactive medium, and are designed with a specific class of interactions in mind. In contrast, we present a model that pushes these ideas by using space as a medium that can be used to interact with devices in a variety of ways beyond data transfer.

Another example is a near-screen phone interaction paradigm that makes use of the phone camera to track its position relative to a screen when the device is placed directly on top of it. This technique leverages the phone as a tool to reveal additional information, open files/links, interact with screen-based elements, and transfer data between the computer and the phone. This variety of cross-domain interactions illustrates the potential of creating seamless visual interfaces between collocated devices. Information flows between the phone and the screen, but the interaction boundary is limited to within inches of the screen and does not extend to other devices.

Another example demonstrates another set of cross-domain interactions, this time between a mobile AR device and a 3D printer. This example implements a custom AR experience for a 3D printer that affords many interactions such as 3D model selection, control of the nozzle temperature, and realtime print visualization. Like the work in the previous paragraph, this illustrates the benefits of cross-domain interactions even when limited to a single pair of devices. We extend the ideas presented in this work with the ScreenToPrint application presented in below which further enhances the printing work-flow by accommodating more collocated devices.

Looking beyond the interactions between single pairs of devices, other work on flexible interface migration shows how application usability can improve by allowing users to distribute user interface components across many devices with different screen sizes and interaction modalities. For example, an application running on a set of mobile and desktop computers, allows the UI components for video selection and playback to be separately migrated between the devices at runtime. The playback can be moved to a desktop while the selection panel remains on a mobile device, or vice versa. However, this work lacks a visually continuous tool for performing migration between a variety of devices. The HybridUI application presented below shows how AR can be used as a tool for interface migration which leverages continuous visual and spatial metaphors to create intuitive interactions between systems.

AR has been employed to enhance the operation and coordination of collocated computing devices. The Reality Editor, mentioned above, shows how AR can be used to connect the inputs and outputs of disconnected devices within a local area network. This open sourced project enables on-the-fly customizable automation by simply pointing at smart devices and drawing visual links between their data streams. Changes to any of the devices' data are propagated accordingly throughout the established links. Although the Reality Editor simplifies data flow between devices, there is little-to-no emphasis on the transition of visual elements between individual devices and space. The aforementioned HybridUI application has been developed as a custom extension of the Reality Editor to show how it can leverage the model presented in this disclosure to exploit the boundaries between connected devices, and extend them into a continuous AR workspace.

The concept of a continuous workspace for hybrid computing environments has been explored. Using markers, a set of projectors, and cameras, a system augments the environment with information that moves seamlessly between a desk, a projected screen, and a laptop. In this work, the authors present the idea of Hyperdragging: using the mouse to drag elements from a screen to an adjacent surface or marked object. They also use integrated spatial metaphors to reflect the flow of information in the augmented work space (e.g. visual lines semantically representing the flow of data from a map on the desk to detailed information about a location on the laptop screen). The cross-domain interactions between the screens and projections are continuous, intuitive, eliminate context switching, and afford many types of interactions.

We extend the foregoing vision by adding space as an additional domain. This creates a more ubiquitous model, where things can exist in the space between computer systems. Rather than limiting the continuous interaction between systems to 2D surfaces, we include interaction with elements in 3D space, further expanding upon the visual metaphors explored in their work. With the inclusion of augmented reality, we remove the limitations of using projection as the main driver for visual continuity between domains, and enable new interaction possibilities between physical, digital, and mixed reality domains. Through the Augmented Intersection of Realities model, digital data previously trapped within a single domain gains the affordances to become a part of "the fabric of everyday life".

3. AUGMENTED INTERSECTION OF REALITIES

Augmented Intersection of Realities (AIR) is a new model that leverages AR-enabled devices to create ubiquitous experiences that blur the line between physical and digital boundaries. In AIR, space becomes the medium through which information flows, allowing users to interact intuitively with multiple collocated devices in a way that mimics physical interaction and reduces context switches.

3.1 Principles

In this section we outline some underlying principles of this model, which we later use to demonstrate two proof of concept applications to solve concrete problems.

3.1.1. Space is the Medium

Figure 53:
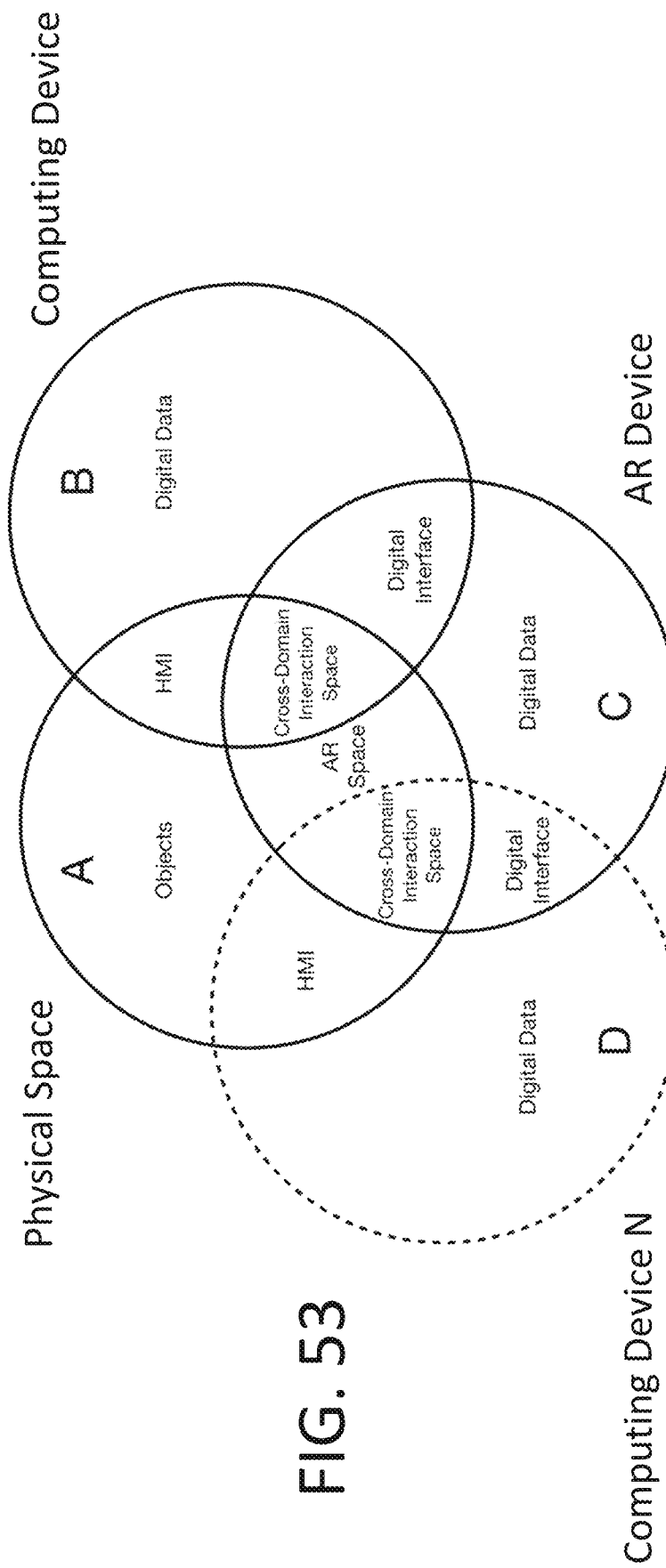
FIG. 53 presents the various domains that interact in the AIR model.

FIG. 53 presents various domains that can interact in accordance with the AIR model. As shown in FIG. 53, collocated computing systems can be represented by the overlapping domains A, B (and D, if there are multiple computing devices). In the Augmented Intersection of Realities model, the AR Device domain, C, is introduced. This enables the Cross-Domain Interaction Space (CDIS), which exists at the intersection of a human-machine interface (HMI) and an AR Display, collocated in space and connected via networking infrastructure. This space can be exploited to visually and spatially move or manipulate content between any of the digital domains of a computing system. Domain A is physical space. All physical objects exist in this domain, including computer hardware. Domain B is the digital domain of a computer, where all its data resides. A∩B is where the computer's data manifests in physical space: on the computer's display, or other form of HMI. Domain C is the digital domain of an AR-enabled device, such as a phone or head-mounted display. Similar to A∩B, A∩C is the interface between the AR device's data and the surrounding physical space: the AR space, presented through the AR device's display. A∩B∩C occurs in the AR space (A∩C) that is spatially proximate to the HMI (A∩B). This space forms a specific type of digital interface (B∩C) between the devices. We call this collocated AR interface the Cross-Domain Interaction Space (CDIS), and it can be considered the nexus of AIR; it can be a mechanism of moving content between digital domains in a spatially intuitive way. Content can be transitioned among computing devices and augmented reality, using space as the medium for transport.

3.1.2. Distributed Representation of Data

Data is presented to the user through HMIs and its visual representation can be altered using the AR device in the Cross-Domain Interaction Space. AIR promotes a distributed representation of data. That is, at any moment, information can exist within the AR device and the computing device(s) involved in a cross-domain interaction. The flow of information is mediated by one or more AIR servers, which are in charge of synchronizing multiple representations across devices. The servers provide data to connected clients, maintain it by sending updates, and notify the clients when it should be deleted. This distributed representation serves the constraints of real time interaction and visual synchronization between devices in the AIR ecosystem.

3.1.3. Clearly Defined Domain Boundaries

For content to move between devices, it must cross a boundary that defines where one domain ends and the other begins. Boundaries exist at the intersection between a device's HMI and the AR space in its vicinity. Therefore, the extents of the Cross-Domain Interaction Space are defined by such boundaries. In general, boundaries can be made consistent with the spatial metaphors used to interact with each computing device. For example, the boundary for a desktop computer can be the 2D surface of its screen. The boundary for a 3D printer can be the volume inside its print chamber. When content flows between domain boundaries, there should be clear visual feedback that denotes where the content is relative to the interacting domains. To convey its AIR boundaries, a device can use a marker or a trained model that the AR-enabled device can recognize. This definition can be provided by the computing system and can be advertised to the AR-enabled device, through the moderating servers.

3.1.4. Spatially Consistent Domain Transitions

A transition consists of a view of digital data moving between the defined AIR spaces. Transitions can be either discrete or continuous, depending on the nature of the content and the domain(s) involved. In a discrete transition, a view of the digital element instantly and entirely jumps from one domain to another. In a continuous transition, the view of the digital element can partially exist in multiple domains at the same time. Transitions should be intuitive and congruent with the way people move objects through space. For example, a user may place an element on the screen by pushing an AR device showing a selected element towards the display or move the element from the screen to AR space by pulling the AR device out or away from a screen. To satisfy this principle, transitions can be configured to happen in real-time to mimic the way we interact with physical objects. One of AIR's goals is ubiquity, therefore transitions should be bi-directional. That is, content should be able to transition from the AR space to the computing device and vice versa.

3.1.5. Scope

The value of the AIR model is dependent on the number and diversity of devices that interact through AR. While complete ubiquity is desirable, spatial proximity is generally preferable for AIR interactions. The computing devices within a user's nearby spatial environment can provide a sufficient scope of interaction. The utility of AIR increases with the number of enabled devices within that environment. The scope of AIR can be open to any variety of objects, such as, for example: desktop computers, mobile phones, tablet computers, industrial machinery, consumer electronics, robots, wearable devices, or anything capable of providing an interface to their digital domain to spatially proximate objects. The visual transfer and cross-domain manipulation of content is straightforward for those devices with screens. However, one can accommodate a greater diversity of devices by augmenting those without displays with additional AR content. For example, the 3D printer presented in Section 5 does not have a screen, but the AR device compensates for this by rendering a hologram of the 3D model placed on the print plate, which aligns with the eventual physical print. Such a technique allows any variety of connected objects to participate in AIR systems.

3.2. Cross-Domain Interaction Space

The AIR model contemplates a new hybrid space that includes the intersection of a device and its surrounding AR space. In this section, we outline how interactions to move content between domains through the CDIS can be handled for each of 2D and 3D content.

When transitioning 2D content, such as a 2D graphical object, between domains, the 2D content can be made to snap from one domain to another so that the content disappears from the first domain at substantially the same time as the content appears in the second domain. An example of a discrete or snapping 2D transition is illustrated in FIGS. 11B, 12A, and 13B, described above. A technical discussion of an implementation of an instantaneous 2D transition is discussed below in section 3.3.

When transitioning 3D content, such as a 3D graphical object, between domains, the 3D content can be made to transition gradually from one domain to another so that the content appears partly in each of the two domains as the user draws or pushes the object from one domain to the other. An example of a gradual 3D transition is illustrated in FIGS. 34-38B, described above. A technical discussion of an implementation of a gradual 3D transition is discussed below in section 3.4.

3.3. 2D Interactions

Figure 54:
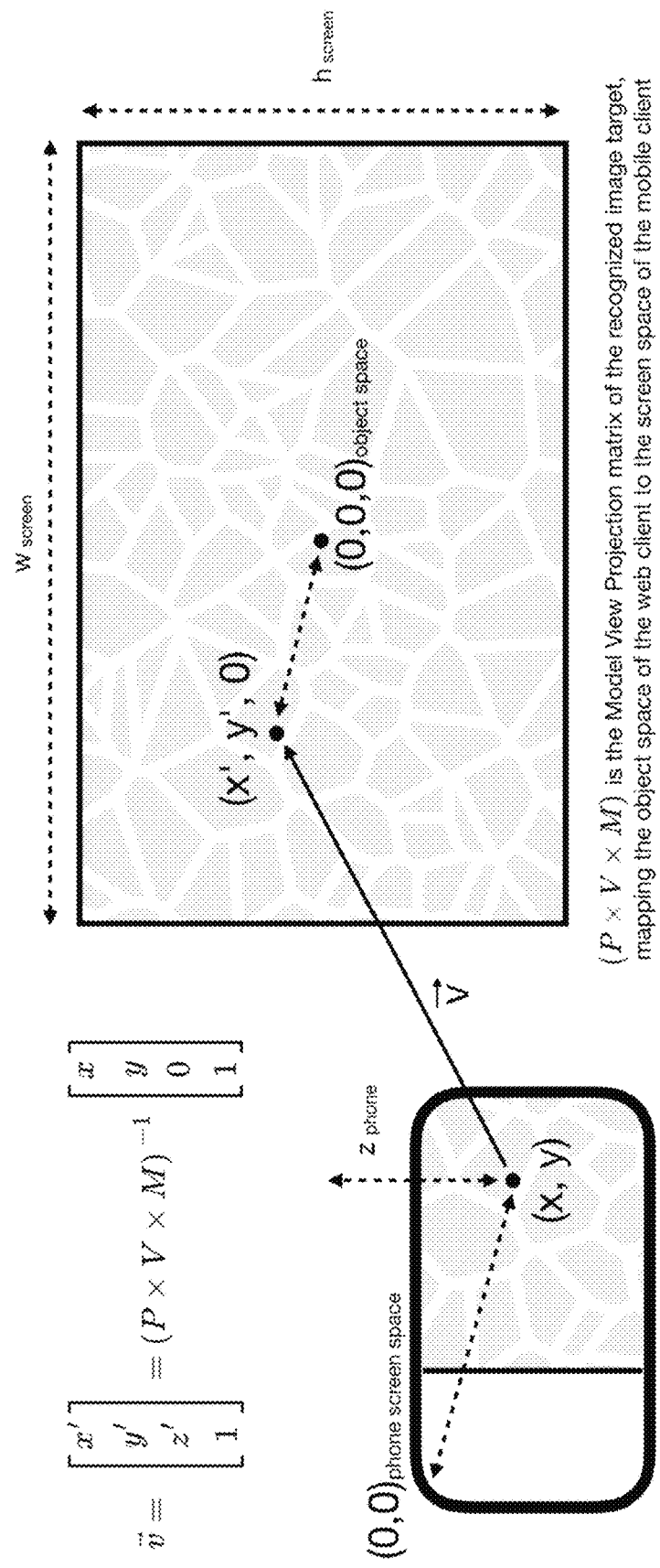
FIG. 54 is a diagram that shows a relationship between an AR device and a physical display screen.

FIG. 54 is a diagram that shows a relationship between an AR device and a physical display screen. In order to enable a user to interact with 2D content on a screen via AR, the AIR system can use two pieces of information: the (x', y') coordinate on the screen that the AR device would like to remotely select, and the distance between the AR device and the screen. As shown in FIG. 54, 2D content on a computer display can be remotely operated from an AR device by casting a ray $\vec{v}$ from (x, y) on the phone, solving for its projected coordinates (x', y', 0) in the display's local object space, and normalizing by the screen size. That coordinate can be transmitted to an application operating the screen to interact with elements at that location. This technique can also be used to take elements in and out of the screen at will.

Equation 1 converts point (x, y) on the AR display into the local coordinate space of the HMI, resulting in a vector $\vec{v}$, orthogonal to the phone's screen, given the Model (M), View (V), and Projection (P) matrices of a recognized image target as seen from the AR display.

$$\vec{v} = \begin{bmatrix} x' \\ y' \\ z' \\ 1 \end{bmatrix} = (P \times V \times M)^{-1} \begin{bmatrix} x \\ y \\ 0 \\ 1 \end{bmatrix} \quad (1)$$

(x', y') can be solved when z'=0 to determine where $\vec{v}$ intersects with the plane of the screen. x' and y' can be normalized by $w_{screen}$ and $h_{screen}$ respectively, transmitted to the application running in the HMI, and remapped to the pixel width and height of the display. The resulting coordinate is sufficient to manipulate 2D elements within the display. The distance of the phone to the screen, $\|\vec{v}\|$, can also be sent to the application to enable depth-dependent interactions, such as pulling an element out of the screen or pushing it back in.

3.4. 3D Interactions

The 2D model of cross-domain interactions can be extended to accommodate depth of an object when transitioning between domains if the content involved in the interaction is 3D. In the remainder of this subsection, we contemplate an example where a graphical object is transferred between AR space as shown on a mobile phone and a physical display. In order to be able to transfer the graphical object between a mobile phone's AR display to a physical display screen and have it appear with the same size and location on both screens across the transfer, the size and location of the object in AR space are mapped to corresponding coordinates on the physical display screen or vice versa. In order to do this, the following explanation contemplates a digital space corresponding to the display, with a virtual domain that is used to project the graphical object onto the physical display. The reader should note that the term "virtual" is used in this section to refer to a virtual space for the purpose of projecting a location and size of an object between AR space and a physical screen, which is distinguishable to the use of the term virtual above, to refer to objects appearing to a user only in AR space.

Figure 55:
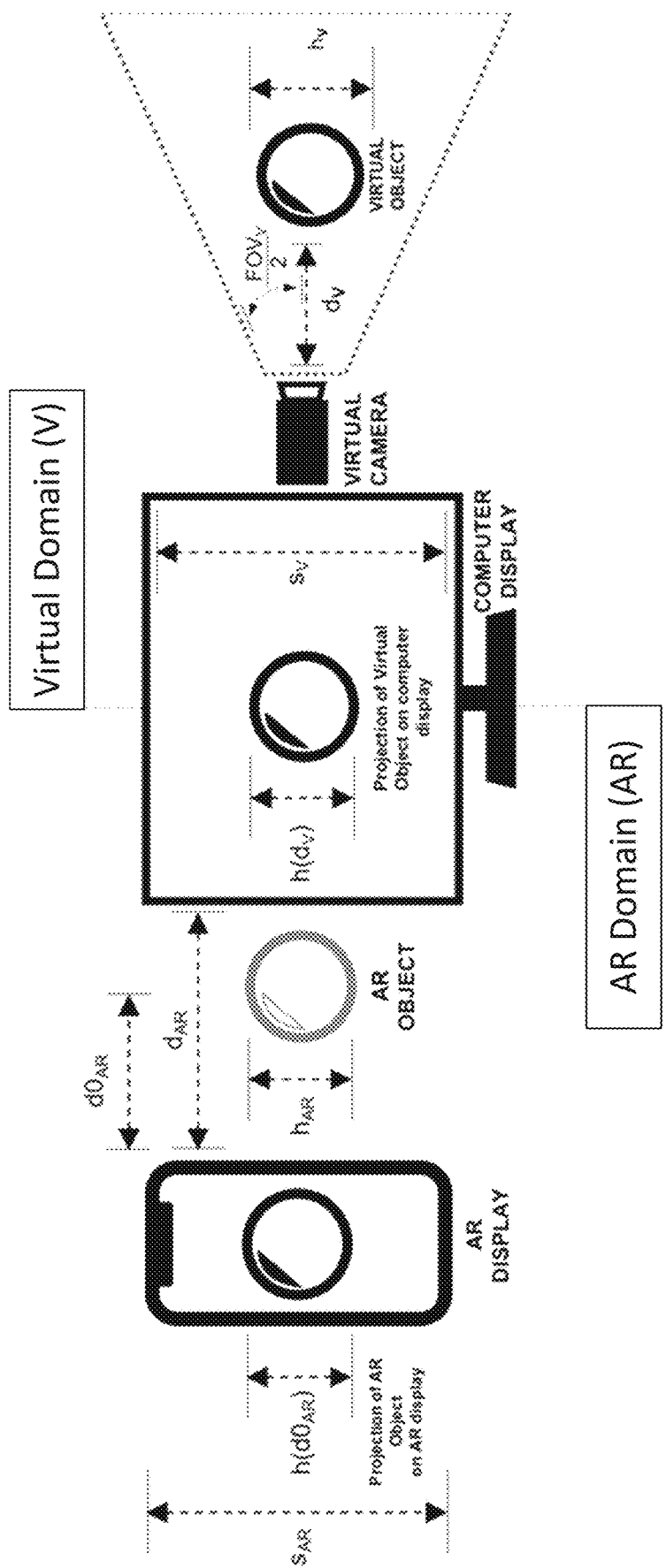
FIG. 55 shows the different variables involved to achieve visual continuity when interacting with 3D content in the AIR model.

FIG. 55 illustrates that coordination between 3D content in the digital space (a virtual domain that is projected onto the physical display or computer screen), and the AR space is achieved by syncing the position of the virtual object with respect to the phone's distance to the computer screen. In order to transition an object from the physical display to the AR space of the mobile phone, the user selects the object through the phone' AR interface and then pulls the phone back away from the physical screen as if to draw the object out of the physical display. A virtual camera can be modeled to be positioned a certain distance away from a virtual object that is being rendered on the physical display. As the phone is pulled back, away from the physical display, the virtual object which correlates to the object visible in AR space on the phone and is correspondingly pulled back with the phone, also comes closer to the virtual camera. The rate of this movement matches the projection of the virtual object onto the display screen to the projection of the virtual object in AR to the phone's screen. This creates the illusion that a single object is being manipulated between the phone's AR interface and the physical display screen.

FIG. 55 shows the different variables involved to achieve visual continuity when interacting with 3D content in the AIR model. We make a clear distinction between two domains: the Augmented Reality domain (AR), and the Virtual domain (V). The Virtual domain in conjunction with a virtual camera is used to map the AR domain to the physical display. Being situated in space, the AR domain uses metric units (e.g. meters), while the Virtual domain's units are dependent upon the display screen's specifications and the specified position of the virtual camera. For the purpose of clarity we will define two functions:

$$f(d_{space}) = 2 * \tan\frac{FOV_{space}}{2} * d_{space} \quad (2)$$

Equation 2 returns the visible height in the units of a particular space (e.g. Augmented Reality or Virtual space) of an object at a distance $d_{space}$ away from a perspective camera with a vertical field of view $FOV_{space}$. Note we define this function for positive values of $d_{space}$, since objects behind the camera won't be rendered on the display.

$$p(d_{space}) = \frac{h_{space}}{f(d_{space})} * s_{space} \quad (3)$$

P(d) returns the height in metric units of the projection of an object at a distance $d_{space}$ from the camera, onto the screen associated with that space. Notice that % screen, represents the ratio of the object's actual size and its visible height. As distance $d_{space}$ becomes larger (object gets farther from camera), the percentage of the screen the object occupies becomes smaller. For example, $P(d_{AR})$ returns the height in meters of the projection of an object in the AR space onto the AR device's display.

When the user drags the AR Object towards or away from the computer screen, the object remains a fixed distance $d_{AR}^o$ from the AR device. Therefore, in order to maintain visual continuity between the AR and Virtual (V) domains, we must position the object in virtual space a distance $d_V$ away from the virtual camera, such that the projection of the AR object on the AR device's display, $p(d_{AR}^o)$, matches the projection of the virtual object's projection on the virtual display $(p(p(d_V)_{AR}))$. Therefore $d_V$ must satisfy the following equation:

$$p(d_{AR}^o) = \underbrace{\frac{p(d_V)}{f(d_{AR})}}_{\% \ screen} * s_{AR} \quad (4)$$

We solve this equation for $d_V$ and obtain the following:

$$2 * \tan\frac{FOV_V}{2} * d_V = \frac{f(d_{AR}^o)}{f(d_{AR})} * \frac{s_V * h_V}{o_{AR}} \quad (5)$$

$$d_V = \frac{d_{AR}^o}{d_{AR}} * \frac{h_V}{h_{AR}} * \frac{s_V}{2 * \tan\frac{FOV_V}{2}}$$

Equation 5 gives us the distance at which the virtual object must be positioned with respect to the virtual camera in relation to the distance of the AR device to the tracked display. This function is not defined for the case where $d_{AR}=0$, since the AR device cannot occupy the same space as the display. Likewise, this equation does not accommodate for negative values of $d_{AR}$. Notice that $\lim_{d_{AR}\to\infty} d_V=0$, therefore, at a sufficiently small threshold the visual element on the display must be rendered invisible to achieve the illusion that the 3D element has fully left the screen. In the following section, we describe how we apply these interaction techniques to manipulate digital content in two proof of concept AR applications.

4. HYBRIDUI APPLICATION

Figure 56:
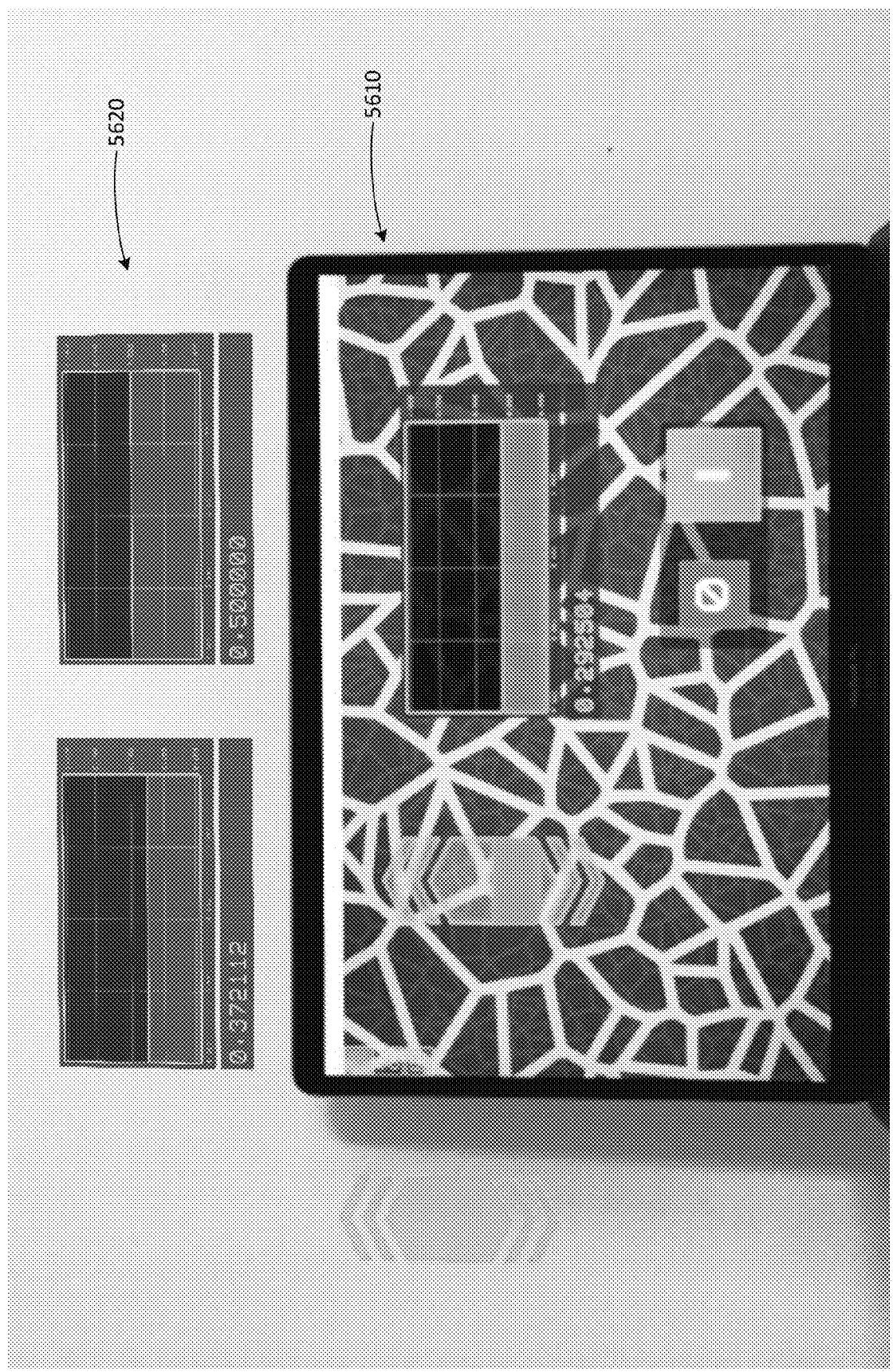
FIG. 56 illustrates an example HMI built with the HybridUI application.
Figure 58A:
FIGS. 58A-D illustrate how in the HybridUI application, the user selects a UI component on their tablet screen by tapping on its location on their AR device (A), pulls it out of the screen and into the AR space with a pull gesture (B), positions it above another screen (C), and inserts it into that screen with a push gesture (D).
Figure 58B:
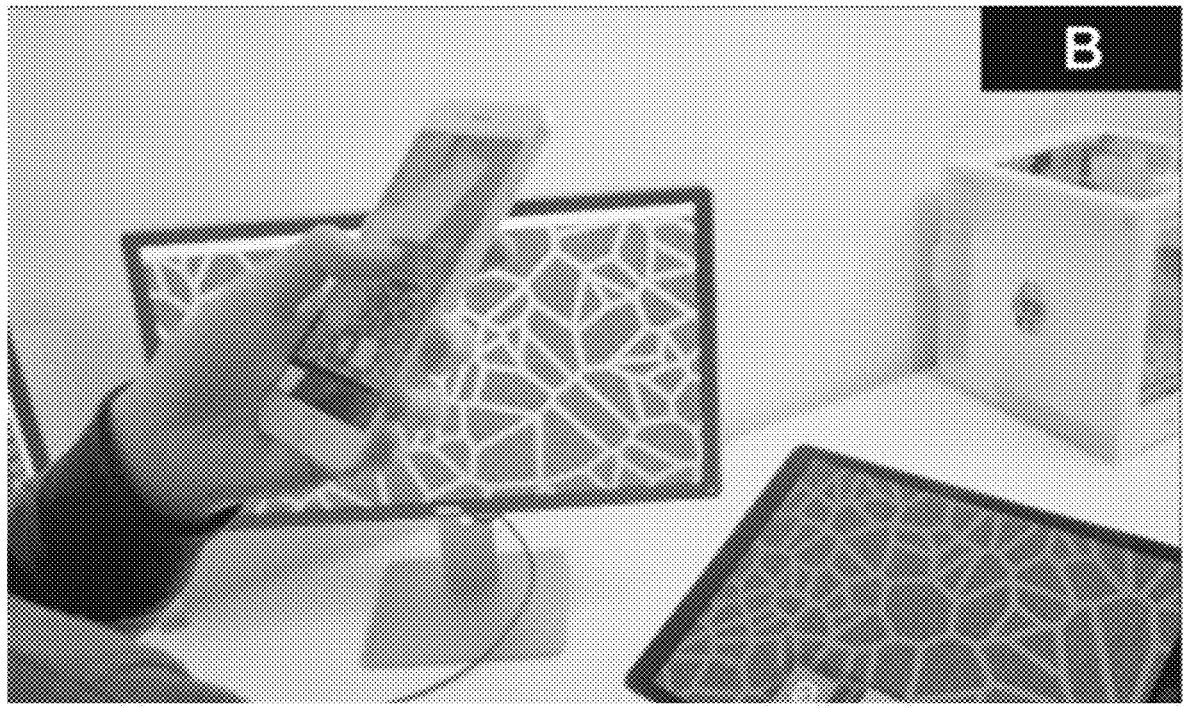
Figure 58C:
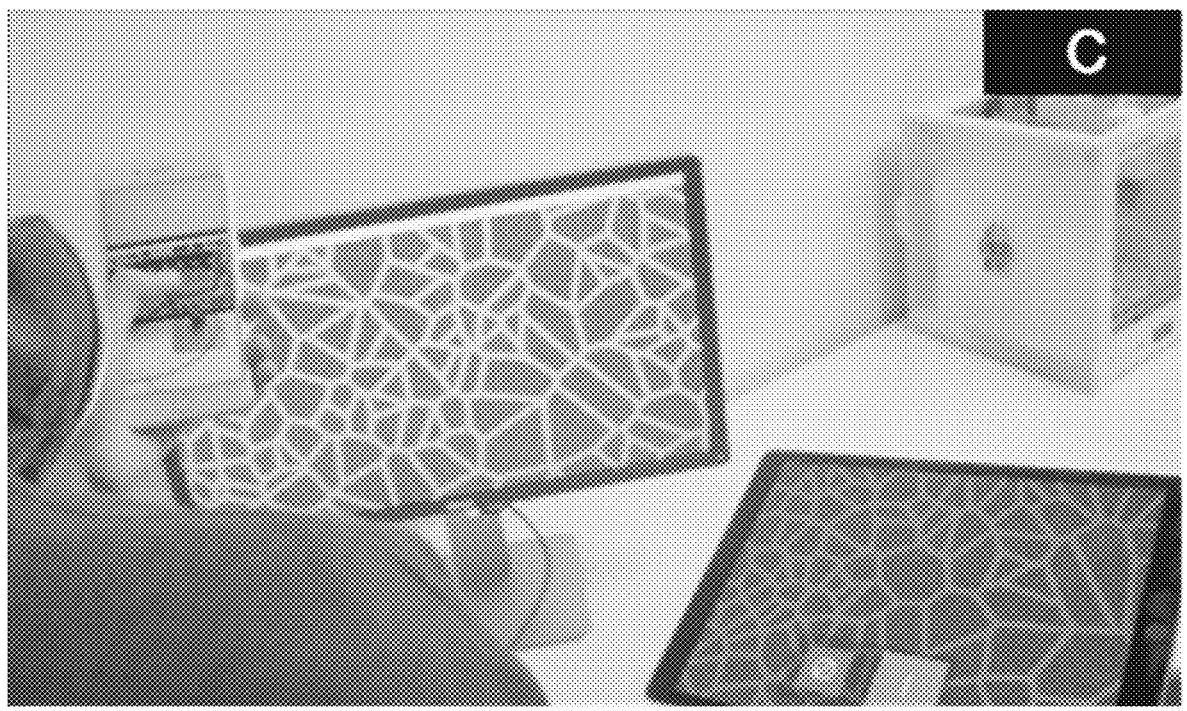
Figure 58D:
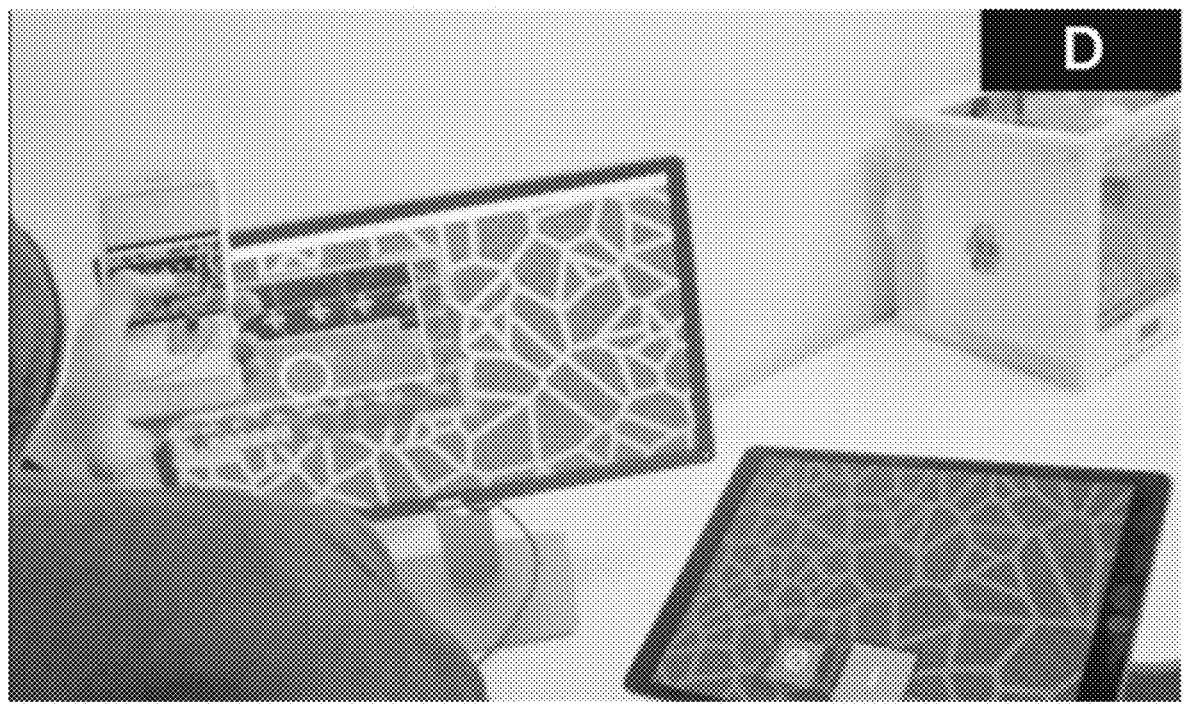

FIG. 56 illustrates an example HMI built with the HybridUI application, simultaneously displaying UI components on the screen 5610 and in augmented reality 5620. This is the Cross-Domain Interaction Space, where the components can be bidirectionally transitioned between a digital display and AR.

The HybridUI application is an implementation of the AIR model that demonstrates how users can seamlessly move 2D UI components between screens and augmented reality. This capability is applied to the in situ modification of industrial HMIs for visualizing data from nearby machines. UI components can be moved between multiple HMIs and an extended AR workspace based on the current needs of the user. This section will discuss the motivation for applying the AIR model to the industrial HMI domain, and describe details of the system's architecture and technical implementation.

4.1. Motivation

An industrial HMI should provide the right information at the right time, in an easily understandable way; failure to do so affects operational efficiency and could be hazardous for workers. Many industrial HMIs, by nature of their design constraints, have issues of flexibility and cognitive load. They generally have limited screen space, and are typically deployed by an expert as a static interface. The designer should anticipate and include all information that end users might ever need, because the HMI typically cannot be reconfigured at runtime based on changing roles or tasks. This often results in a cluttered UI that provides too much or too little information for a user's current task, requiring more time to correctly locate and interpret a specific element. Using the AIR model, we can reduce cognitive load by allowing non-critical elements to be transitioned into an extended AR workspace, cleaning up the screen and contextualizing the AR elements with relevant physical objects. We can also empower the user to continuously modify their "hybrid" HMI, using intuitive spatial metaphors rather than advanced programming methods.

4.2. Architecture

FIG. 57 illustrates how HybridUI Servers can mediate communication between mobile and HMI clients, on the right, and how the resulting path of content through the domains of the AIR system is mapped via the arrows, on the left.

The HybridUI architecture can include one or more HybridUI Servers, one or more web clients (HMIs), an AR-enabled mobile client, and any number of IoT devices. The mobile client can be a mobile application extending the open sourced Reality Editor that uses the Vuforia Engine to run an AR environment capable of rendering web content. The web client can be configured to run in any modern browser. Each HybridUI Server can run as a module within the open sourced Reality Editor Server, which can provide a distributed AR content management system and networking infrastructure, and can manage data binding to connected IoT devices. This implementation makes use of the decentralized Reality Editor server infrastructure for scalability across a multitude of IoT devices. The HybridUI Server can be implemented in Node.js, and can also host the web clients and the available UI components. HybridUI Server can also mediate communication between all clients within a local Wi-Fi network via a REST API and WebSockets. Multiple users can operate the system together; changes are synchronized in real time to all AR and HMI clients.

4.3. Methodology

FIGS. 58A-D illustrate how in the HybridUI application, the user selects a UI component on their tablet screen by tapping on its location on their AR device (A), pulls or snaps the component out of the screen and into the AR space with a pull gesture (B), positions it above another screen (C), and inserts it into that screen with a push gesture (D).

With the foregoing architecture in place, an AR-enabled mobile client entering a network running any HybridUI instances can be configured to discover all interactable HMIs via the HybridUI Servers. The discovery can also provide the AIR domain boundaries in the form of uniquely identifiable Vuforia image or object targets. Image targets can be rendered as background images on each HMI web client. The detected position, size, and unique pattern of a target image allows the mobile client to uniquely identify the interaction boundary of each screen using purely visual information. Object targets allow the mobile client to recognize surrounding machines, so that UI components can also be directly attached to them within the AR domain.

AR counterparts of all UI components on detected screens are downloaded from a HybridUI Server, but are given a tag in the mobile client that hides them in AR. When a user taps on the AR display and the raycasted touch coordinates fall within the screen boundary of any web client, a series of WebSocket messages are passed between the clients to remotely control the cursor of the web client (as calculated in Section 3.3). This allows full control of the HMI application, such as dragging or scaling elements with remote single or multi-touch gestures. If the remote cursor selects a screen UI component, and the user pulls the phone away from the screen, it will trigger a transition event. This changes the tag of the selected element, hiding it from the screen and rendering its AR counterpart instead, which the user can then move, scale, and rotate as a 2D panel in AR. Conversely, when the user selects an AR UI component on their phone and pushes it across the boundary of any HMI, a series of WebSocket messages revert the component's tag to hide it from AR and display it on the HMI instead. If moving from one HMI to another, as shown in FIGS. 58A-D 58, additional network requests pass through the HybridUI Servers to fully move the data from one computer to another across a potentially decentralized network. This maintains the consistency of the component's UI state and reestablishes any IoT data connections.

5. SCREENTOPRINT APPLICATION

The ScreenToPrint application shows how the AIR model can be implemented to accommodate 3D elements and enable intuitive interactions between a group of collocated devices. ScreenToPrint is a "what you see is what you get" 3D printing application. With a mobile device, the user can extract a 3D model from a screen. The model can be dropped onto an enabled printer and edited in place. The resulting print holds a one-to-one relationship to the edited model on the phone.

Figure 59:
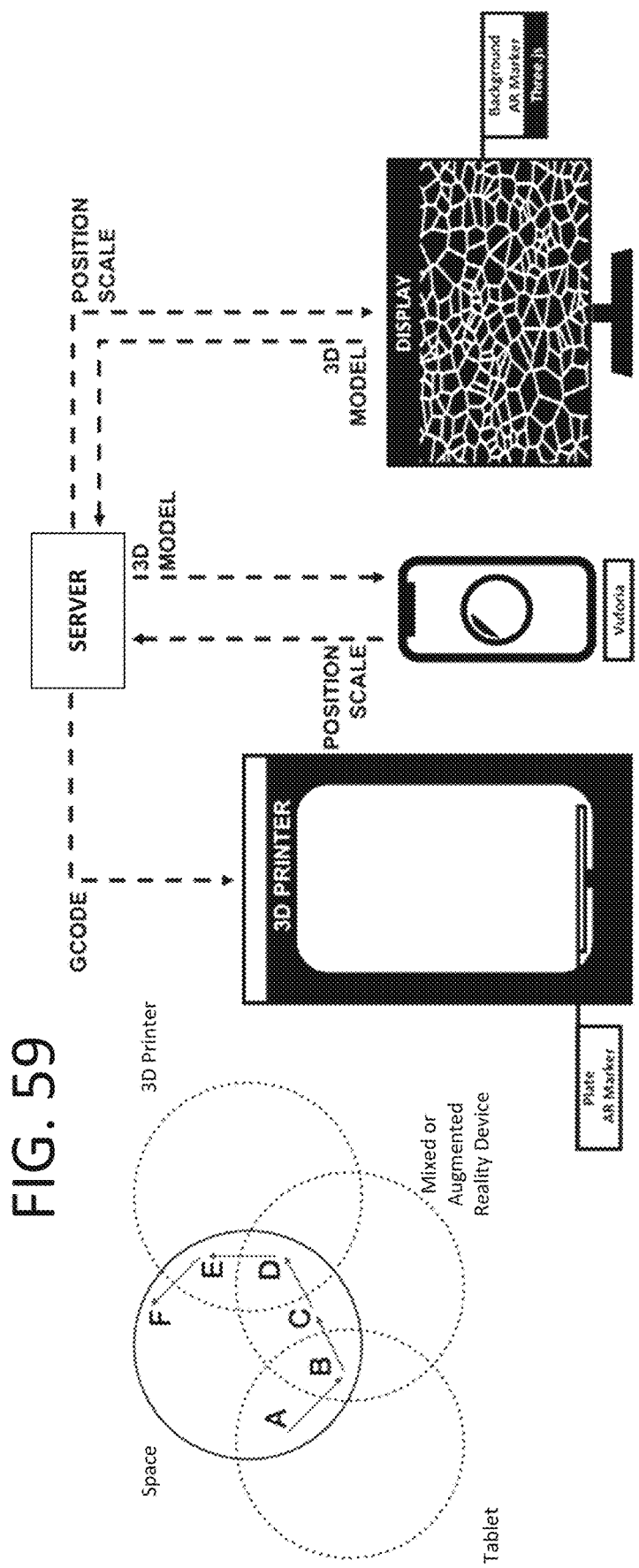
FIG. 59 illustrates how the ScreenToPrint server mediates the interaction between three clients: a display, a phone, and a 3D printer. A 3D model on the screen (A) is extracted from the display (B), moved through space using the phone (C), and subsequently dropped on a 3D printer (D), making a seamless transition between digital (E) and physical (F) representations of data.

FIG. 59 illustrates how the ScreenToPrint server mediates the interaction between three clients: a display, a phone, and a 3D printer. A 3D model on the screen (A) is extracted from the display (B), moved through space using the phone (C), and subsequently dropped on a 3D printer (D), making a seamless transition between digital (E) and physical (F) representations of data.

5.1. Motivation 3D printing is an involved task that requires nuanced, expert knowledge. Bringing a single print to life, from the conception of its design and modeling, to ultimately printing it, requires users to get acquainted with multiple pieces of software. Although desktop interfaces offer a fine-grained control in the modeling process, there is a disconnect between the realization of a print (which lives in the physical domain) and its digital model. Even if units of measurement are very specific, de-contextualized, they can become abstract without a frame of reference that's grounded in the physical space in which the final print exists. Using the AIR model we can streamline the 3D printing flow by reducing the amount of context switches a user has to employ to perform the 3D printing task, contextualizing measurement units to physical space for visual reference, and combining the fine-grained editing capabilities of a computer to the intuitive in situ editing of AR.

5.2. Architecture

The architecture of the ScreenToPrint application system is primarily composed of one or more of the following clients: a Vuforia enabled Apple device, a digital display running a Three.js web application, and an Ultimaker 3D printer. Interaction between the clients is moderated by the ScreenToPrint Node.js server, which communicates with the clients using Socket.io. When a mobile client registers with the server, it obtains a list of markers, allowing it to recognize actionable devices in the environment. Markers are embedded on the 3D printer plate and the digital display. Interactions between the screen and phone are also mediated by the server. Interactions with the model on the printing plate are performed on the phone and sent to the server, which handles the slicing of the 3D model through the CuraEngine. The server sends compiled gcode to the 3D printer through a REST API to obtain a print.

5.3. Methodology

Unlike 2D elements in the HybridUI application, which are made to move discretely (e.g. to instantaneously snap) between the screen and the AR space, the ScreenToPrint application uses a continuous transition over a period of time between two mediums to accommodate for a 3D object's depth. In order to signify the transition, we implemented a custom fragment shader. The location of the screen is determined by an image target dynamically generated from the display. As the user drags the model away from the screen, fragments behind the screen's plane become translucent while those in front of it become solid. Once the model exits the screen, the user is free to move, scale, and rotate it. Once the element exits the screen, the user can drag it through space towards the 3D printer.

When the phone detects the marker embedded on the printing plate, a bounding volume is displayed to denote the boundary of the printer's domain. If the model enters those boundaries, it rotates to optimal printing rotation and drops a shadow on the plate (FIG. 59, item B). This shadow suggests where the model will be located if dropped onto the plate. By letting go of the model, the print drops onto the plate and is fully editable. While on the plate, the user can use a pinch gesture to scale the model (FIG. 59, item D) and pan the model on the plate to adjust its location (FIG. 59 item C). A button displayed on the upper right corner of the phone's screen shows the estimated time to print for the current configuration. Adjusting the model updates this estimate.

The model slicing occurs in the ScreenToPrint server. The parameters such as alignment, rotation, and scale are being coordinated through the phone in the Vuforia coordinate system. The units of measurement are changed from meters to centimeters before they are sent to the server, which uses the CuraEngine to perform the slicing task. Finally, the printing is initiated by the ScreenToPrint server through a REST call.

6. DISCUSSION

Our exploration of the AIR model within the context of two specific applications, presented in Section 4 (HybridUI) and Section 5 (ScreenToPrint) of this disclosure, suggests that the AIR model is suitable to solve tasks that may: require the coordination of multiple collocated devices or complex systems of systems, require content to move between many collocated devices, involve content that holds an inherent functional or representational relationship to physical space, or be broken down to a series of discrete steps that switch between different digital and physical contexts.

A first goal of the AIR model is to create a continuous work-flow that empowers a user's interaction with collocated computing systems. One of the primary drivers behind the principles presented in Section 3.1 is reducing the amount of context switches associated with a task, which prior research has found to increase the cognitive load on users. Given the degree to which the AIR model is effective in achieving this goal cannot be decoupled from a specific application, we show how AIR reduces the number of context switches in two specific use cases.

Typically, 3D printing requires the user to switch contexts, often involving the following steps: downloading the 3D model in the proper format, importing it in an arbitrary software used for slicing, saving the sliced model to an external drive (if the printer is not physically connected to the computer or the web), and finally loading the model onto the printer itself. This already involves three different devices (four if an external drive is required) and two distinct pieces of software (i.e. slicing software and software used to acquire the content). Using the AIR model, ScreenToPrint effectively eliminates the number of physical and digital interfaces that the user must interact with in order to fully realize a print. The user can download, extract, manipulate, and transfer the 3D model with a single device (AR-enabled phone), and carry out all operations within a single software environment running on it. All other operations such as the transfer of the model's data, the slicing, and the preparation of the print on the plate happen seamlessly as the user moves the model from the computer to the printer, simulating the way a person would manipulate objects within the physical domain. Similarly, by enabling cross-domain interactions, HybridUI reduces the number of devices that the user must use to transfer and interact with content within complex systems of systems.

A second goal of the AIR model is to create a ubiquitous computing environment that can be mediated through an AR-enabled device. The space (section 3.1.1) and scope (section 3.1.5) principles suggest that the sense of ubiquity provided by the AIR model is directly proportional to the number of intersecting devices that it accommodates and the nature of the content that can be interacted with. With HybridUI and ScreenToPrint we demonstrate that the model can support different kinds of content (3D and 2D), and a plurality of devices (screens, 3D printers, phones, tablets, etc.). By combining the AIR model with the distributed server paradigm of the Reality Editor the AIR model can be theoretically extended to include a wider spectrum of devices. We acknowledge, however, that the scalability of this approach very much requires device-specific considerations in terms of each device's boundaries and the way they ingest content.

The sense of ubiquity in an AIR implementation is also coupled to the capabilities of existing AR frameworks. The degree to which the boundary (3.1.3) and transition (3.1.4) principles can be upheld in concrete implementations of the AIR model are very much limited by the tracking capabilities of the AR device. Existing AR Frameworks accommodate the use of static image targets (HybridUI ScreenToPrint), dynamic image targets (ScreenToPrint), and model targets (HybridUI). Our proof of concept applications show that the AIR Model can leverage these different modalities of tracking technologies. However, the visual flow of content can be broken if the device is unable to track properly. These tracking methodologies limit the interactions that can happen between intersecting domains, and the extent to which a domain's boundaries can be made clear.

In this disclosure, we have defined a new model (AIR) that augments the intersection between the physical and digital domains using AR. We've presented the governing principles of the Augmented Intersection of Realities model and validated their feasibility by building two augmented reality applications that make use of these principles as an example to solve problems in the industrial and additive manufacturing space. Through the AIR model, HybridUI enables intuitive customizability of digital displays. For a concrete example, we've shown how this can be applied in an industrial manufacturing environment, but these principles can be extended to other application spaces. Such is the case for ScreenToPrint, which shows how these principles can be applied to 3D content to bridge the skill gap required to interact with 3D printers.

HybridUI and ScreenToPrint shows how the AIR model blurs the boundaries between collocated computers, reduces the amount of context switches a user goes through when interacting with complex systems, and leverages spatial metaphors to create more intuitive AR interactions with the devices around us. These techniques, however, are limited by the state of the art tracking capabilities of AR devices. As the tracking ability of AR-enabled devices evolves, the full realization of the AIR model in terms of scale can be achieved. As more systems comply with this model, we can envision a world where the boundaries between domains disappear, with space acting as a unifying medium through which information flows among the domains in our reality.

7. METHOD FLOWCHARTS

FIG. 60 illustrates a method 6000 in accordance with one embodiment. The method 6000 can be performed by two or more computer systems each of which computer systems includes at least one processor and a memory. At a step 6010, a first of the computer systems displays a graphical object on a first display. At a step 6020, a second of the computer systems causes the capturing of a live video scene with a camera, wherein the live video scene shows the first display and the graphical object on the first display. At a step 6030, the second of the computer systems determines, based on analysis of the captured live video scene, that the live video scene shows the first display. At a step 6040, based on the determining that the live video scene shows the first display, the second of the computer systems: obtains a specification of the graphical object, and instantiates the graphical object in a memory for use in a displaying of the graphical object on a display. At a step 6050, in response to a first user input to the second of the computer systems: the second of the computer systems displays the instantiated graphical object on a second display as a virtual object in an augmented or mixed reality environment, wherein the graphical object is overlaid on a background comprising a live view of the first display, and wherein the graphical object is displayed in on the second display registered in alignment with the display of the graphical object on the first display in the background. At a step 6060, contemporaneously with the second of the computer systems displaying the instantiated graphical object on the second display, the first of the computer systems removes the graphical object from the first display.

FIG. 61 illustrates a method 6100 in accordance with one embodiment. The method 6100 can be performed by one or more computer systems each of which computer systems includes at least one processor and a memory. At a step 6110, the method includes, in response to a first user input, instantiating an initial instance of a graphical object on a first display as a virtual object in an augmented or mixed reality environment, wherein the graphical object is graphically overlaid on a live background scene. At a step 6120, the method includes, causing the capturing of a live video scene with a camera, wherein the live video scene includes a portion of the live background scene. At a step 6130, the method includes, determining, based on analysis of the captured live video scene, that the live video scene shows a second display. At a step 6140, the method includes, based on the determining that the live video scene shows the second display: obtaining a specification of the graphical object, and instantiating the graphical object in a memory for use in a displaying of the graphical object on the second display. At a step 6150, the method includes, determining, based on analysis of the captured live video scene, that the graphical object on the first display at least partially overlaps the second display in the live background scene. At a step 6160, the method includes, in response to a second user input received while the graphical object on the first display at least partially overlaps the second display in the live background scene: displaying the instantiated graphical object on the second display in a position such that the display of the graphical object on the first display is registered in alignment with the display of the graphical object on the second display in the live background scene. At a step 6170, contemporaneously with the displaying the instantiated graphical object on the second display, removing the graphical object from the first display.

8. COMPUTER IMPLEMENTATION

Components of the embodiments disclosed herein, which may be referred to as methods, processes, applications, programs, modules, engines, functions or the like, can be implemented by configuring one or more computers or computer systems using special purpose software embodied as instructions on a non-transitory computer readable medium. The one or more computers or computer systems can be or include standalone, client and/or server computers, which can be optionally networked through wired and/or wireless networks as a networked computer system.

Figure 62:
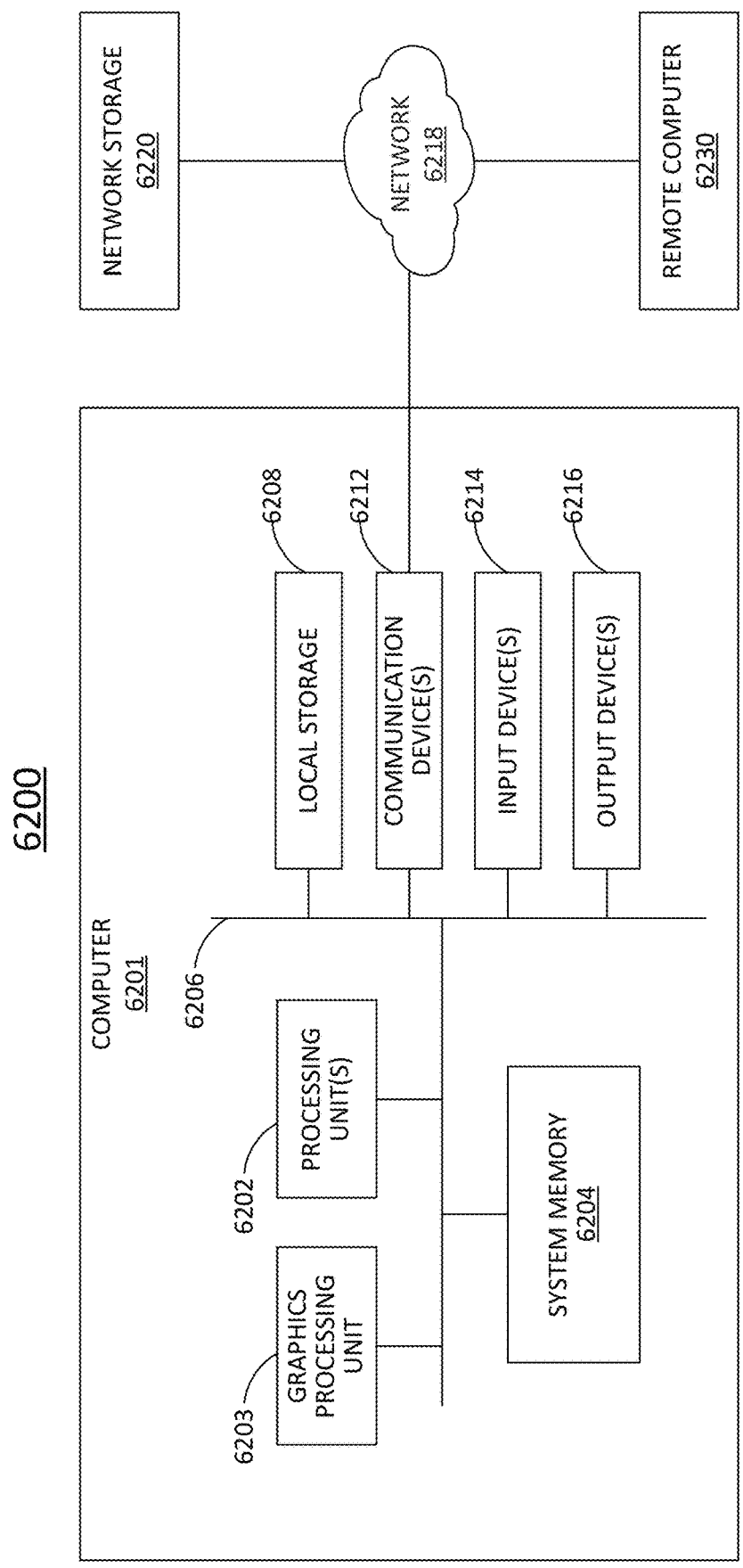
FIG. 62 illustrates a general computer architecture that can be appropriately configured to implement components disclosed in accordance with various embodiments.

FIG. 62 illustrates a general computer architecture 6200 that can be appropriately configured to implement components disclosed in accordance with various embodiments. The computing architecture 6200 can include various common computing elements, such as a computer 6201, a network 6218, and one or more remote computers 6230. The embodiments disclosed herein, however, are not limited to implementation by the general computing architecture 6200.

Referring to FIG. 62, the computer 6201 can be any of a variety of general purpose computers such as, for example, a server, a desktop computer, a laptop computer, a tablet computer or a mobile computing device. The computer 6201 can include a processing unit 6202, a system memory 6204 and a system bus 6206.

The processing unit 6202 can be any of various commercially available computer processors that can include one or more processing cores, which can operate independently of each other. Additional co-processing units, such as a graphics processing unit 6203, also can be present in the computer.

The system memory 6204 can include volatile devices, such as dynamic random access memory (DRAM) or other random access memory devices. The system memory 6204 can also or alternatively include non-volatile devices, such as a read-only memory or flash memory.

The computer 6201 can include local non-volatile secondary storage 6208 such as a disk drive, solid state disk, or removable memory card. The local storage 6208 can include one or more removable and/or non-removable storage units. The local storage 6208 can be used to store an operating system that initiates and manages various applications that execute on the computer. The local storage 6208 can also be used to store special purpose software configured to implement the components of the embodiments disclosed herein and that can be executed as one or more applications under the operating system.

The computer 6201 can also include communication device(s) 6212 through which the computer communicates with other devices, such as one or more remote computers 6230, over wired and/or wireless computer networks 6218. Communications device(s) 6212 can include, for example, a network interface for communicating data over a wired computer network. The communication device(s) 6212 can include, for example, one or more radio transmitters for communications over Wi-Fi, Bluetooth, and/or mobile telephone networks.

The computer 6201 can also access network storage 6220 through the computer network 6218. The network storage can include, for example, a network attached storage device located on a local network, or cloud-based storage hosted at one or more remote data centers. The operating system and/or special purpose software can alternatively be stored in the network storage 6220.

The computer 6201 can have various input device(s) 6214 such as a keyboard, mouse, touchscreen, camera, microphone, accelerometer, thermometer, magnetometer, or any other sensor. Output device(s) 6216 such as a display, speakers, printer, or eccentric rotating mass vibration motor can also be included.

The various storage 6208, communication device(s) 6212, output devices 6216 and input devices 6214 can be integrated within a housing of the computer, or can be connected through various input/output interface devices on the computer, in which case the reference numbers 6208, 6212, 6214 and 6216 can indicate either the interface for connection to a device or the device itself as the case may be.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs can be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Application-specific Integrated Circuits (ASICs), Application-specific Standard Products (AS-SPs), System-on-a-chip systems (SOCs), and Complex Programmable Logic Devices (CPLDs).

9. CONCLUSION

Although the subject matter has been described in terms of certain embodiments, other embodiments, including embodiments which may or may not provide various features and advantages set forth herein will be apparent to those of ordinary skill in the art in view of the foregoing disclosure. The specific embodiments described above are disclosed as examples only, and the scope of the patented subject matter is defined by the claims that follow. In the claims, the term "based upon" shall include situations in which a factor is taken into account directly and/or indirectly, and possibly in conjunction with other factors, in producing a result or effect. In the claims, a portion shall include greater than none and up to the whole of a thing.

The invention claimed is:

1. A method comprising:
a first computer system displaying a graphical object on a first display;
a mobile computing device capturing a live video scene with a camera and redisplaying the captured live video scene on a touchscreen display of the mobile device;
the mobile device determining, based on analysis of the captured live video scene, that the live video scene shows the first display and the graphical object displayed on the first display;
the mobile device receiving first user input comprising:
a user selection on a portion of the touchscreen display overlapping a redisplay on the touchscreen of the graphical object on the first display as captured by the camera, and
in association with the user selection, a detected physical movement of the mobile device away from the first display;
the mobile device:
obtaining a specification of the graphical object, and
based on the obtained specification, instantiating the graphical object in a memory for use in a displaying of the graphical object on the touchscreen display; and
in response to the first user input:
the mobile device displaying the instantiated graphical object on the touchscreen display as an augmented reality overlay over a live view of the first display as captured by the camera, and
contemporaneously with the mobile device displaying the instantiated graphical object on the touchscreen display, the first computer system removing the graphical object from the first display.

2. The method of claim 1, wherein the user selection comprises a touch and hold, and wherein the detected physical movement occurs during the hold.

3. The method of claim 1, wherein the mobile device obtains the specification of the graphical object from the first computer system.

4. The method of claim 3, wherein the mobile device obtains the specification of the graphical object from the first computer system in response to determining that the live video scene shows the first display.

5. The method of claim 3, wherein the mobile device obtains the specification of the graphical object from the first computer system in response to the first user input.

6. The method of claim 1, further comprising, in response to a second user input to the mobile device, manipulating the instantiated graphical object to alter the appearance of the instantiated graphical object on the touchscreen display.

7. The method of claim 6, wherein the manipulating comprises one or more of: resizing, reorienting, and repositioning.

8. The method of claim 1, wherein the graphical object is a three-dimensional graphical object, wherein the first display is a two-dimensional computer display monitor, and wherein the three-dimensional graphical object is displayed in two dimensions on the first display.

9. The method of claim 8, wherein in response to the first user input, the instantiated graphical object is progressively displayed on the touchscreen display while the graphical object is progressively removed from the first display over a period of time such that the graphical object on the first display appears to transition to the instantiated graphical object on the touchscreen display through a plane representing a surface of the first display as shown on the redisplayed captured live video feed on the touchscreen display.

10. The method of claim 1, further comprising,
   determining, based on analysis of the captured live video scene, that the live video scene shows a printer;
   determining, based on analysis of the captured live video scene, that the instantiated graphical object on the touchscreen display at least partially overlaps the printer in the live video scene; and
   in response to a second user input received while the graphical object on the touchscreen display at least partially overlaps the printer in the live video scene, causing the printer to create a physical representation of the graphical object.

11. The method of claim 10, wherein the printer is a three-dimensional printer.

12. The method of claim 10, wherein the printer is a two-dimensional printer that produces a printout on paper.

13. The method of claim 1, further comprising,
   determining, based on analysis of the captured live video scene, that the live video scene shows a second display;
   determining, based on analysis of the captured live video scene, that the instantiated graphical object on the touchscreen display at least partially overlaps the second display in the live video scene;
   the mobile device receiving second user input comprising:
      a detected physical movement of the mobile device towards the second display while the graphical object overlays the second display in the live video scene;
   a second computer system:
      obtaining a specification of the graphical object, and
      instantiating the graphical object in a memory for use in a displaying of the graphical object on the second display; and
   in response to the second user input:
      the second computer system displaying the instantiated graphical object on the second display, and
      contemporaneously with the second computer system displaying the instantiated graphical object on the second display, the mobile device removing the graphical object from the touchscreen display.

14. The method of claim 13, wherein the second user input further comprises a release of a hold on the touchscreen display.

15. The method of claim 13, wherein the second user input further comprises a release of a touch and hold on the touchscreen display.

16. A method comprising:
   a mobile computing device capturing a live video scene with a camera and redisplaying the captured live video scene on a touchscreen display of the mobile device;
   the mobile device displaying a graphical object on the touchscreen display as an augmented reality overlay over the captured live video scene;
   the mobile device determining, based on analysis of the captured live video scene, that the live video scene shows a first display;
   the mobile device receiving first user input comprising:
      a user selection on a portion of the touchscreen display overlapping a display of the graphical object, and
      in association with the user selection, a detected physical movement of the mobile device towards the first display while the graphical object overlays the first display in the live video scene;
   a first computer system:
      obtaining a specification of the graphical object, and
      instantiating the graphical object in a memory for use in a displaying of the graphical object on the first display; and
   in response to the first user input:
      the first computer system displaying the instantiated graphical object on the first display, and
      contemporaneously with the first computer system displaying the instantiated graphical object on the first display, the mobile device removing the graphical object from the touchscreen display.

17. The method of claim 16, wherein the user selection comprises a touch and hold, and wherein the detected physical movement occurs during the hold.

18. The method of claim 16, wherein the first computer system obtains the specification of the graphical object from the mobile device.

19. The method of claim 16, wherein the mobile device provides the specification of the graphical object to the first computer system in response to determining that the live video scene shows the first display.

20. The method of claim 16, wherein the mobile device provides the specification of the graphical object to the first computer system in response to the first user input.

* * * * *